US009098192B2

(12) United States Patent
Davidson

(10) Patent No.: US 9,098,192 B2
(45) Date of Patent: Aug. 4, 2015

(54) OVERSCAN DISPLAY DEVICE AND METHOD OF USING THE SAME

(75) Inventor: Philip L. Davidson, New York, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 273 days.

(21) Appl. No.: 13/469,749

(22) Filed: May 11, 2012

(65) Prior Publication Data

US 2013/0300674 A1    Nov. 14, 2013

(51) Int. Cl.
| G06T 13/00 | (2011.01) |
| G09G 5/00 | (2006.01) |
| G06F 3/033 | (2013.01) |
| G06F 3/0488 | (2013.01) |

(52) U.S. Cl.
CPC .................................. G06F 3/04883 (2013.01)

(58) Field of Classification Search
USPC ................. 345/473, 661, 665, 667, 173–178; 715/702, 863
See application file for complete search history.

(56) References Cited

U.S. PATENT DOCUMENTS

| 8,749,510 B2 * | 6/2014 | Park et al. ...................... 345/173 |
| 2003/0142081 A1 * | 7/2003 | Iizuka et al. ................... 345/173 |
| 2010/0105443 A1 | 4/2010 | Vaisanen |
| 2010/0164959 A1 * | 7/2010 | Brown et al. .................. 345/473 |
| 2011/0209098 A1 * | 8/2011 | Hinckley et al. .............. 715/863 |
| 2013/0088450 A1 * | 4/2013 | Takase et al. ................. 345/173 |

FOREIGN PATENT DOCUMENTS

| EP | 2224321 A2 | 9/2010 |
| EP | 2434388 A2 | 3/2012 |
| WO | 2011125352 A1 | 10/2011 |

OTHER PUBLICATIONS

ISA European Patent Office, International Search Report and the Written Opinion of PCT/US2013/040678, Aug. 19, 2013, WIPO, 9 pages.

* cited by examiner

Primary Examiner — Kent Chang
Assistant Examiner — Nelson Rosario
(74) Attorney, Agent, or Firm — Jeremy Snodgrass; Judy Yee; Micky Minhas

(57) ABSTRACT

A display device comprises a display panel including a display region configured to display one or more image objects and an overscan region configured to prevent the display of images within the overscan region, a touchscreen panel overlying the display region and the overscan region configured to detect and generate engagement data indicative of detected engagement, and a computer processor configured to access first engagement data, determine that the first engagement data reflects engagement with at least one portion of the touchscreen panel correspondingly overlapping with the overscan region, identify a first particular engagement input type based on the first engagement data, and instruct the display panel to invoke the display of the one or more image objects in the display region or to change the display of the one or more image objects in the display region.

45 Claims, 48 Drawing Sheets

OVERSCAN DISPLAY DEVICE AND METHOD OF USING THE SAME

TECHNICAL FIELD

This disclosure relates to features of a multi-touch display device.

BACKGROUND

Like traditional touch-screen display devices, some multi-touch display devices require that a user provide physical contact within display regions of the display devices. As a result, image objects may be manipulated upon a canvas within the display region. However, using the display region of the display device to receive user inputs in order to manipulate the image objects of the canvas sometimes prevents the user from receiving an unobstructed view of an entirety of the display region while manipulating the image objects.

DETAILED DESCRIPTION

Touchscreen display devices include a touch sensitive surface that extends over a display region of the display device. By extending this touch-sensitive surface beyond the display region of the touchscreen device it is possible to enhance the functionality of the touchscreen device by allowing the user to interact with the touchscreen device using touch without obstructing the display region. The portion of the touch-sensitive surface that is positioned over the non-display region of the touchscreen device may be referred to as an "overscan" region and may be advantageously leveraged to perform various graphical user interface (GUI) functions. Notably, the overscan region and the display region may have the same or substantially the same two-dimensional sensitivity to touch.

As described in more detail below, the overscan region may be used to initiate various GUI interactions with the touchscreen device including, for example, opening and closing an object viewer that facilitates manipulation of objects displayed in the display region, opening and closing a virtual keyboard that may be used to annotate objects displayed in the display region, opening and closing a menu, and changing a view of the objects displayed in the display region. The touchscreen device may determine which GUI interaction to initiate based on a type of user input (e.g., a vertical swipe, a single finger tap, a triple finger double-tap, a "pinching" gesture, a "spreading" gesture, etc.) and/or a location of the user input within the overscan region of the touchscreen device (e.g., in the portion of the overscan region below a highlighted border of the display region, etc.). For example, a user may touch or otherwise engage a portion of the overscan region below the display region using an upward vertical swipe to thereby initiate a virtual keyboard GUI interaction that results in a virtual keyboard appearing to slide up and into the display region from the overscan region. This and other GUI interactions that may be initiated in response to input provided in the overscan region are described further below.

Figure 1:
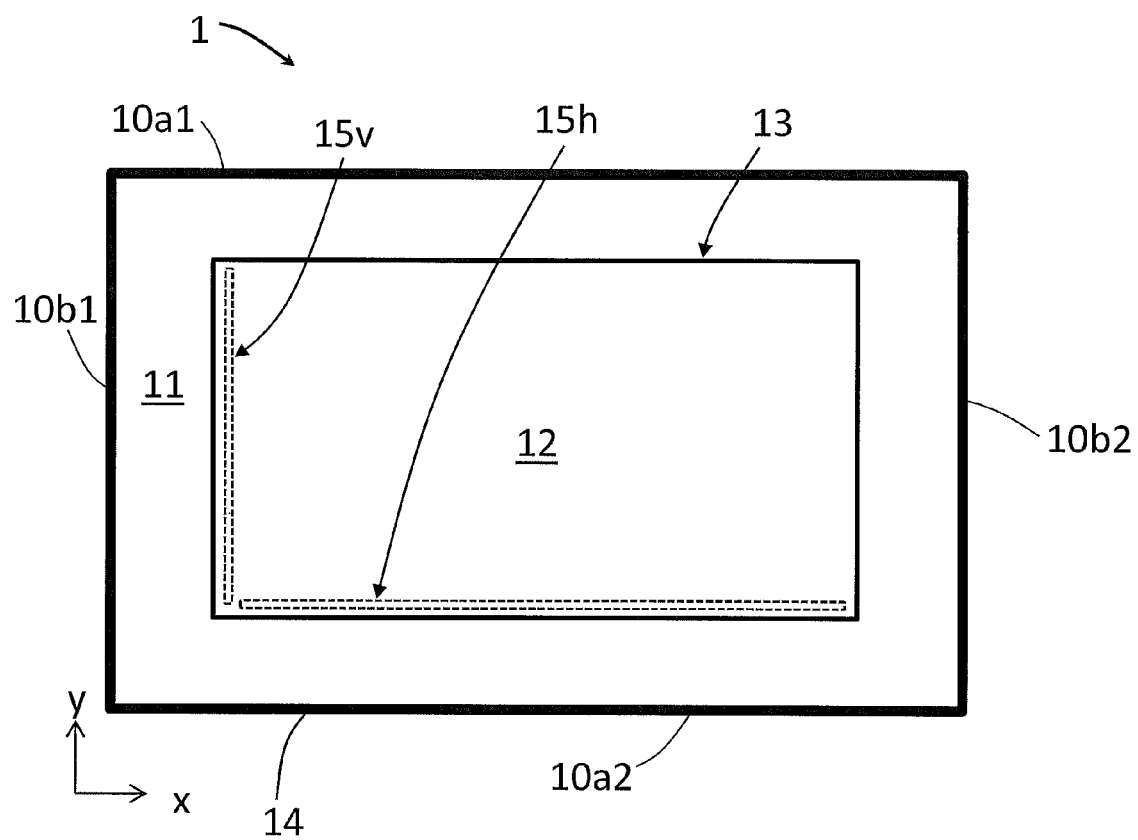
FIG. 1 is a diagram of a multi-touch display device configured to provide a user with the ability to manipulate views and to manipulate displayed image objects arranged on a canvas.

FIG. 1 is an illustration of a multi-touch display device 1 configured to provide a user with the ability to manipulate views and to manipulate displayed image objects arranged on a canvas. For example, the user is provided with the ability to view an overall area of the canvas, as well as selectable portions of the canvas by using zoom controls of the display device 1, which are detailed below. By using the zoom controls to view less than the overall area of the canvas, the user is able to initiate camera views of portions of the overall area of the canvas. In another implementation, the camera views may be manipulated to pan to other regions of the canvas.

In one implementation, the display device 1 includes an overscan region 11 that encompasses (or surrounds) a display region 12 with an interface boundary 13 formed between the overscan region 11 and the display region 12. Here, the interface boundary may have substantially little or no dimensionality. For example, the interface boundary 13 merely identifies a seamless boundary between the adjoining overscan region 11 and the display region 12 and may lack any specific thickness or width. The display region 12 is configured to provide selectable views of the displayed image objects arranged on the canvas, whereas the overscan region 11 is configured to exclude the display of image objects. That is, the display region 12 may be configured to include display pixel elements, whereas the overscan region 11 may be configured to exclude display pixel elements (i.e., the overscan region 11 may not include display pixel elements and, therefore, may not be capable of displaying image objects). Since the overscan region 11 may purposely exclude display pixel elements, the display region 12, which displays image objects, of the display device 1 may be smaller than an overall size of the display device 1.

In some implementations, the overscan region 11 and the display region 12 may resemble a picture-frame, wherein the overscan region 11 borders (or surrounds) the display region 12. Additionally, although the display device 1 shown in FIGS. 1 and 2 has a rectangular geometry, i.e., the overscan region 11 and the display region 12 are shown as rectangles, the display device 1 may have other geometries. For example, the display region 12 may have a circular shape and the overscan region 11 may be a circular frame or may be a frame having a different shape (e.g., a square shape or a rectangular shape) that fully encompasses the circular display region 12. Conversely, the overscan region 11 may be a frame having a circular shape and the display region 12 may have a different shape (e.g., a rectangular shape or a square shape) that is positioned within the circular overscan region frame 11. In other implementations, the display region 12 may instead have the shape of a frame (e.g., circular, square or rectangular) with the overscan region 11 fully encompassed within the display region frame 12.

In some implementations, the overscan region 11 may only extend from all or a portion of one or more of the external borders of the display region 12. For example, the overscan region 11 may be a rectangle that abuts with only the bottom border of the display region 12. The overscan region 11 may extend the full length of one or more side borders of the display region 12 (e.g., top, bottom, right or left borders of a rectangular display region 12) or may extend only a portion of the full length of one or more of the side borders of the display region 12. For example, the overscan region 11 may be a 1 inch by 1 inch square that abuts with the center portion of a bottom border of a 16 inch by 9 inch rectangular display region 12.

In each of the implementations, the overscan region 11 is configured having a width of such dimension as to allow for the receipt of contact inputs in both a 1D dimension (i.e., along one or both of x- and y-axis) and 2D dimensions (i.e., along both x-axis and y-axis). As opposed to edge-type regions configured to receive point-like contact inputs, the overscan region 11 may be configured to have a width that allows for purposeful contact inputs along multiple x- and y-axis directions. Moreover, the overscan region 11 may be configured to maintain a substantially constant width. For example, the display device 1 may be configured such that the overscan region 11 is established as a substantially "permanent" region dedicated to receive contact input(s). In some implementations, the display device 1 may not have the capability to reconfigure the width(s) of the overscan region 11. Conversely, the display device 1 may have the capability to reconfigure the width(s) of the overscan region 11. However, the overscan region 11 may be configured to not display image objects, i.e., the overscan region 11 excludes display pixel elements.

Overlying the overscan region 11 and the display region 12 is a touchscreen device 14 that extends between horizontal sides $10a1$ and $10a2$ and vertical sides $10b1$ and $10b2$ of the display device 1. The touchscreen device 14 may be configured to overlie both the overscan region 11 and the display region 12, and may be configured to receive user inputs from within both the overscan region 11 and the display region 12.

The touchscreen device 14 may require that a user physically touch its surface with one or more fingers, styluses, and/or other mechanisms in order to engage the surface of the touchscreen device 14. Other implementations of the touchscreen device 14 may be configured to receive input by detecting that one or more fingers, styluses, and/or other input mechanisms have engaged the surface of the multi-touch display device by hovering around, or otherwise in the vicinity of, the surface of the display area without requiring that the input mechanism actually make physical contact with the surface of the touch-screen display device. In some implementations, the touchscreen device 14 may receive input by an input mechanism hovering within, for example, 10 mm of its surface. In one particular example, the touchscreen device 14 is a capacitive touch sensor that detects a location of an input mechanism on its surface by the input mechanism engaging a sensor matrix of the touchscreen device such that a change in capacitance is imparted at a position on the sensor matrix by the input mechanism. This change in capacitance is then measured to estimate the position of the input mechanism.

As detailed below, the displayed image objects of the canvas can be manipulated based upon input data (also referred to as engagement data) provided by the touchscreen device 14 that indicates engagement by one or more input mechanisms with portions of the touchscreen device 14 overlying the overscan region 11, as well as input/engagement data indicating engagement by one or more input mechanisms with portions of the touchscreen device 14 overlying the display region 12. Moreover, the canvas may be manipulated based upon input/engagement data indicating engagement by one or more input mechanisms with portions of the touchscreen device 14 overlying one or both of the overscan region 11 and the display region 12 to provide a user with the selectable camera views.

In some implementations, the display device 1 includes a touchscreen panel having a single touch-sensor matrix that detects two-dimensional positions of one or more input mechanisms on the matrix and generates engagement data that indicates the two-dimensional positions of the one or more input mechanisms on the matrix. The matrix may be formed from, for example, a first plurality of substantially parallel conductors (e.g., row conductors) that intersect a second plurality of substantially parallel conductors (e.g., column conductors) such that each conductor in the first plurality intersects each conductor in the second plurality and vice versa. The positions of the one or more input mechanisms may be detected by, for example, measuring changes in capacitance from one or more of the conductors in the first plurality of conductors to one or more of the conductors in the second plurality of conductors or to a common system ground. The display device 1 is able to determine, from the generated engagement data, whether the one or more input mechanisms are positioned over the display region 12 or over the overscan region 11. In one implementation example, the display device 1 includes a data store that stores a first set of two-dimensional locations (where each location may be represented by, for example, a row coordinate and a column coordinate) on the sensor matrix as corresponding to the display region 12 and a second and different set of two-dimensional locations in the sensor matrix as corresponding to the overscan region 11. The display device 1 is able to determine the two-dimensional locations of the one or more input mechanisms from the engagement data and is able to determine whether the two-dimensional locations of the one or more input mechanisms are over the display region 12 or the overscan region 11 by comparing the determined locations to the stored first and second set of locations. The display device 1 may then process the engagement inputs differently based on whether the engagement input was received within the display region 12 or within the overscan region 11.

In some implementations, the first and second set of locations may together correspond to locations forming a single contiguous area of the matrix. In other implementations, the first and second set of locations may correspond to two different areas of the sensor matrix, respectively, that are separated from each other by one or more conductors (e.g., rows and/or columns) of the sensor matrix that are deemed to neither be within the display region nor within the overscan region. In some implementations, the first and second set of locations together encompass all locations on the sensor matrix. In other implementations, the first and second set of locations encompass less than all locations on the sensor matrix such that some two-dimensional locations are neither within the display region 12 nor within the overscan region 11.

In some implementations, the device 1 includes a vertical scroll bar region 15v extending vertically along (or parallel to) one of the vertical sides 10b1 and a horizontal scroll bar region 15h extending horizontally along (or parallel to) one of the horizontal sides 10a2. Since the device 1 is configured to provide a user with camera views of the entire area of the canvas and selectable area portions of the canvas, scroll bars may be displayed to provide the user with an indication regarding the relative positioning of the camera view with respect to the overall area of the canvas. As detailed below, in some implementations, manipulating the camera view to display specific regions of the canvas causes display of a vertical scroll bar and a horizontal scroll bar within the vertical scroll bar region 15v and the horizontal scroll bar region 15h.

Figure 2:
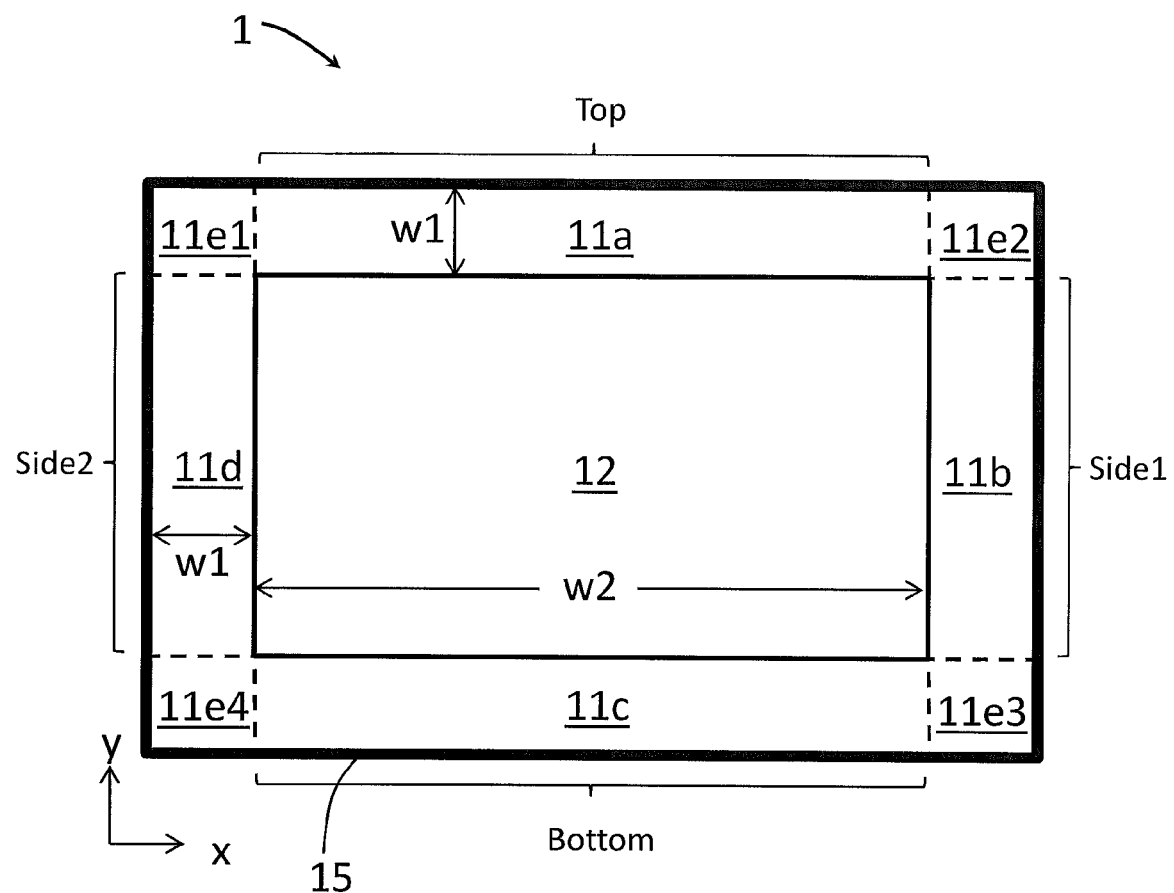
FIG. 2 is an illustration of an overscan region of a display device configured to receive contact inputs at a touchscreen device overlying an overscan region.

FIG. 2 is an illustration of the overscan region 11 of a display device 1 configured to receive engagement inputs at a touchscreen device 14 overlying an overscan region 11. For purposes of brevity and convention, engagement inputs may be referred to subsequently as contact inputs, and engagement input data may be referred to subsequently as contact input data. However, it should be understood that any reference to contact inputs and data in the following disclosure contemplates both inputs and data generated by or in response to the one or more input mechanisms (e.g., fingers or mechanical-type devices, such as styluses) being in direct physical contact with the surface of the touchscreen device 14 and inputs and data generated by or in response to the one or more input mechanisms hovering in the vicinity of the surface of the touchscreen device 14 without actually contacting the surface of the touchscreen device 14 as noted previously.

Furthermore, for purposes of brevity and convention, reference to receiving contact input within the overscan region 11 may be synonymous with receiving contact input at the touchscreen device 14 within corresponding portions of the overscan region 11. For example, when contact input is received within portions of the overscan region 11, it is to be understood that the contact input is made to the touchscreen device 14 at the corresponding portion(s) of the overscan region 11.

Contact inputs may be received within various regions of the overscan region 11. For example, the overscan region 11 may include overscan input regions 11a-d corresponding to a top, side1, bottom, and side2 portions, respectively, of the display device 1. In addition, the overscan region 11 may include overscan input corner regions 11e1-4 corresponding, respectively, to corner regions disposed between the overscan input regions 11a-d. Although the overscan input regions 11a-d are shown to have substantially the same widths w1 (from the interface boundary 13 to the corresponding ones of the vertical and horizontal sides 10a1, 10a2, 10b1, and 10b2), the overscan region 11 may be provided having substantially different widths w1. For example, the overscan input region 11a may have a width w1 (along the y-axis direction) substantially larger or substantially smaller than widths of the overscan input regions 11b, 11c, and 11d, or the overscan input region 11b may have a width w1 (along the x-axis direction) substantially larger or substantially smaller than widths of the overscan input regions 11a, 11c, and 11d. Moreover, opposing overscan input regions 11a and 11c may have widths w1 (along the y-axis direction) substantially larger or substantially smaller than widths w1 (along the x-axis direction) of the opposing overscan input regions 11b and 11d. Additionally, adjacent overscan input regions 11a and 11b may have widths w1 (along the x-axis and y-axis directions) substantially larger or substantially smaller than widths w1 (along the x-axis and y-axis directions) of the adjacent overscan input regions 11c and 11d.

In some implementations, the overscan region 11 may have an n:m width ratio with the display region, wherein 'n' corresponds to widths w1 of the overscan region 11 and 'm' corresponds to widths w2 of the display region 12, and each of 'n' and 'm' are numbers between 1 and 100, for example. By way of example, a width ratio of 1:1 may indicate that a width w1 of the overscan region 11 is substantially the same as a width w2 of the display region. Similarly, a width ratio of 1:2 may indicate that a width w1 of the overscan region 11 is substantially one-half a width w2 of the display region. Conversely, a width ratio of 2:1 may indicate that a width w1 of the overscan region 11 is substantially twice a width w2 of the display region.

In some implementations, a width ratio of 3:1 (a width w1 of the overscan region 11 is substantially three times a width w2 of the display region), or 4:1 (a width w1 of the overscan region 11 is substantially four times a width w2 of the display region), may be desired in order to provide a user of the display device 1 with the precision to manipulate the camera (or canvas) using contact input to the overscan region 11.

In some implementations, a width ratio of 1:3 (a width w1 of the overscan region 11 is substantially one-third a width w2 of the display region), or 1:4 (a width w1 of the overscan region 11 is substantially one-fourth a width w2 of the display region), may be desired in order to provide a user of the display device 1 with the precision to manipulate image objects on the display region 12.

In some implementations, although the overscan input corner regions 11e1-4 are shown, in FIG. 2, to be distinct from the overscan input regions 11a-d, the overscan input corner regions 11e1-4 may be extensions of the overscan input regions 11a-d. For example, the overscan input corner regions 11e1 and 11e2 may be configured to be extensions of the overscan input region 11a. Alternatively, only one of the overscan input corner regions 11e1 and 11e2 may be configured to be an extension of the overscan input region 11a. However, for purposes of explanation, the overscan input corner regions 11e1-4 will be considered to be distinct from the overscan input regions 11a-d.

In some implementations, the overscan input regions 11a-e are not necessarily discrete individual regions configured to receive specific type(s) of contact input(s). But rather, for purposes of presenting logical divisions of a collective entirety of the overscan input regions 11a-e, the overscan input regions 11a-e are individually shown. For example, the collective entirety of the overscan input regions 11a-e may be considered as a single overscan region configured to receive each specific type of contact inputs. Here, contact inputs may be received in any of the overscan input regions 11a-e without differentiation between the types of contact input(s) or which of the overscan input regions 11a-e receive the types of contact inputs.

In some implementations, the overscan input regions 11a-e may be presented as discrete individual regions configured to receive specific type(s) of contact input(s). For example, the individual overscan input regions 11a-e may be considered as discrete overscan regions 11a-e configured to receive specific types of contact input. Here, contact inputs may be received in any of the overscan input regions 11a-e and be differentiated from contact inputs received in any of the other overscan input regions 11a-e.

In some implementations, the overscan input corner regions 11e1-4 may be presented as discrete individual regions configured to receive specific type(s) of contact input(s) different from specific types of contact input(s) received by the overscan input regions 11a-d. Conversely, the overscan input corner regions 11e1-4 may be presented as discrete individual regions configured to receive specific type(s) of contact input(s) similar to the specific types of contact input(s) received by the overscan input regions 11a-d. For example, the overscan input regions 11a-d may be considered as a single overscan region configured to receive a first specific type of contact inputs, and the overscan input corner regions 11e1-4 may be configured to receive a second type of contact inputs different from the first type of contact inputs. Here, contact inputs may be received in any of the overscan corner input regions 11e1-4 without differentiation, or different types of contact inputs may be received in each of the overscan corner input regions 11e1-4.

The contact inputs to the overscan region 11 may be categorized by type. IN particular, the types of contact inputs may include, for example, swipes, slides (i.e., same as a swipe but having a slower speed and sometimes called drags), flicks, pinching fingers, spreading fingers, taps, double-taps, triple taps, etc. Some of these types may be further specified based on number of fingers involved (e.g., single finger taps, double finger taps, single finger swipes, three finger triple taps, three finger slides, etc.). Swipes, slides, and flicks also may be further specified based on the direction of the swipe or slide (e.g., vertical swipe up, vertical swipe down, left-right horizontal slide, right-left horizontal slide, etc.) Types of contact inputs also may be further specified based on a hand that is used to make the contact (i.e., left hand or right hand) and/or based on the identity of the user from which the contact input was received.

In some implementations, a type of contact input is a multi-touch gesture (i.e., a standardized drawing motion) recognized by the system (e.g., a sliding of a single finger to form the letter "s", a sliding of two fingers to form a loop, etc.). The system may, for example, assign a different GUI interaction to each of multiple different multi-touch gestures located at the same portion of the overscan region (e.g., a loop gesture at the overscan input region 11a may initiate a viewer GUI interaction while a single finger double-tap gesture at the overscan input region 11a may initiate a keyboard GUI interaction). Additionally or alternatively, the system may assign a different GUI interaction to each of multiple different portions of the overscan region that will be initiated by the same multi-touch gesture (e.g., a loop gesture at the overscan input region 11a may initiate a viewer GUI interaction and a loop gesture at the overscan input region 11b may initiate a keyboard GUI interaction).

Generally, the overscan input regions 11a-d, as well as the overscan input corner regions 11e1-4, may be configured to receive contact inputs associated with different types of commands for manipulating object images displayed on the display region 12, as well as control operational functions of the display device 1. For example, initial contact input(s) received by the overscan input regions 11a-d may provide for a first type of control of the display device 1, and subsequent contact input(s) received by the overscan input regions 11a-d may provide for a second type of control of the display device 1. Alternatively, initial contact input(s) received by the overscan input regions 11a-d may provide for a first type of control of the display device 1, and subsequent contact input(s) received by regions other than the overscan input regions 11a-d, such as regions of the display region 12, may provide for a second type of control of the display device 1. In addition, sequential combinations of various contact input(s) received by the overscan input regions 11a-d and/or received by the display region 12 may provide for changes in corresponding different controls of the display device 1. Based upon the type(s) of contact input received within the overscan region 11 and the location of the contact input (s) received within the overscan region 11, a user interface interaction may be selected.

Figure 3:
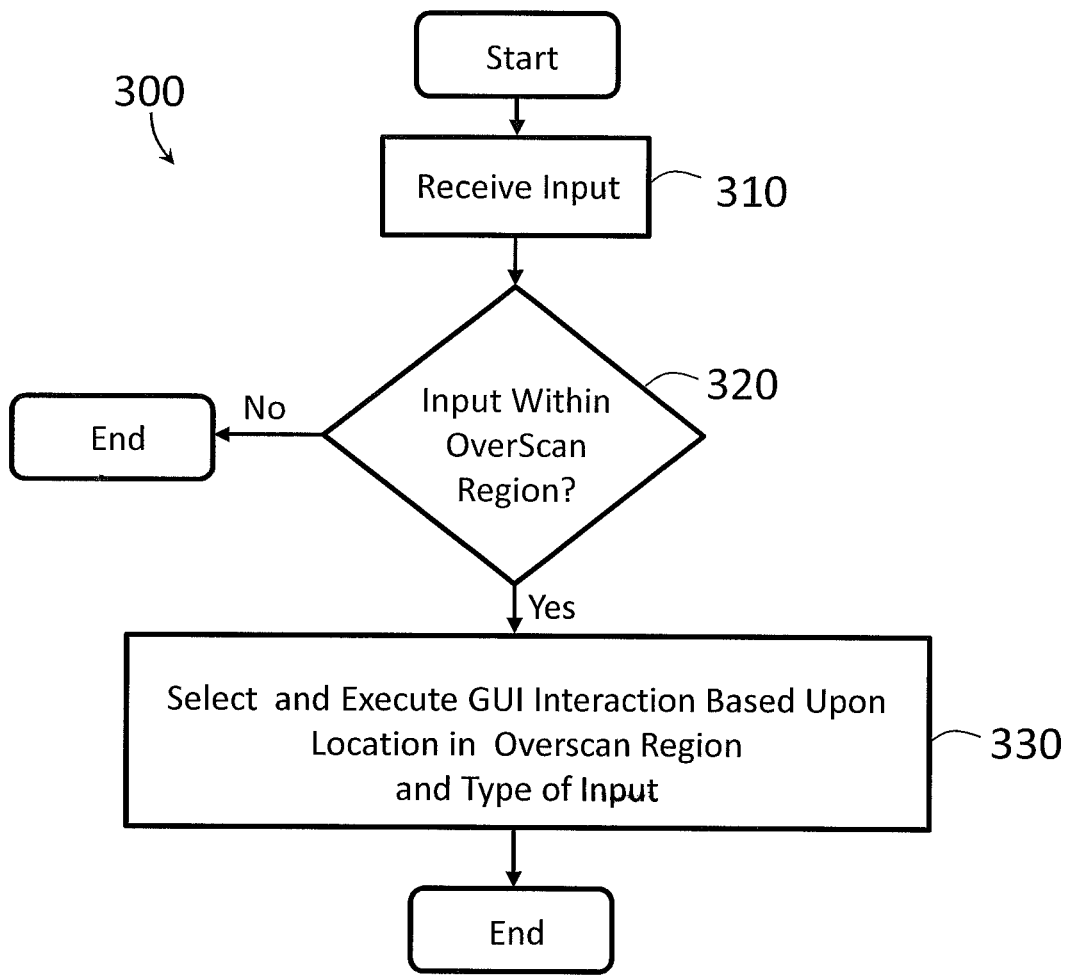
FIG. 3 is a flowchart of an example of an interaction process for selecting a user interface interaction for user input within an overscan region.

FIG. 3 is a flowchart of an example of an interaction process 300 for initiating a GUI interaction in response to user input within an overscan region. In some implementations, the process 300 illustrated in FIG. 3 may be performed by, for example, the display device 1 of FIGS. 1 and 2. A contact input is received at the display device 1 (310). A determination is made whether the received contact input was received within the overscan region 11 (320). If it is determined that the received contact input was not received within the overscan region 11, then the process 300 ends. In some implementations, when the contact input is received within the display region and not within the overscan region, processing of the contact input may occur using standard or conventional touchscreen contact input processing.

However, if it is determined that the received contact input was received within the overscan region 11, then a Graphic User Interface (GUI) interaction is selected and executed based on the type of contact input that was received and/or based on a location in the overscan region that received the contact input (330). Notably, engagement/contact inputs received within the overscan region 11 are also referred to as overscan inputs, and engagement/contact inputs received within the display region 12 are also referred to as display region inputs. After the GUI interaction has been selected the process 300 may end.

A GUI interaction, as described herein, refers to a discrete set of processes or instructions executed by one or more computer processors within the display device 1 or within computer processors communicatively coupled to the display device 1 that cause a particular change in the display of the display device 1 by invoking images in the display region 12 (i.e., displaying images that previously were not displayed) and/or manipulating already displayed images within the display region 12 (e.g., moving, modifying, and/or deleting displayed images) responsive to user engagement. The imagery displayed may also change to communicate new information to the user, separate from (or in response to) user interaction. While the implementations disclosed herein focus on GUI interactions being selected and executed responsive to overscan inputs, other types of interactions that are not related to displayed images may be triggered in response to overscan inputs. For example, an overscan input type corresponding to a loop followed by a horizontal or a vertical slide (where the loop and the slide occur sequentially while maintaining continuous or substantially continuous contact/engagement with the overscan region 11) located in portion 11c of the overscan region 11 may trigger a change in audio volume of the display device. For example, the direction of the slide may be used to determine if the volume should be increased or decreased (e.g., a bottom to top vertical slide results in an increase in volume and a top to bottom vertical slide results in a decrease in volume) and, optionally, an amount of volume change can be determined based on the length of the slide (e.g., a 1 inch slide up results in a smaller increase in volume than a 3 inch slide up).

Figure 4:
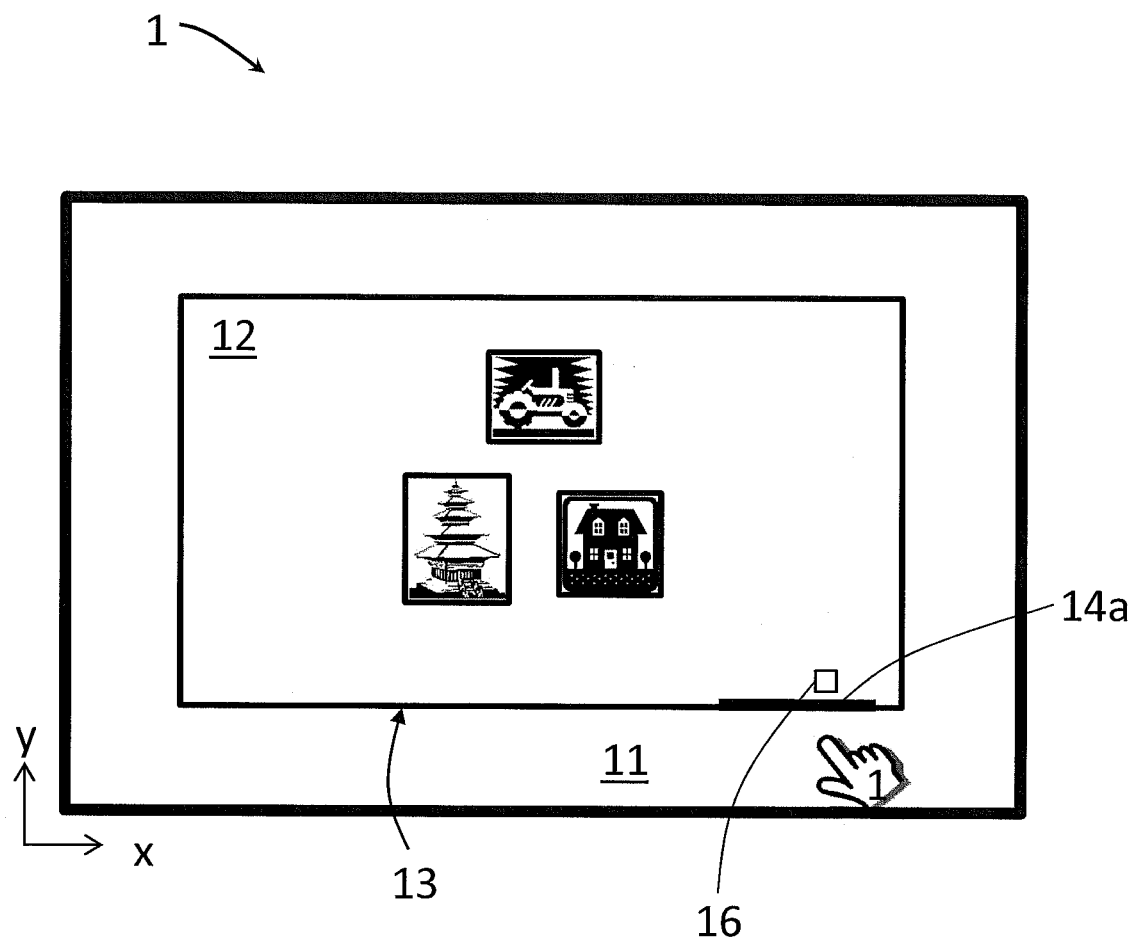
FIGS. 4-6 are diagrams of a display device configured to receive contact inputs within portions of an overscan region for display of and interaction with a viewer.

FIG. 4 is a diagram of a display device 1 configured to receive contact inputs within portions of an overscan region 11 for display and interaction of a viewer. In some implementations, a display device 1 may include a viewer 14a selectable by a user based upon contact input provided within the overscan region 11. For example, the viewer 14a may be displayed to the user in response to the user providing contact input in a portion of the overscan region 11 corresponding to a location of the viewer 14a and assigned to the viewer 14a. An indication of the location of the viewer 14a may be provided to the user along the interface boundary 13 as a representation of an uppermost boundary of the viewer 14a. For example, the uppermost boundary of the viewer 14a may extend slightly into the display region 12. Here, the viewer 14a would have been previously docked at this location, as detailed below.

Notably, the portion of the overscan region 11 assigned to the viewer 14a may be, for example, a portion of the overscan region 11 adjacent to a boundary (e.g., a vertical or a horizontal boundary) of the viewer 14a displayed in the display region 12 closest to the overscan region 11. In some implementations, the horizontal or vertical length of this portion of the overscan region may be equal to the corresponding horizontal or vertical length of the boundary of the viewer 14a. In other implementations, the horizontal or vertical length of this portion of the overscan region may be greater than or less than the horizontal or vertical length, respectively of the boundary of the viewer 14a by, for example, a predetermined amount.

In FIG. 4, the user may provide a contact input (1) at a location corresponding vertically along the y-axis direction below the uppermost boundary of the viewer 14a within the overscan region 11. Upon initial contact of the contact input (1) within the overscan region 11, a contact input location indicator 16 may be displayed within the display region 12 to indicate to the user receipt of the contact input (1). The contact input location indicator 16 may be vertically aligned along the y-axis direction with the location of the received contact input (1) within the overscan region 11 (e.g., the location indicator 16 may have the same or approximately the same x-coordinate as the contact input). For example, the contact input (1) may include a single touch contact input within the overscan region 11. Alternatively, the contact input (1) may include a swiping contact input received by the overscan region 11 to initiate opening of the viewer 14a. Here, the swiping contact input would begin within the overscan region 11 and continue along the y-axis direction within the overscan region 11. In some implementations, the swipe may extend into the display region 12 to create the illusion that the user is sliding the viewer 14a up from its docked position into the display region 12.

Figure 5:
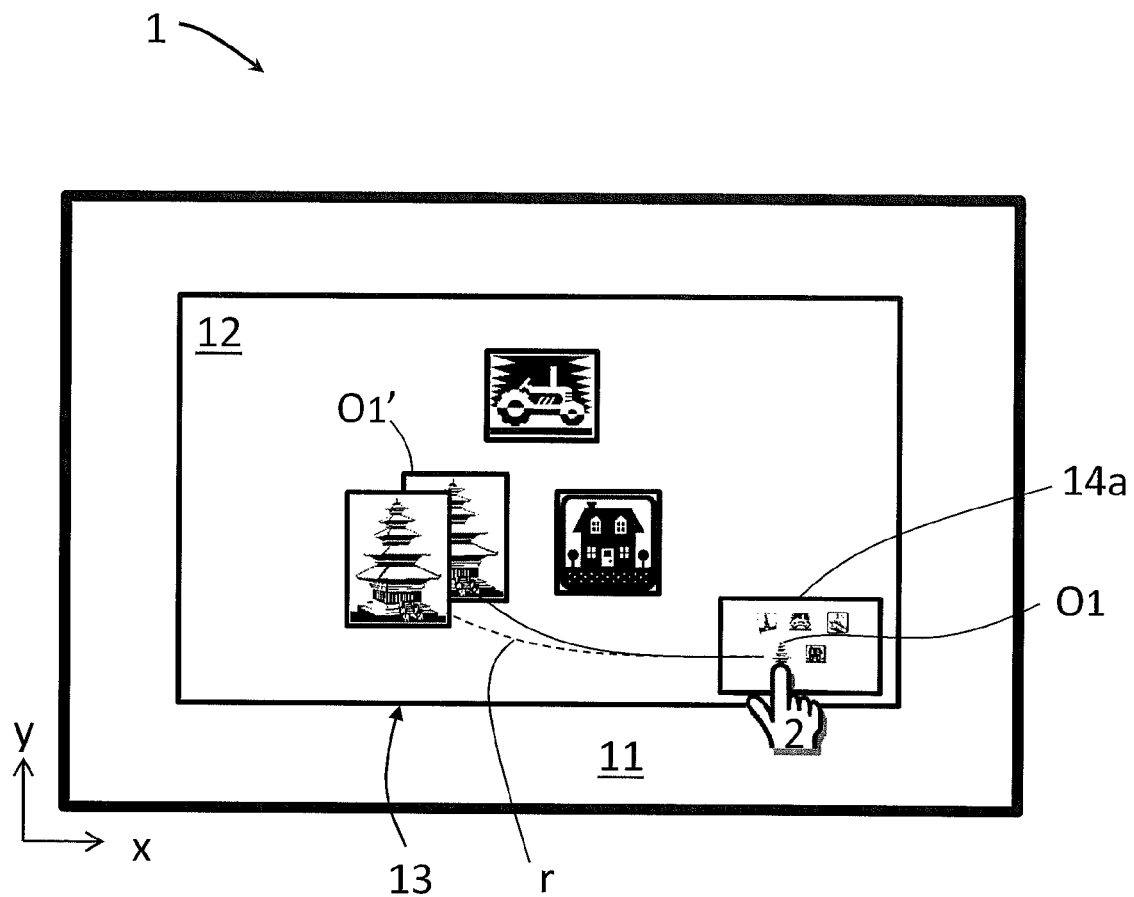

Upon receiving the contact input (1) in the location of the overscan region 11 assigned to the viewer 14a, the viewer 14a may open by, for example, sliding along the y-axis direction from the interface boundary 13 and into the display region 12, as shown in FIG. 5. Once the viewer 14a has opened, the user may select a representative image object displayed in the viewer 14a in order to manipulate the corresponding image object displayed on the display region 12. For example, a representative image object $O_1$ displayed in the viewer 14a may be selected by providing contact input (2) to the viewer 14a, then an indicator 'r' is displayed overlying the viewer 14a and the display region 12 connecting the representative image object $O_1$ displayed on the viewer 14a and the corresponding image object $O_1'$ displayed on the display region 12. Translational motion of the contact input (2) provided by the user regarding the representative image object $O_1$ within the viewer 14a may result in corresponding translation motion (i.e., translational manipulation) of the corresponding image object $O_1'$ within the display region 12, and the indicator 'r' would follow the relative movements of the representative image object $O_1$ and the corresponding image object $O_1'$. Once the user has completed the translational motion of the contact input (2) and removed the contact input (2) within the viewer 14a, the indicator 'r' will no longer be displayed and the corresponding image object $O_1'$ will remain fixed within the display region 12.

Figure 6:
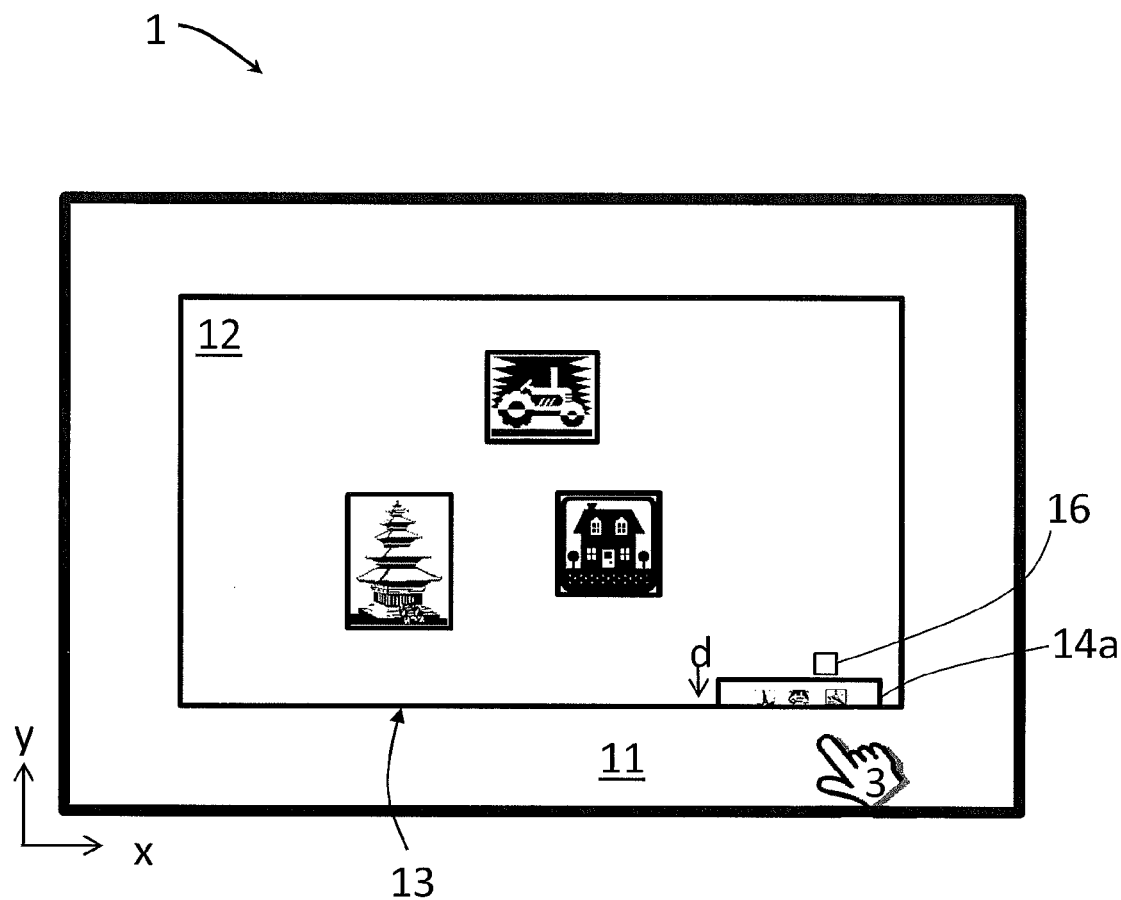

In some implementations, image objects may include various different items. For example, the image objects may include one or more of textual documents, substantially still images, substantially moving images, maps, publications, video recordings, substantially live video signals, visualized voice recordings, substantially live visualized voice signals, internet web pages, and internet websites. In some implementations, once the user has completed interaction with the viewer 14a, the user may close the viewer 14a by providing contact input (3) within the portion of the overscan region 11 assigned to the viewer 14a, as shown in FIG. 6. As with opening the viewer 14a, the contact input (3) may generate display of the contact input location indicator 16 within the display region 12 indicating to the user receipt of the contact input (3). For example, the contact input (3) may include a single touch contact input within the overscan region 11. Alternatively, the contact input (3) may include a swiping contact input received by the overscan region 11 to initiate closing of the viewer 14a. Here, the swiping contact input would begin within the overscan region 11 and continue along the y-axis direction within the overscan region 11, but along a direction opposite to that in which the viewer 14a was opened (e.g., the swipe may be a vertical swipe beginning at a location closer to the viewer 14a and ending at a location farther away from the viewer 14a). In another implementation, the swiping contact input may begin within the display region 12 at a location overlying the display of the viewer 14a and end at a location within the overscan region such that the user appears to be touching the viewer 14a and sliding the viewer 14a into its docked position as if it were a real, rather than virtual, object.

Upon receiving the contact input (3), the viewer 14a may, for example, transition into its closed or docked state by sliding along the y-axis in the direction 'd' from the display region 12 toward the interface boundary 13. As is shown in FIG. 4, once the viewer 14a is closed, an indication of the location of the viewer 14a may be provided to the user along the interface boundary 13 as a representation of an uppermost boundary of the viewer 14a. For example, the uppermost boundary of the viewer 14a may extend slightly into the display region 12 to show a docked position of the viewer 14a.

Figure 7:
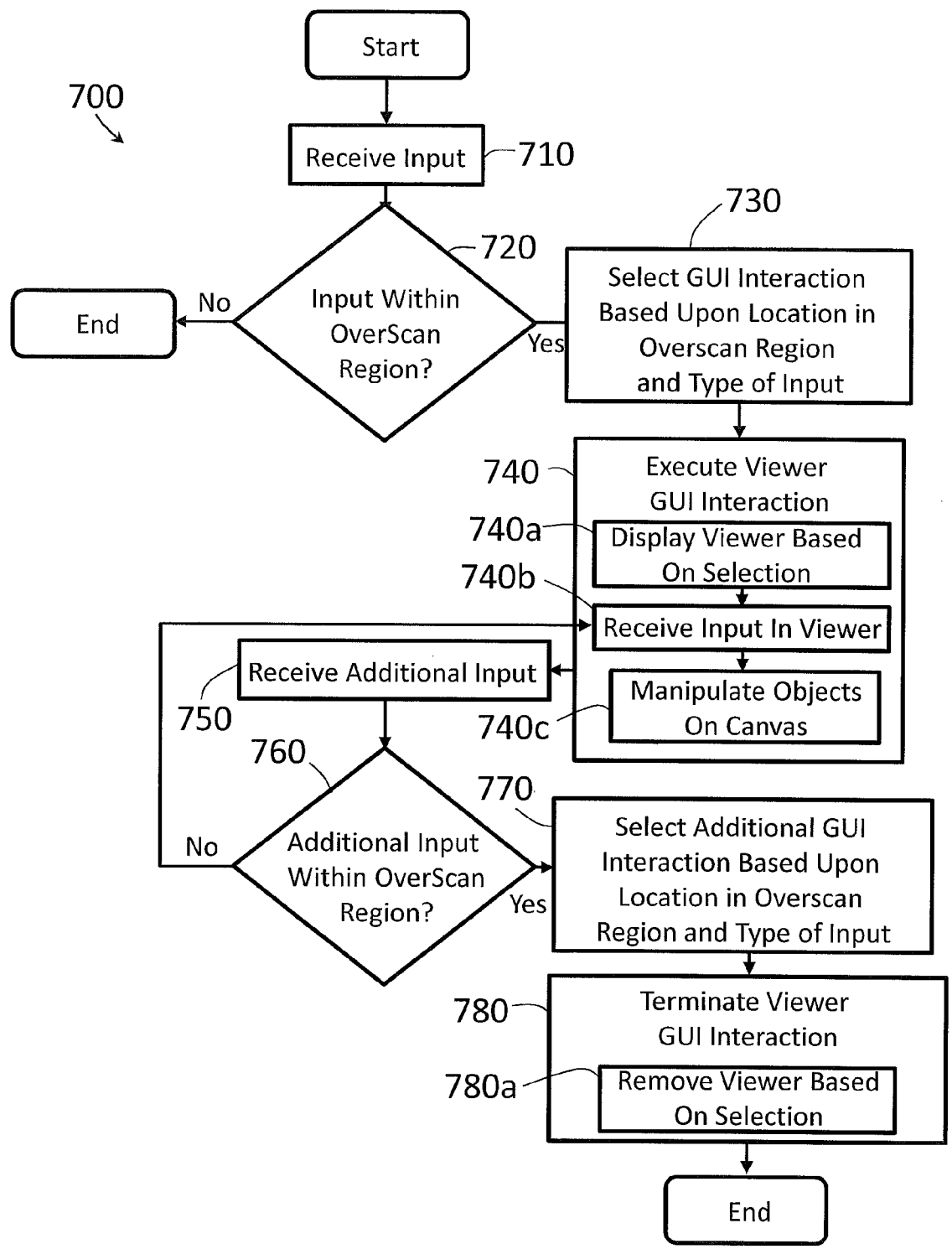
FIG. 7 is a flowchart of an example of an interaction process for selecting a user interface interaction for display of and interaction with a viewer.

FIG. 7 is a flowchart of an example of an interaction process 700 for displaying and enabling interaction with a viewer. In some implementations, the process 700 illustrated in FIG. 7 may be performed by, for example, the display device 1 of FIGS. 1 and 2.

A contact input is received at the display device 1 (710). A determination is made whether the received contact input is an input at a location within the overscan region 11 (720). If the received contact input is not an input at a location within the overscan region 11, then process 700 ends. In some implementations, when the contact input is received within the display region 12 and not within the overscan region 11, processing of the contact input may occur using standard or conventional touchscreen contact input processing.

However, if the received contact input corresponds to input received within the overscan region 11, then a GUI interaction is selected based on the location of the contact input within the overscan region 11 and the type of contact input (730). In this example, the viewer GUI interaction is selected based upon a determination that the contact input is received at a location within the portion of the overscan region 11 assigned to the viewer 14a and based upon a determination that the contact input corresponds to a type of input associated with the viewer GUI interaction (e.g., the contact input corresponds to a vertical swipe beginning at a location in the overscan region farther away from the viewer 14a and ending at a location closer to the viewer 14a, which is a type of contact input previously associated with the viewer GUI interaction).

The viewer GUI interaction is executed (740). The execution of the viewer GUI interaction may include displaying/opening the viewer (740a) (e.g., by sliding the viewer out of its docked state), receiving additional contact input from the user within the displayed viewer 14a (740b), and manipulating image objects displayed on the canvas in response to and based on the additional contact input received within the displayed viewer 14a (740c).

Additional contact input may be received at locations of the touchscreen display that are outside of the displayed viewer 14a (750). A determination is made whether the received additional contact input was received outside of the displayed viewer 14a but within the overscan region 11 (760). If it is determined that the received additional contact input was received outside of the displayed viewer 14a and was not received within the overscan region 11, then the process 700 returns to operation 740b to await further input from the user. In some implementations, when the additional contact input is received within the display region (and outside of the displayed viewer 14a) and not within the overscan region, processing of the contact input may occur using standard or conventional touchscreen contact input processing.

However, if it is determined that the received additional contact input was received outside of the displayed viewer 14a but within the overscan region 11, then an additional Graphic User Interface (GUI) interaction may be selected based upon a location in the overscan region that received the additional contact input and based on the type of contact input that was received within the overscan region (770). In this example, a terminate viewer GUI interaction is selected based upon a determination that the contact input is received within the location of the overscan region 11 assigned to the viewer 14a and based upon a determination that the contact input corresponds to a type of input associated with the terminate viewer GUI interaction (e.g., the contact input corresponds to a vertical swipe beginning at a location in the overscan region closer to the viewer 14a and ending at a location farther away from the viewer 14a, which is a type of contact input previously associated with the terminate viewer GUI interaction).

Execution of the terminate viewer GUI interaction occurs (780). The execution of the terminate viewer GUI interaction results in the viewer being removed (i.e., closed or docked) (780a), and process 700 ends.

Figure 8:
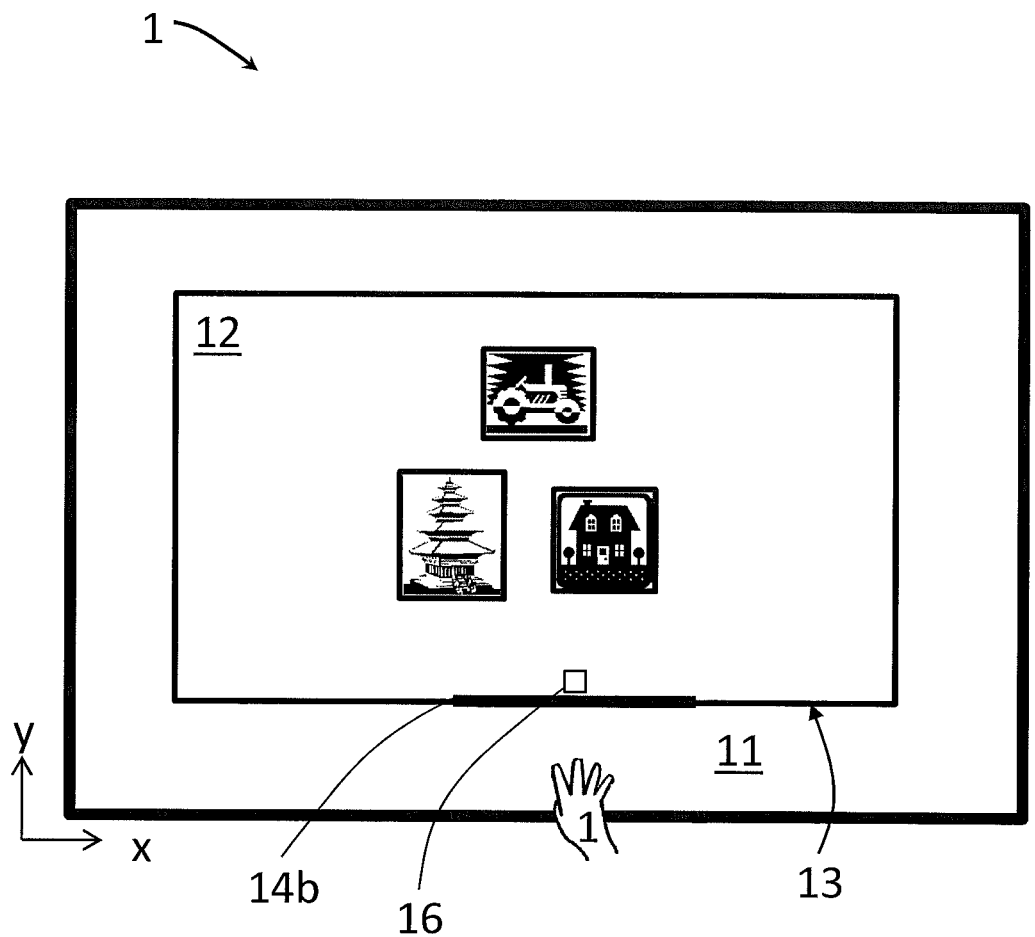
FIGS. 8-10 are diagrams of a display device configured to receive contact inputs within portions of an overscan region for display of and interaction with a keyboard.

FIG. 8 is a diagram of a display device 1 configured to leverage the overscan region to enable display of a virtual keyboard and user interaction with the keyboard. In some implementations, a display device 1 may include a keyboard 14b selectable by a user in response to and based upon contact input being provided by the user within the overscan region 11. For example, the keyboard 14b may be displayed to the user by providing contact input within a portion of the overscan region 11 assigned to the keyboard 14b and that corresponds to a location of the keyboard 14b. An indication of the location of the keyboard 14b may be provided to the user along the interface boundary 13 as a representation of an uppermost boundary of the keyboard 14b. For example, the uppermost boundary of the keyboard 14b may extend slightly into the display region 12. Here, the keyboard 14b would have been previously docked at this location, as detailed below.

Notably, the portion of the overscan region 11 assigned to the keyboard 14b may be, for example, a portion of the overscan region 11 adjacent to a boundary (e.g., a vertical or a horizontal boundary) of the keyboard 14b displayed in the display region 12 closest to the overscan region 11. In some implementations, the horizontal or vertical length of this portion of the overscan region may be equal to the corresponding horizontal or vertical length of the boundary of the keyboard 14b. In other implementations, the horizontal or vertical length of this portion of the overscan region may be greater than or less than the horizontal or vertical length, respectively of the boundary of the keyboard 14b by, for example, a predetermined amount.

In FIG. 8, the user may provide a contact input (1) at a location corresponding vertically along the y-axis direction from the uppermost boundary of the keyboard 14b within the overscan region 11. Upon initial contact of the contact input (1) within the overscan region 11, a contact input location indicator 16 may be displayed to the user within the display region 12 indicating receipt of the contact input (1). The contact input location indicator 16 may be vertically aligned along the y-axis direction with the location of the received contact input (1) within the overscan region 11 (e.g., the location indicator 16 may have the same or approximately the same x-coordinate as an approximate center of the contact input). For example, the contact input (1) may include a four-touch contact input within the overscan region 11. This four-touch contact input may replicate the "home row" position of fingers when using a keyboard. Alternatively, the contact input (1) may include a single contact input within the overscan region 11. In addition, the contact input (1) may include a swiping contact input of a single contact input received by the overscan region 11 to initiate opening of the keyboard 14b. Here, the swiping contact input would initiate within the overscan region 11 and continue along the y-axis direction within the overscan region 11. In some implementations, the swipe may extend into the display region 12 to create the illusion that the user is sliding the keyboard 14b up from its docked position into the display region 12.

Figure 9:
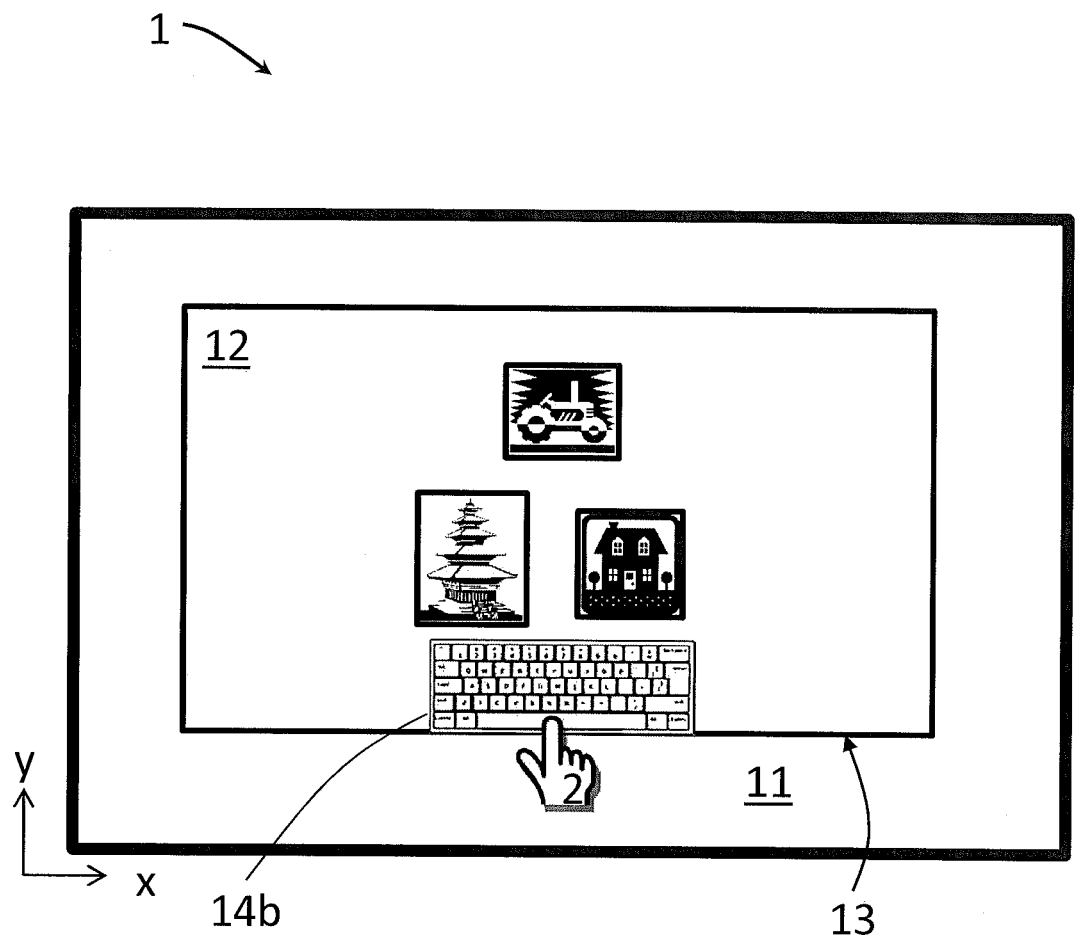

Upon receiving the contact input (1) in the location of the overscan region 11 assigned to the keyboard 14b, the keyboard 14b may open by, for example, sliding along the y-axis direction from the interface boundary 13 and into the display region 12, as shown in FIG. 9. Once the keyboard 14b has opened, the user may annotate individual image objects displayed in the display region 12. For example, an image object $O_1$ displayed in the display region 12 may be selected and individual characters may be selected (2) from the keyboard 14b by the user. Then, the selected characters may be overlaid or embedded within the selected image object $O_1$.

Figure 10:
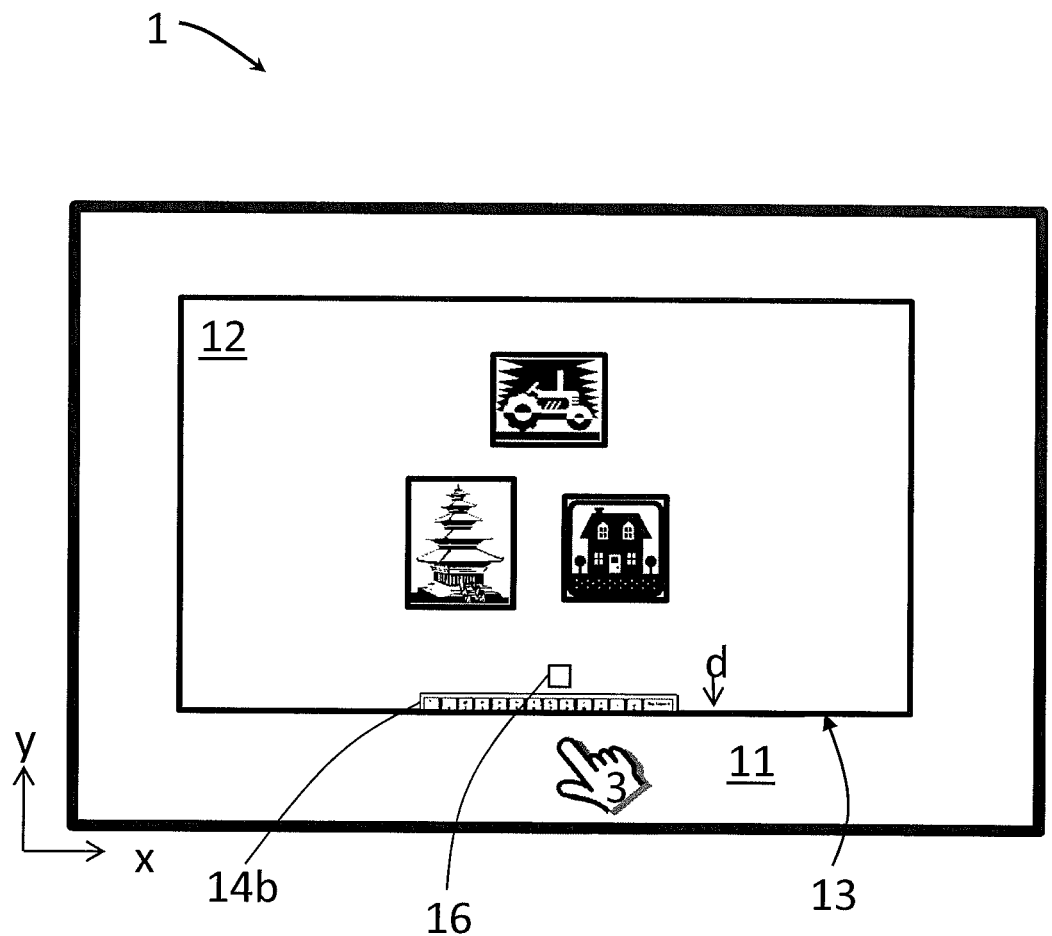

In some implementations, once the user has completed selecting and annotating the image objects displayed on the display region 12, the user may close the keyboard 14b by providing contact input (3) within the portion of the overscan region 11 assigned to the keyboard 14b, as shown in FIG. 10. As with opening the keyboard 14b, the contact input (3) may cause display of the contact input location indicator 16 within the display region 12 indicating to the user receipt of the contact input (3). For example, the contact input (3) may include a single touch contact input within the overscan region 11. Alternatively, the contact input (3) may include a swiping contact input received by the overscan region 11 to initiate closing of the keyboard 14b. Here, the swiping contact input would begin within the overscan region 11 and continue along the y-axis direction within the overscan region 11, but along a direction opposite to that in which the keyboard 14b was opened. opened (e.g., the swipe may be a vertical swipe beginning at a location closer to the keyboard 14b and ending at a location farther away from the keyboard 14b). In another implementation, the swiping contact input may begin within the display region 12 at a location overlying the display of the keyboard 14b and end at a location within the overscan region such that the user appears to be touching the keyboard 14b and sliding the keyboard 14b into its docked position as if it were a real, rather than virtual, object.

Upon receiving the contact input (3), the keyboard 14b may, for example, transition into its closed or docked position by sliding along the y-axis in the direction 'd' from the display region 12 toward the interface boundary 13. As is shown in FIG. 8, once the keyboard 14b is closed, an indication of the location of the keyboard 14b may be provided to the user along the interface boundary 13 as a representation of an uppermost boundary of the keyboard 14b. For example, the uppermost boundary of the keyboard 14b may extend slightly into the display region 12 to show a docked position of the keyboard 14b.

Figure 11:
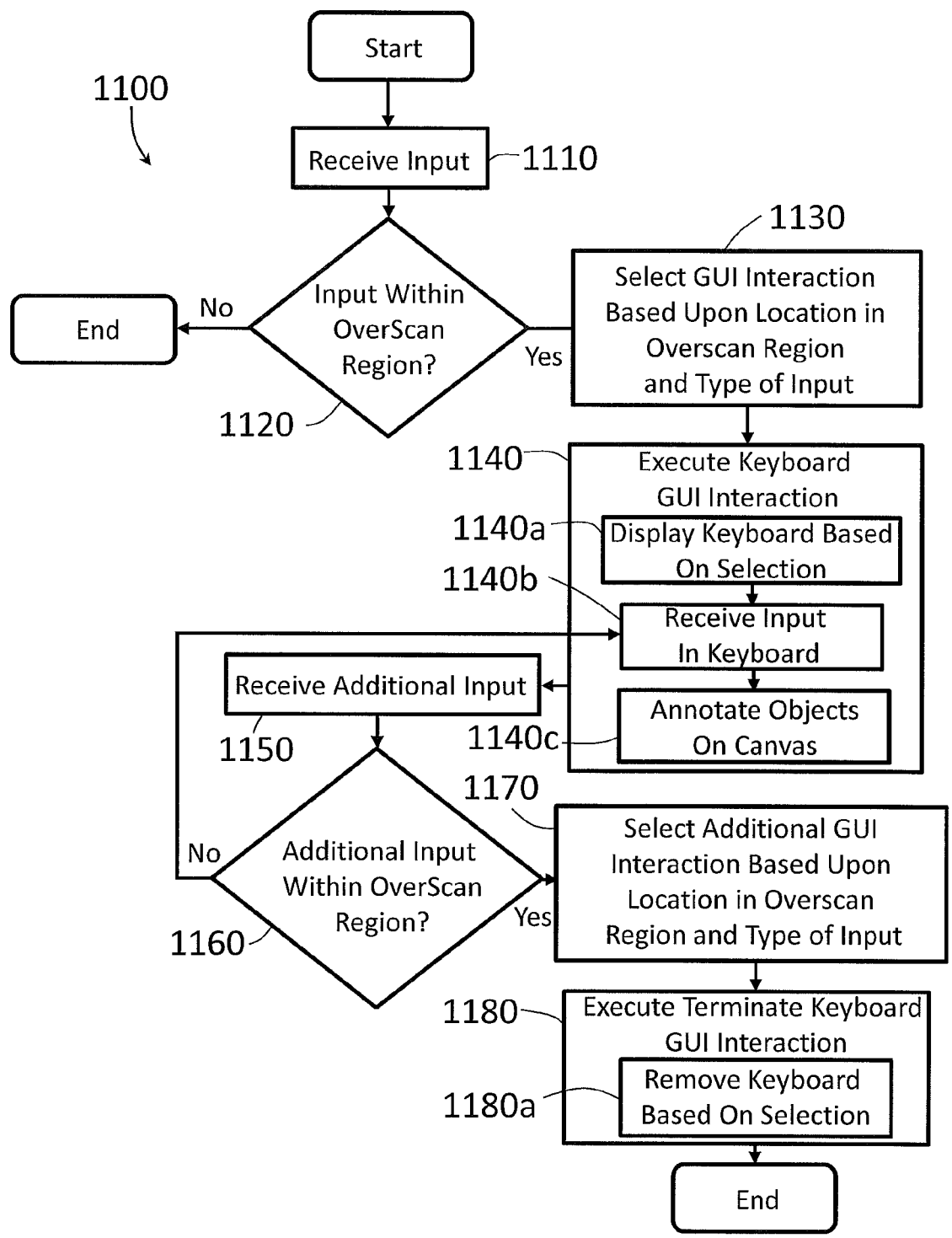
FIG. 11 is a flowchart of an example of an interaction process for selecting a user interface interaction for display of and interaction with a keyboard

FIG. 11 is a flowchart of an example of an interaction process 1100 for displaying and enabling interaction with a keyboard. In some implementations, the process 1100 illustrated in FIG. 11 may be performed by, for example, the display device 1 of FIGS. 1 and 2.

A contact input is received at the display device 1 (1110).

A determination is made whether the received contact input is an input at a location within the overscan region 11 (1120). If the received contact input is not an input at a location within the overscan region 11, then process 1100 ends. In some implementations, when the contact input is received within the display region 12 and not within the overscan region 11, processing of the contact input may occur using standard or conventional touchscreen contact input processing. However, if the received contact input corresponds to input received within the overscan region 11, then A GUI interaction is selected based on the location of the contact input within the overscan region 11 and the type of contact input (1130). In this example, the keyboard GUI interaction is selected based upon a determination that the contact input is received at a location within the portion of the overscan region 11 assigned to the keyboard 14b and based upon a determination that the contact input corresponds to a type of input associated with the keyboard GUI interaction (e.g., the contact input corresponds to a vertical swipe beginning at a location in the overscan region farther away from the keyboard 14b and ending at a location closer to the keyboard 14b, which is a type of contact input previously associated with the keyboard GUI interaction).

The keyboard GUI interaction is executed (1140).

The execution of the keyboard GUI interaction may include displaying/opening the keyboard (1140a) (e.g., by sliding the keyboard out of its docked state), receiving additional contact input from the user within the displayed keyboard 14b (1140b), and annotating image objects displayed on the canvas in response to and based on the additional contact input received within the displayed keyboard 14b (1140c).

Additional contact input may be received at locations of the touchscreen display that are outside of the displayed keyboard 14b (1150) A determination is made whether the received outside of the displayed keyboard 14b but within the overscan region 11 (1160). If it is determined that the received additional contact input was received outside of the displayed keyboard 14b and was not received within the overscan region 11, then the process 1100 returns to operation 1140b to await further input form the user. In some implementations, when the additional contact input is received within the display region (and outside of the displayed keyboard 14b) and not within the overscan region, processing of the contact input may occur using standard or conventional touchscreen contact input processing. However, if it is determined that the received additional contact input was received outside of the displayed keyboard 14b but within the overscan region 11, then an additional Graphic User Interface (GUI) interaction may be selected based upon a location in the overscan region that the received additional contact input and based on the type of contact input that was received within the overscan region 11 (1170). In this example, a terminate keyboard GUI interaction is selected based upon a determination that the contact input is received within the location of the overscan region 11 assigned to the keyboard 14b and based upon a determination that the contact input corresponds to a type of input associated with the terminate keyboard GUI interaction (e.g., the contact input corresponds to a vertical swipe beginning at a location in the overscan region closer to the keyboard 14b and ending at a location farther away from the keyboard 14b, which is a type of contact input previously associated with the terminate keyboard GUI interaction).

Execution of the terminate keyboard GUI interaction occurs (1180). The execution of the terminate keyboard GUI interaction results in the keyboard being removed (i.e., closed or docked) (1180a), and process 110 ends.

Figure 12:
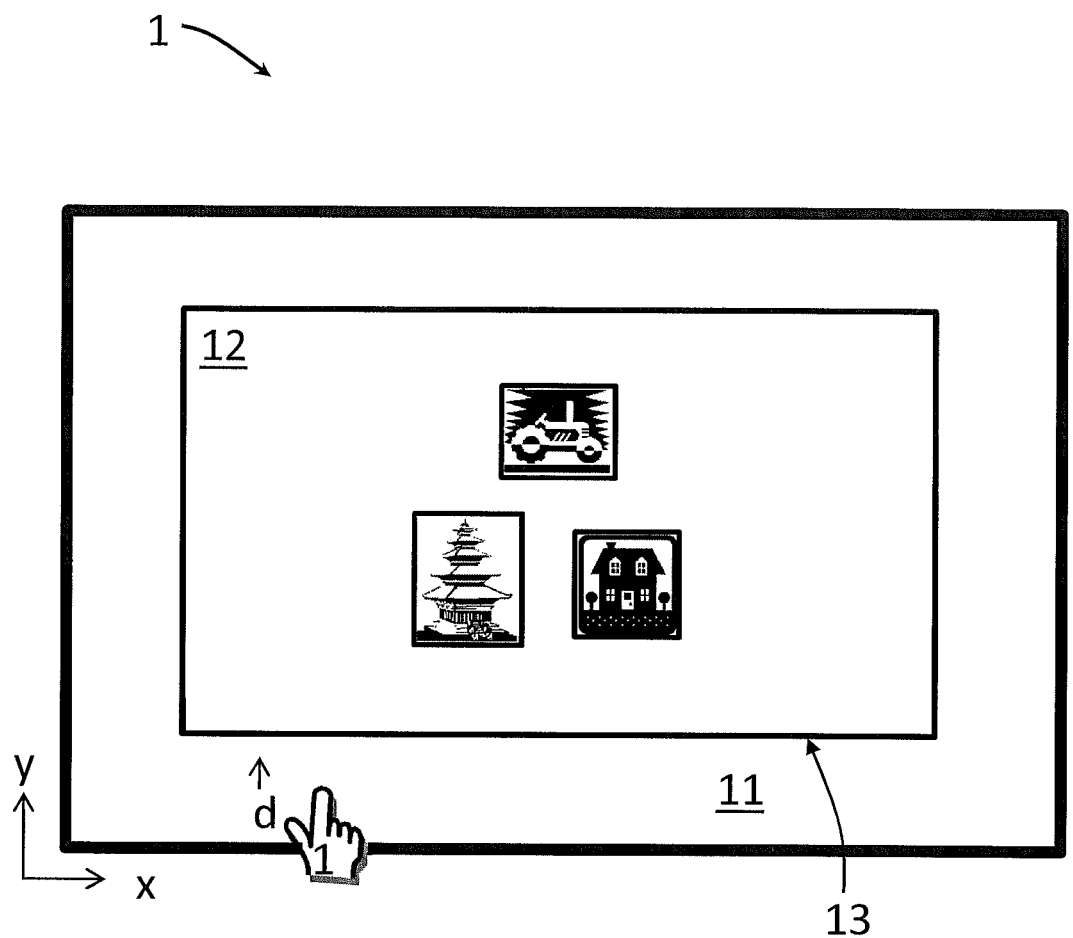
FIGS. 12-14 are diagrams of a display device configured to receive contact inputs within portions of an overscan region for display of and interaction with a menu.

FIG. 12 is a diagram of a display device 1 configured to leverage the overscan region to enable display of a menu and user interaction with the menu. In some implementations, a display device 1 may include a menu 14c that may be displayed to the user in response to the user providing contact input within the overscan region 11. For example, the menu 14c may be displayed to the user in response to the user providing contact input within a predetermined portion of the overscan region 11 that corresponds to the menu 14c. Unlike the portions of the overscan region that correspond to the viewer 14a and the keyboard 14b which have their locations identified to the user via a graphical element (e.g., a highlighted display boundary or segment within the display region adjacent to or along the interface boundary 13), the location of the portion of the overscan region 11 corresponding to the menu 14c may, in some implementations, not be visually signaled to the user via a graphical element and, therefore, may require that the user have knowledge ahead of time about the existence and location of the portion of the overscan region 11 selectable to interact with the menu 14c. For example, the menu 14c may be located to the far left contact input region 11c (in FIG. 2) of the overscan region 11. Of course, the portion of the overscan region 11 assigned to any of the viewer 14a, keyboard 14b, and/or menu 14c may be any of the contact input regions 11a-d or any portion of any of the contact input regions 11a-d, and may be user configurable.

In FIG. 12, the user may provide a contact input (1) at a location in the portion of the overscan region 11 assigned to the menu 14c. Upon initial contact of the contact input (1) within the portion of the overscan region 11 assigned to the menu 14c, opening of the menu 14c may be initiated. For example, the contact input (1) may include a swiping contact input of a single contact input received by the overscan region 11 to begin opening of the menu 14c. Here, the swiping contact input would initiate within the overscan region 11 and continue along the direction 'd' (y-axis direction) within the overscan region 11.

Figure 13:
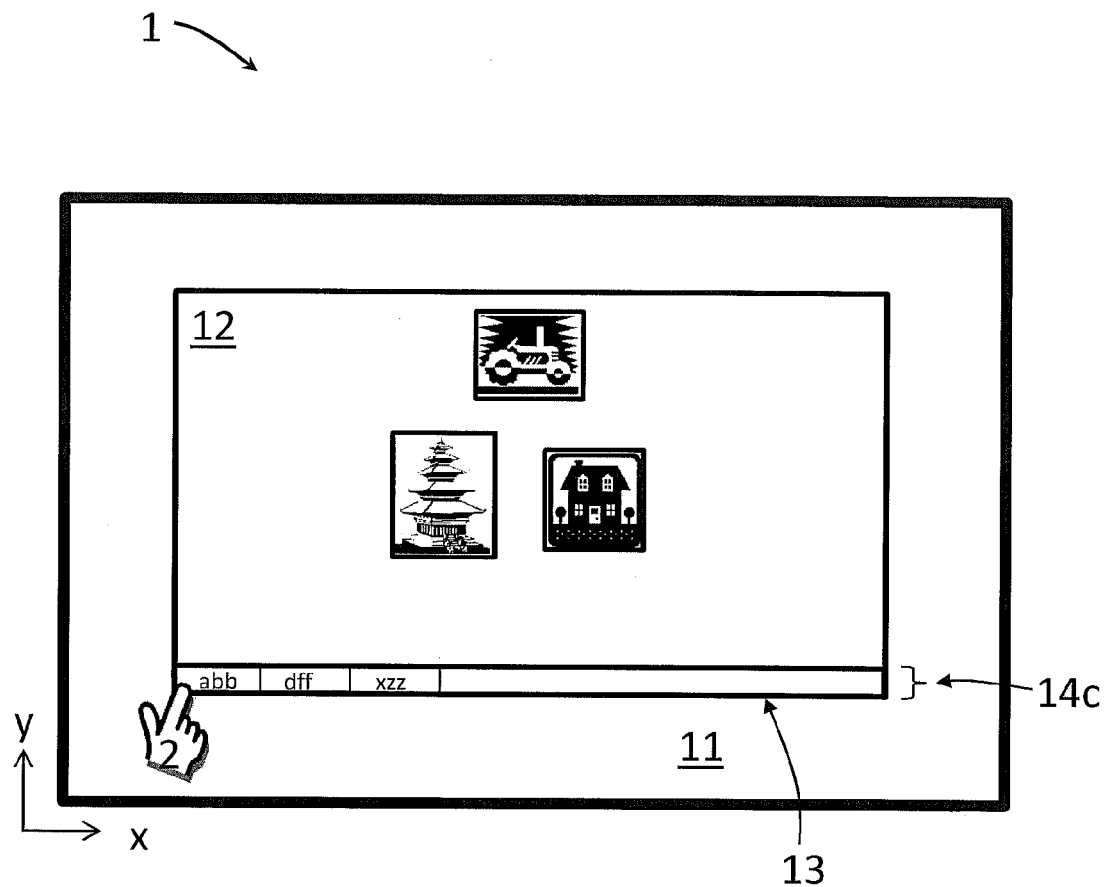
Figure 14:
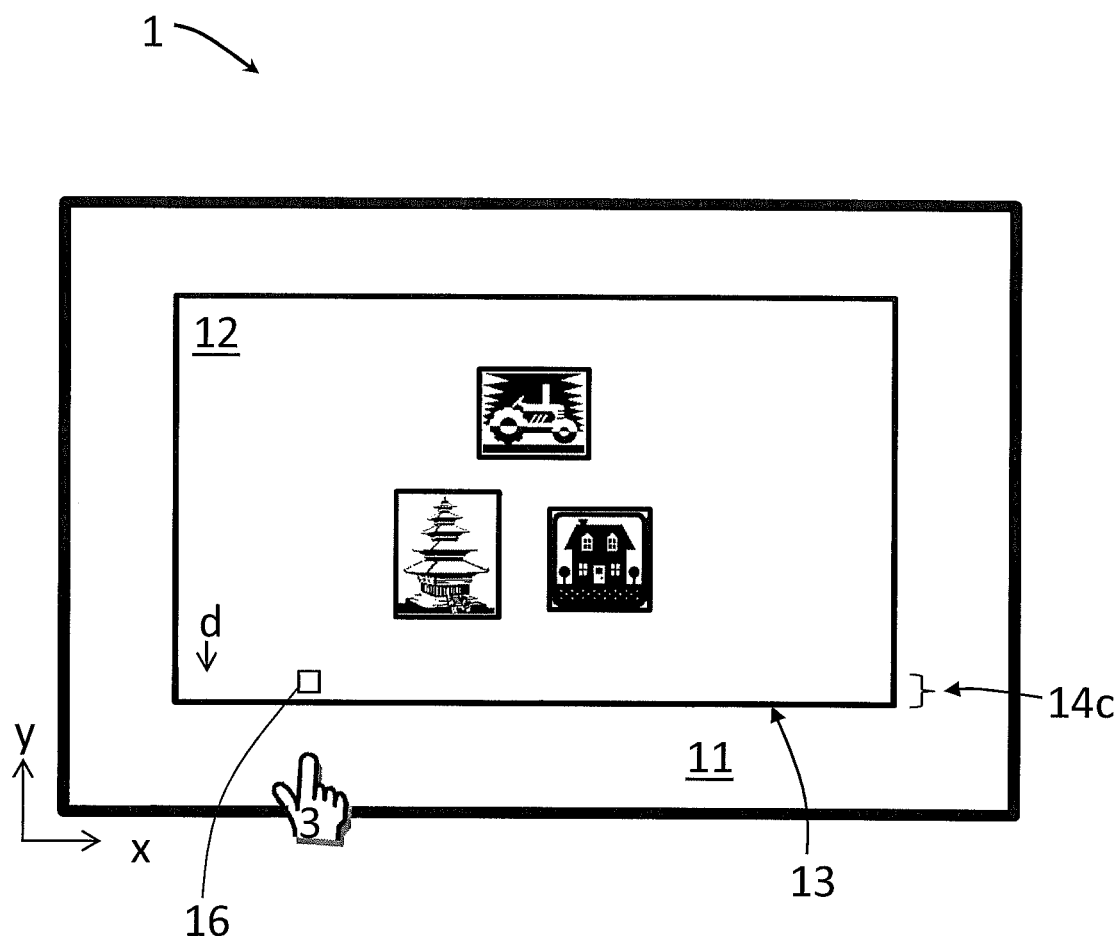

Upon receiving the contact input (1), the menu 14c may open by, for example, sliding in the y-axis direction from the interface boundary 13 and into the display region 12, as shown in FIG. 13. Once the menu 14c has opened, the user may select (2) various menu items within the menu 14c to perform various functions that may include, for example, manipulating the camera view or the image objects displayed in the display region 12.

Once the user has completed selecting the menu items, the user may close the menu 14c by providing contact input (3) within the portion of the overscan region 11 assigned to the menu 14c, as shown in FIG. 12. As with opening the viewer 14a and the keyboard 14b, the contact input (3) may cause display of the contact input location indicator 16 within the display region 12 indicating to the user receipt of the contact input (3). For example, the contact input (3) may include a single touch contact input within the overscan region 11. Alternatively, the contact input (3) may include a swiping contact input received by the overscan region 11 to initiate closing of the menu 14c. Here, the swiping contact input would begin within the overscan region 11 and continue along the y-axis direction within the overscan region 11, but along a direction opposite to that in which the menu 14c was opened. Upon receiving the contact input (3), the menu 14c may close along the y-axis direction 'd' from the display region 12 toward the interface boundary 13.

Figure 15:
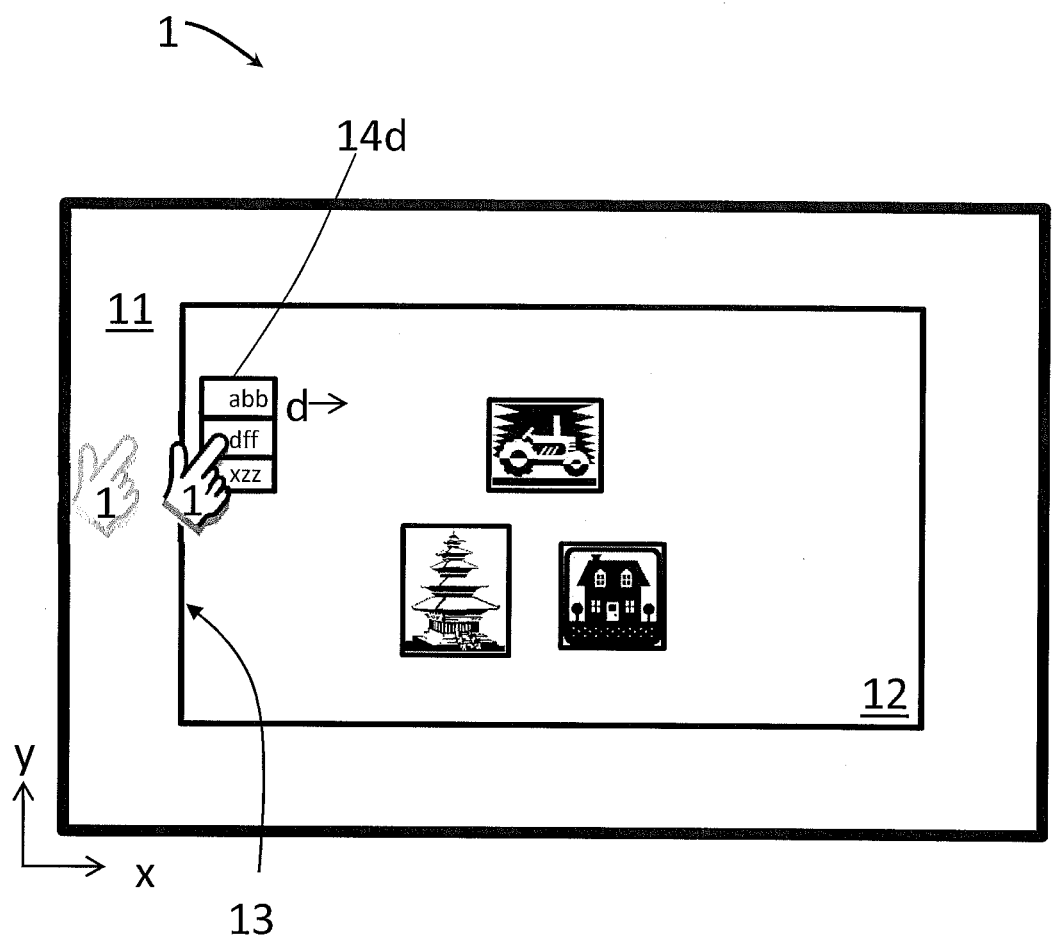
FIGS. 15-18 are diagrams of a display device configured to receive contact inputs within portions of an overscan region for display of and interaction with another menu.

FIG. 15 is a diagram of a display device 1 configured to receive contact inputs within portions of an overscan region 11 to enable the display of an additional menu and user interaction with the additional menu. In some implementations, a display device 1 may include a menu 14d that may be displayed to the user in response to the user providing contact input within the overscan region 11. For example, the menu 14d may be provided to the user in response to the user providing contact input within a predetermined portion of the overscan region 11 that corresponds to the menu 14d. Unlike the portions of the overscan region 11 that correspond to the viewer 14a and the keyboard 14b, which have their locations identified to the user via graphical element (e.g., a highlighted display boundary or segment within the display region adjacent to or along the interface boundary 13), the location of the portion of the overscan region 11 corresponding to the menu 14d may, in some implementations, not be visually signaled to the user via a graphical element and, therefore, may require that the user have knowledge ahead of time about the existence and location of the portion of the overscan region 11 selectable to interact with the menu 14d. For example, the menu 14d may be located along the contact input region 11d (in FIG. 2) of the overscan region 11. Of course, the portion of the overscan region 11 assigned to any of the viewer 14a, keyboard 14b, and/or menu 14c may be along any of the contact input regions 11a-d, may be user configurable.

In FIG. 15, the user may provide a contact input (1) at a location in the portion of the overscan region 11 assigned to the menu 14d. Upon initial contact of the contact input (1) within the portion of the overscan region 11 assigned to the menu 14d, opening of the menu 14d may be initiated. For example, the contact input (1) may include a swiping contact input received by the overscan region 11 to initiate opening of the menu 14d. Here, the swiping contact input would begin within the overscan region 11, at contact input (1), and continue, at contact input (1') along the direction 'd' (x-axis direction) within the display region 12.

Figure 16:
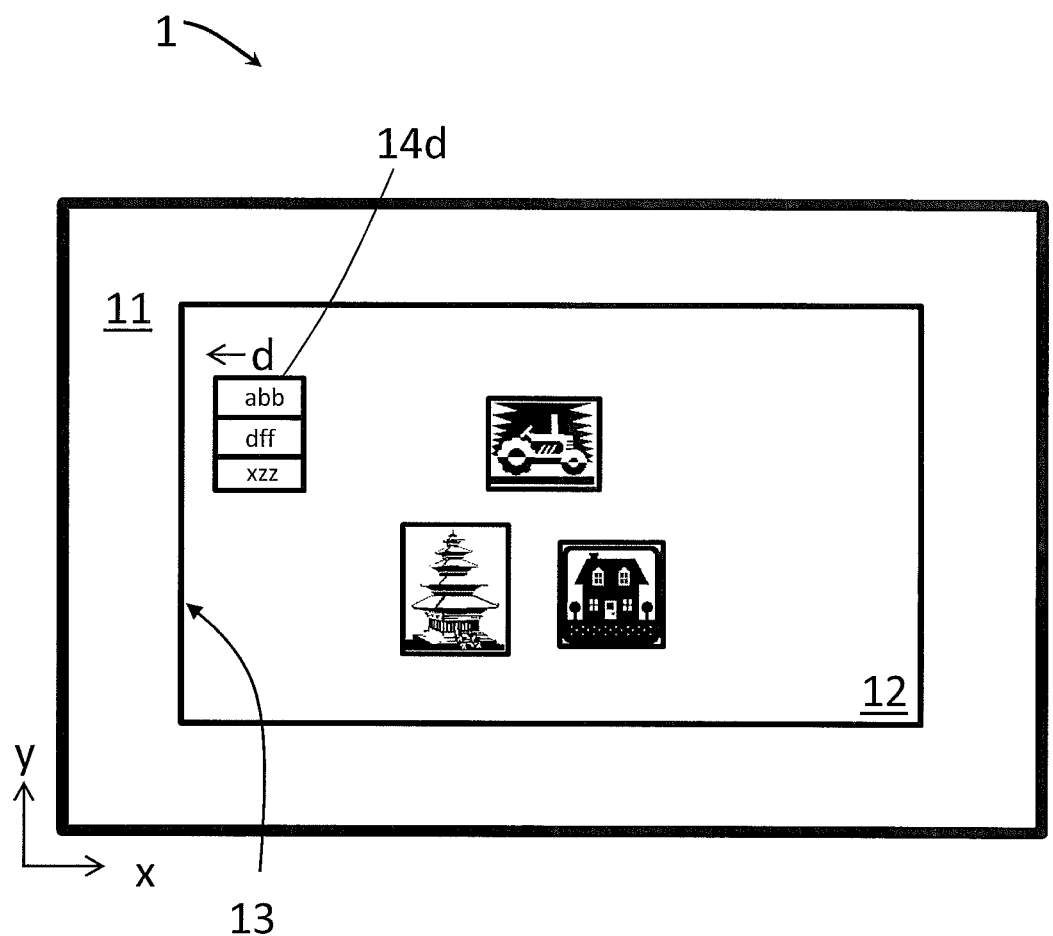
Figure 17:
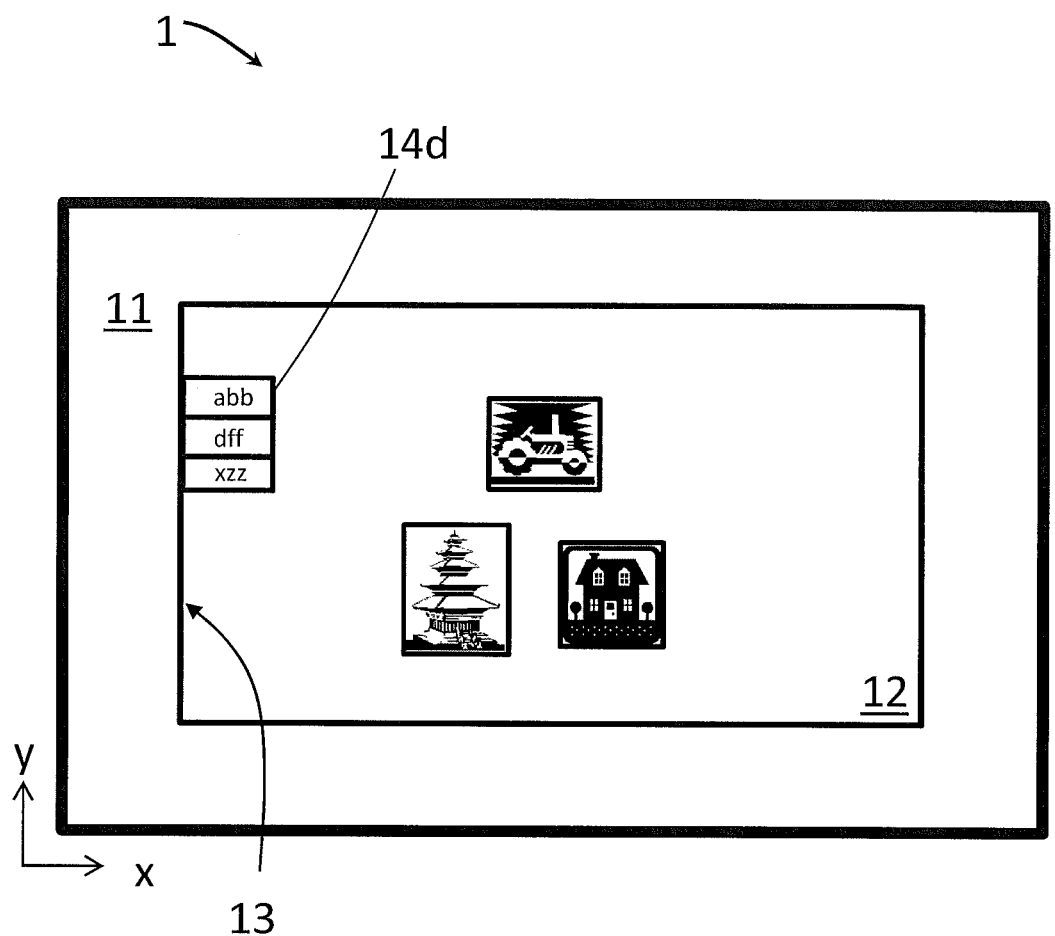

Once the menu 14d is opened within the display region 12 and the contact input (1') is no longer received, as shown in FIG. 16, the menu 14d may travel back toward the interface boundary 13 along the direction 'd'. Then, as shown in FIG. 17, the menu 14d may dock at the interface boundary 13.

Once the menu 14d has docked at the interface boundary 13, the user may select various menu items within the menu 14d to perform various functions that may include, for example, manipulating the camera view or the image objects displayed in the display region 12.

Figure 18:
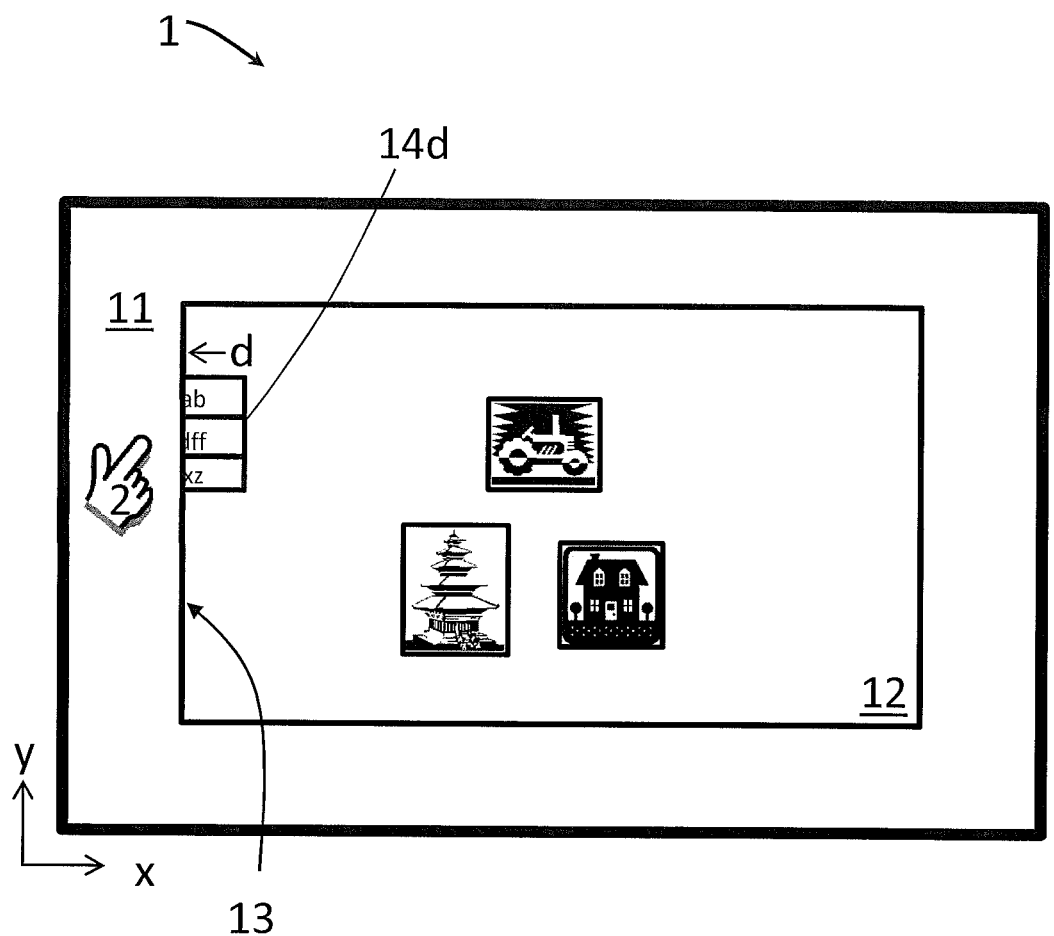

Once the user has completed selecting the menu items, the user may close the menu 14d by providing contact input (2) within the portion of the overscan region 11 assigned to the menu 14d, as shown in FIG. 18.

Alternatively, in some implementations, closing of the menu 14d may be determined by a lapsed amount time since the user provided input to the menu 14d. For example, the menu 14d may close after a preset amount of time has passed. Here, the implication is that the user no longer desires to interact or select any of the menu items of the menu 14d. Thus, the menu 14d may proceed to close.

Figure 19:
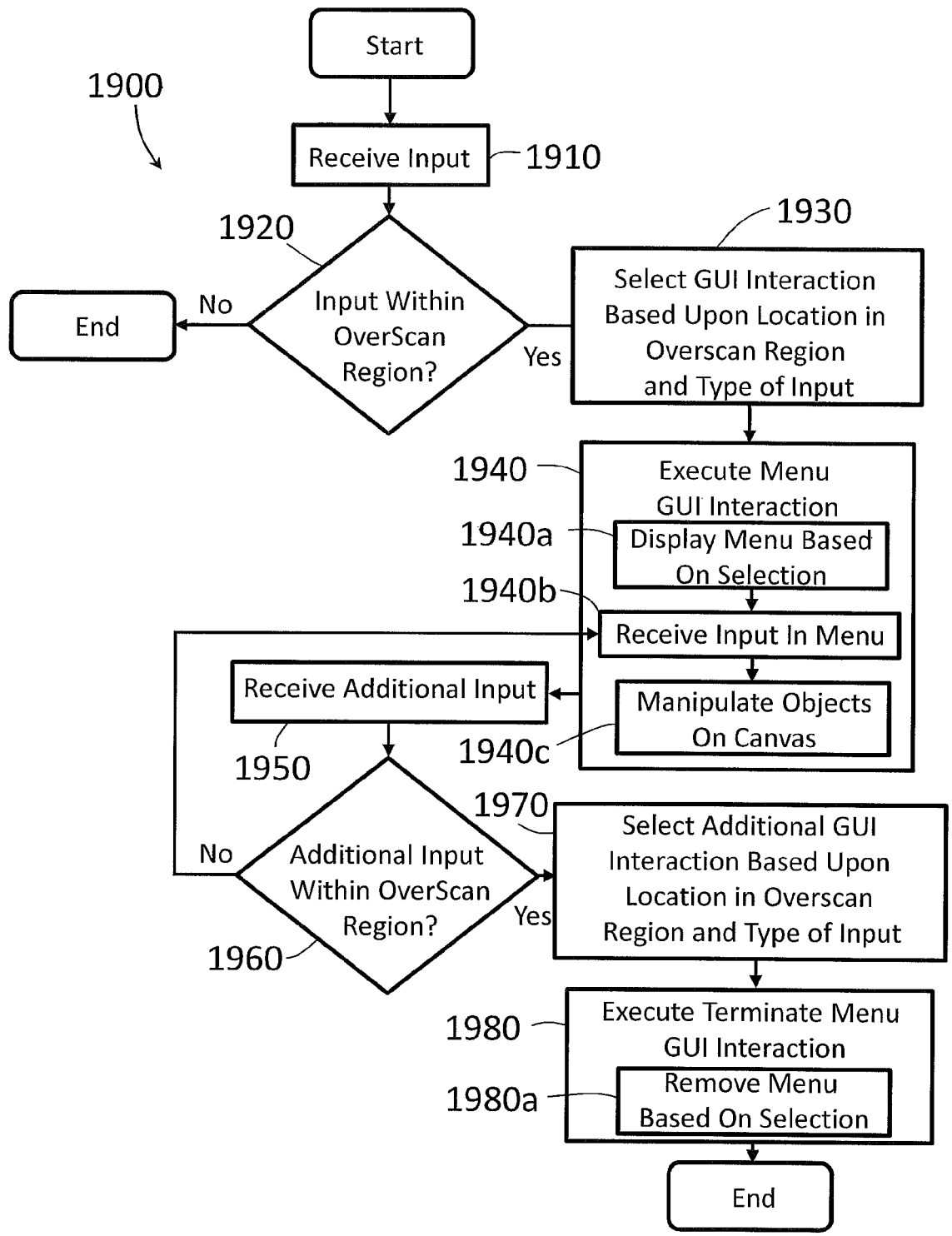
FIG. 19 is a flowchart of an example of an interaction process for selecting a user interface interaction for a menu.

FIG. 19 is a flowchart of an example of an interaction process 1900 for displaying and enabling interaction with a menu. In some implementations, the process 1900 illustrated in FIG. 19 may be performed by, for example, the display device 1 of FIGS. 1 and 2.

A contact input is received at the display device 1 (1910).

A determination is made whether the received contact input is an input at a location within the overscan region 11 (1920). If the received contact input is not an input at a location within the overscan region 11, then process 1900 ends. In some implementations, when the contact input is received within the display region 12 and not within the overscan region 11, processing of the contact input may occur using standard or conventional touchscreen contact input processing. However, if the received contact input corresponds to input received within the overscan region 11, then a GUI interaction is selected based on the location of the contact input within the overscan region 11 and the type of contact input (1930). In this example, the menu GUI interaction is selected based upon a determination that the contact input is received at a location within the portion of the overscan region 11 assigned to the menu 14d and based upon a determination that the contact input corresponds to a type of input associated with the menu GUI interaction (e.g., the contact input corresponds to a horizontal swipe beginning a location in the overscan region farther away from the menu 14d and ending at a location closer to the menu 14d, which is a type of contact input previously associated with the menu GUI interaction).

The menu GUI interaction is executed (1940).

The execution of the menu GUI interaction may include displaying/opening the menu (1940a) (e.g., by sliding the viewer out of its docked state), receiving additional contact input from the user within the displayed menu 14d (1940b), and manipulating image objects displayed on the canvas in response to and based on the additional contact input received within the displayed menu 14d (1940c).

Additional contact input may be received at locations of the touchscreen display that are outside of the displayed menu 14d (1950). A determination is made whether the received additional contact input was received outside of the displayed menu 14d but within the overscan region 11 (1960). If it is determined that the received additional contact input was received outside of the displayed menu 14d and was not received within the overscan region 11, then the process 1900 returns to operation 1940b to await further input from the user. In some implementations, when the additional contact input is received within the display region 12 (and outside of the displayed menu 14d) and not within the overscan region 11, processing of the additional contact input may occur using standard or conventional touchscreen contact input processing.

However, if it is determined that the received additional contact input was received outside of the displayed menu 14d but within the overscan region 11, then an additional Graphic User Interface (GUI) interaction may be selected based upon a location in the overscan region 11 that the additional contact input was received and based on the type of contact input that was received within the overscan region 11. In this example, a terminate menu GUI interaction is selected based upon a determination that the additional contact input is received within the location of the overscan region 11 assigned to the menu 14d and based upon a determination that the additional contact input corresponds to a type of input associated with the termination menu GUI interaction (e.g., the additional contact input corresponds to a horizontal swipe beginning at a location in the overscan region 11 closer to the menu 14d and ending at a location farther away from the menu 14d, which is a type of contact input previously associated with the terminate menu GUI interaction).

Figure 20:
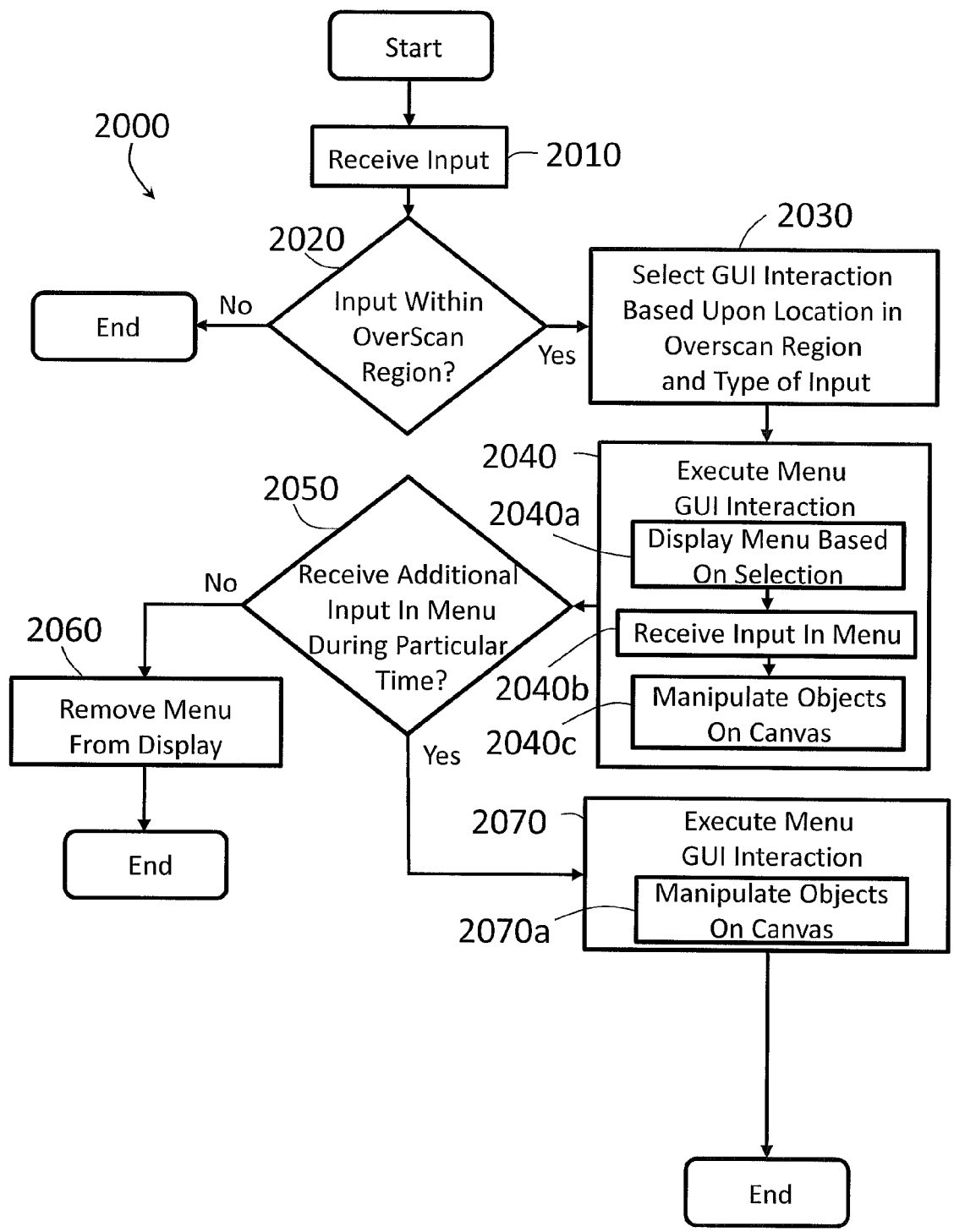
FIG. 20 is a flowchart of another example of an interaction process for selecting a user interface interaction for a menu.

Execution of the terminate menu GUI interaction occurs (1980). The execution of the terminate menu GUI interaction results in the menu 14d being removed (i.e., closed or docked) (1980a), and process 1900 ends. FIG. 20 is a flowchart of an example of another interaction process 2000 for enabling a user interface interaction with a menu. In contrast to the process 1900 of FIG. 19, the process 2000 of FIG. 20 corresponds to an implementation in which a determination is made whether additional contact input(s) are received in the menu during a particular time period. In some implementations, the process 2000 illustrated in FIG. 20 may be performed by, for example, the display device 1 of FIGS. 1 and 2.

A contact input is received at the display device 1 (2010).

A determination is made whether the received contact input indicates contact by one or more input mechanisms with the overscan region 11 (2020). If it is determined that the received contact input indicates contact outside of the overscan region 11 (e.g., contact within the display region 12), then the process 2000 ends. However, if it is determined that the received contact input indicates contact with the overscan region 11, then a GUI interaction is selected based upon a location within the overscan region where the contact input occurred and the type of contact input that was received (2030). In this example, the menu GUI interaction is selected based upon a determination that the contact input is received at a location within the portion of the overscan region 11 assigned to the menu and based upon a determination that the contact input corresponds to a type of input associated with the menu GUI interaction (e.g., the contact input corresponds to a vertical swipe beginning at a location in the overscan region farther away from a segment of the interface boundary 13 adjacent to the portion of the overscan region 11 assigned to the menu and ending at a location in the overscan region closer to the segment of the interface boundary 13 adjacent to the portion of the overscan region 11 assigned to the menu, which is a type of contact input previously associated with the menu GUI interaction).

The menu GUI interaction is executed (2040). The execution of the menu GUI interaction may include displaying/opening the menu 14d (2040a) (e.g., by sliding the menu 14d out of its docked state), receiving additional contact input from the user within the displayed menu 14d (2040b), and manipulating image objects displayed on the canvas in response to and based on the additional contact input received within the displayed menu 14d (2040c)

A determination is made whether additional contact input is received in the displayed menu 14d during a particular period of time beginning from when the contact input was received within the displayed menu 14d. If the received additional contact input is not received within the particular time period, the menu 14d is removed from display (2060), and process 2000 ends. However, if the received additional contact input is received within the displayed menu 14d within the particular time period, then the menu GUI interaction is executed (2070). The execution of the menu GUI interaction may include maintaining display of the menu 14d and receiving additional contact input from the user within the displayed menu 14d, and manipulating image objects displayed on the canvas in response to and based on the additional contact input received within the displayed menu 14d (2070a). In some implementations, when the additional contact input is received within the display region (and outside of the displayed menu 14d) and not within the overscan region 11, processing of the additional contact input may occur using standard or conventional touchscreen contact input processing.

Figure 21:
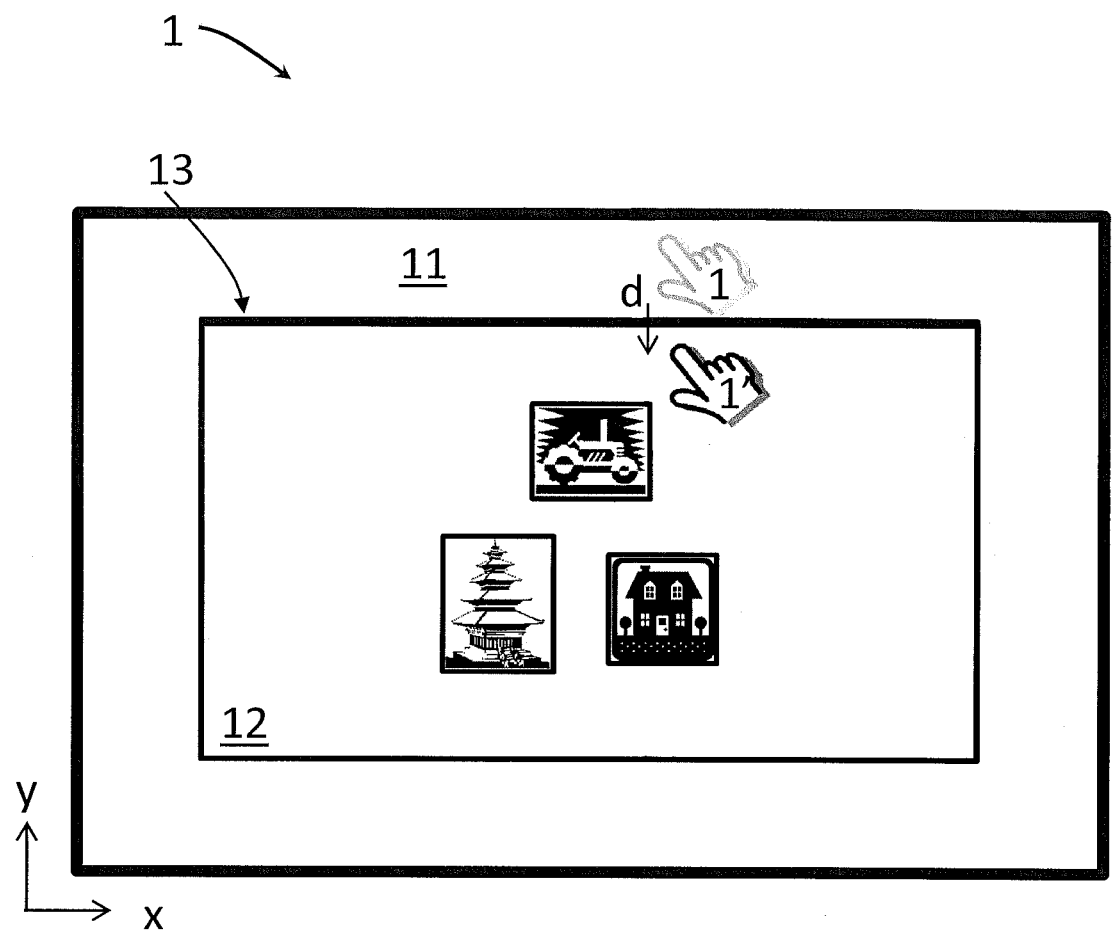
FIGS. 21-26 are diagrams of a display device configured to receive contact inputs within portions of an overscan region for display of and interaction with a pull-down drawer menu.
Figure 22:
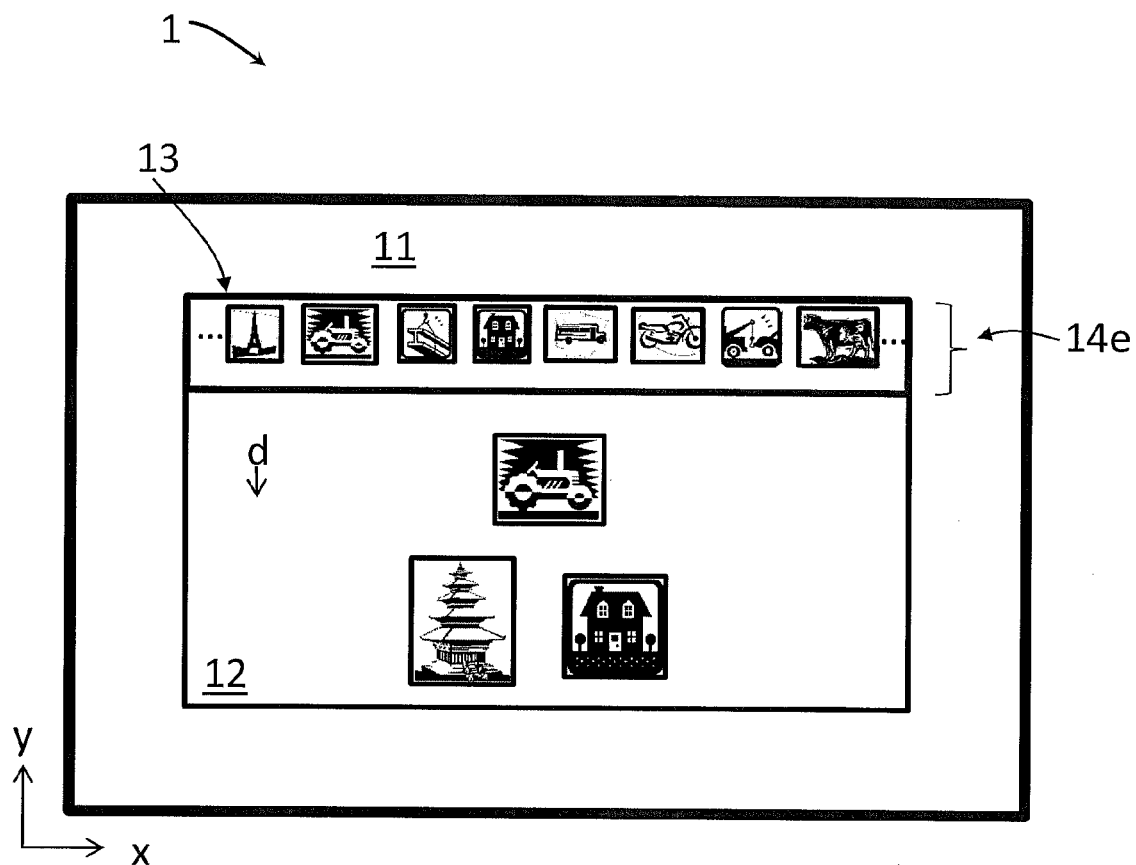

FIG. 21 is a diagram of a display device 1 configured to receive contact input within portions of an overscan region 11 for display and interaction of a pull-down drawer menu. In some implementations, a display device 1 may include a pull-down display ("drawer") configured to provide a user with a selection of image objects. For example, the drawer may include various image objects previously saved/accessed, or may include a library (or libraries) of image objects. In FIG. 21, the drawer 14e may be displayed to the user in response to the user providing contact input in a portion of the overscan region 11 corresponding to a location of the drawer 14e and assigned to the drawer 14e. For example, the user may provide a contact input (1) comprising a touch contact input within the portion corresponding to the drawer 14e of the overscan region 11 along with a subsequent swiping motion (2) along a direction 'd' into the display region 12 across the interface boundary 13. In some implementations, the swipe may extend into the display region 12 to create the impression that the user is sliding the drawer 14e down from its closed position into the display region 12. Upon receiving the contact input (1) within the overscan region 11, an uppermost edge of the interface boundary 13 may become highlighted in order to provide the user with feedback that the drawer is initiated for opening. Then, upon receiving the swiping motion (2) into the display region 12 across the interface boundary 13, the drawer 14e may open from the highlighted uppermost edge of the interface boundary 13 along the direction 'd', as shown in FIG. 22. As a result of the opening process of the drawer 14e, the camera view of the display region 12 may be displaced along the direction 'd'.

Notably, the portion of the overscan region 11 assigned to the drawer 14e may be, for example, a portion of the overscan region 11 adjacent to a boundary (e.g., a vertical or a horizontal boundary) of the drawer 14e displayed in the display region 12 closest to the overscan region 11. In some implementations, the horizontal or vertical length of this portion of the overscan region may be equal to the corresponding horizontal or vertical length of the boundary of the drawer 14e. In other implementations, the horizontal or vertical length of this portion of the overscan region may be greater than or less than the horizontal or vertical length, respectively of the boundary of the drawer 14e by, for example, a predetermined amount.

Figure 23:
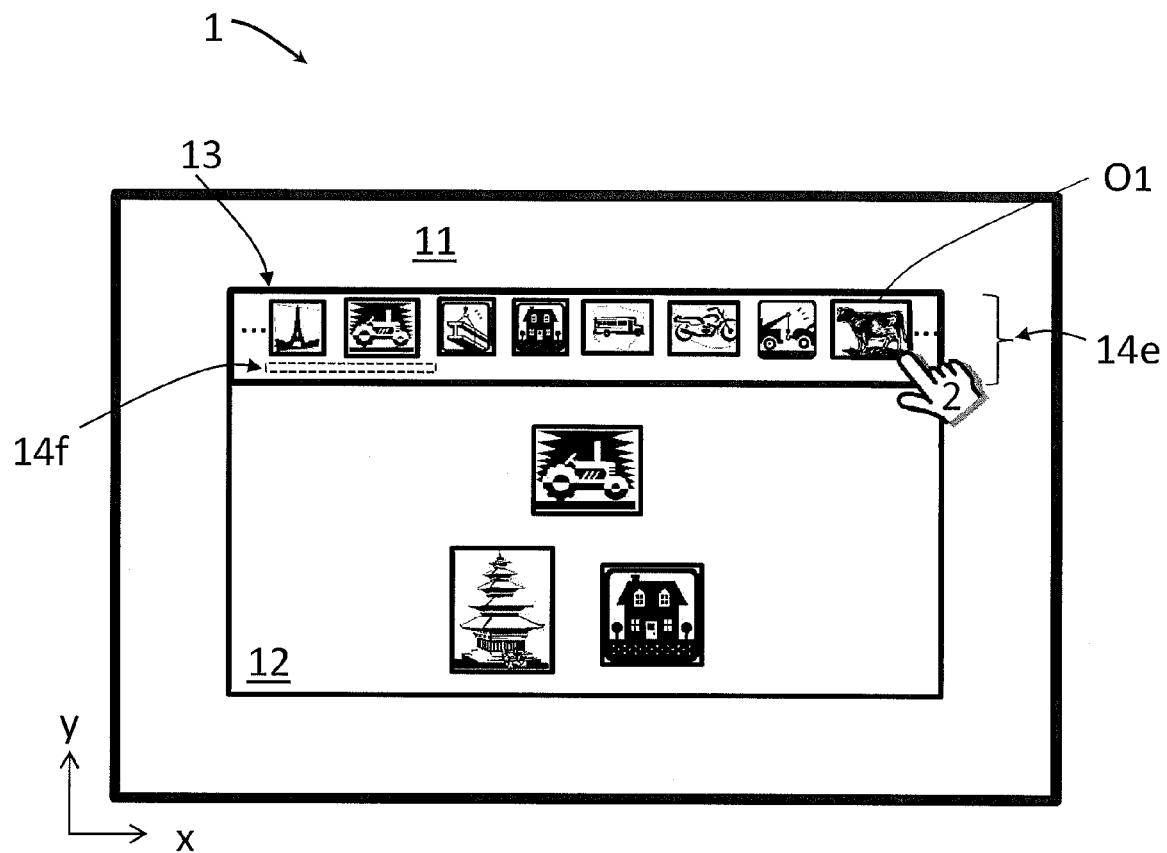

FIG. 23 is a diagram of a display device 1 configured to receive contact inputs to manipulate image objects from a pull-down display ("drawer"). In some implementations, a display device 1 may include a drawer 14e for displaying various image objects. For example, the drawer 14e may include display of an image object O1 among various different image objects for selection by a user. The different image objects may be viewed within the drawer 14e by swiping along a direction substantially parallel to the drawer 14e. For example, as a user provides contact input along the direction substantially parallel to the drawer 14e, a scroll bar region 14f may be provided to indicate to the user relative movement of the image objects displayed in the drawer 14e. As the user swipes (or scrolls) along the drawer 14e, a scroll bar 14f displayed within the scroll bar region 14f will traverse along the scroll bar region 14f.

In FIG. 23, a user may provide a contact input (2) corresponding to a desired image object O1 for a predetermined period of time. For example, the user may provide the contact input (2) as a relatively long-press input onto a region of the drawer 14e corresponding to the desired image object O1. After the predetermine period of time has passed with the user providing the contact input (2) to the desired image object O1, the desired image object O1 may be replicated as an image object copy O1' overlying the desired image object O1, but the image object copy O1' may be displayed in a slightly enlarged size as that of the desired image object O1. Once the image object copy O1' is replicated, an additional user contact input (3) may be provided onto the display region 12 overlying the image object copy O1' in order to manipulate the image object copy O1' onto the canvas, as well as resize the image object copy O1'. For example, the user may provide the contact input (3) as a maintained touch input contact on the image object copy O1' and reposition the image object copy O1' (while maintaining the touch input contact). Here, the image object copy O1' may be manipulated along both x- and y-axis directions, as well as being rotated having new frame reference x'- and y'-axis and being enlarged or reduced in size. Once the image object copy O1' has been manipulated into position on the canvas, as well as resized, if necessary, the user may remove the maintained contact input (4). Thus, the manipulated image object copy O1' may be positioned onto the canvas as image object O1".

Figure 24:
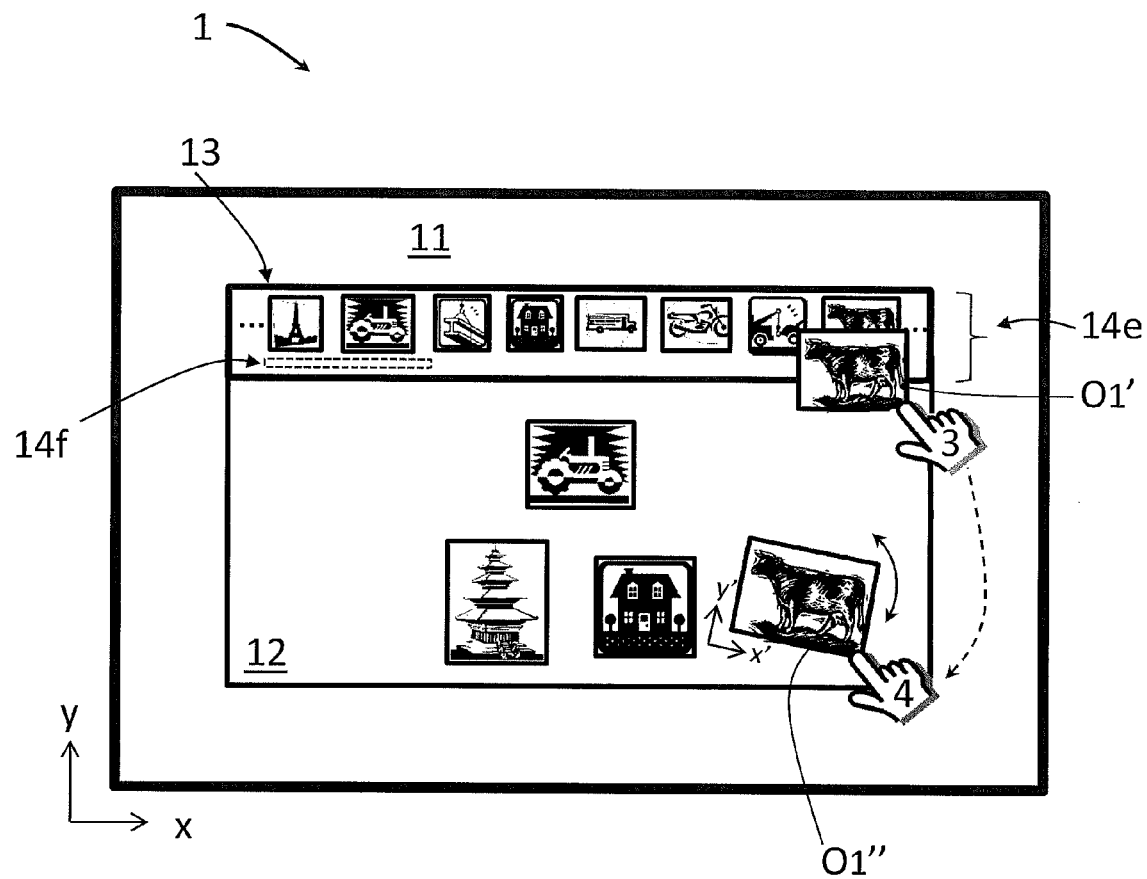

In some implementations, although FIG. 24 may demonstrate copying and manipulation of a single image object O1, multiple different image objects displayed on the drawer 14e may be positioned onto the canvas. Moreover, the same image object retrieved from the drawer 14e may be copied and manipulated multiple times on the canvas. For example, if a user desired to position multiple copies of the image object O1 from the drawer 14e onto the canvas, the user may simply repeated the contact input and manipulation processes (2), (3), and (4) of FIGS. 23 and 24.

Figure 25:
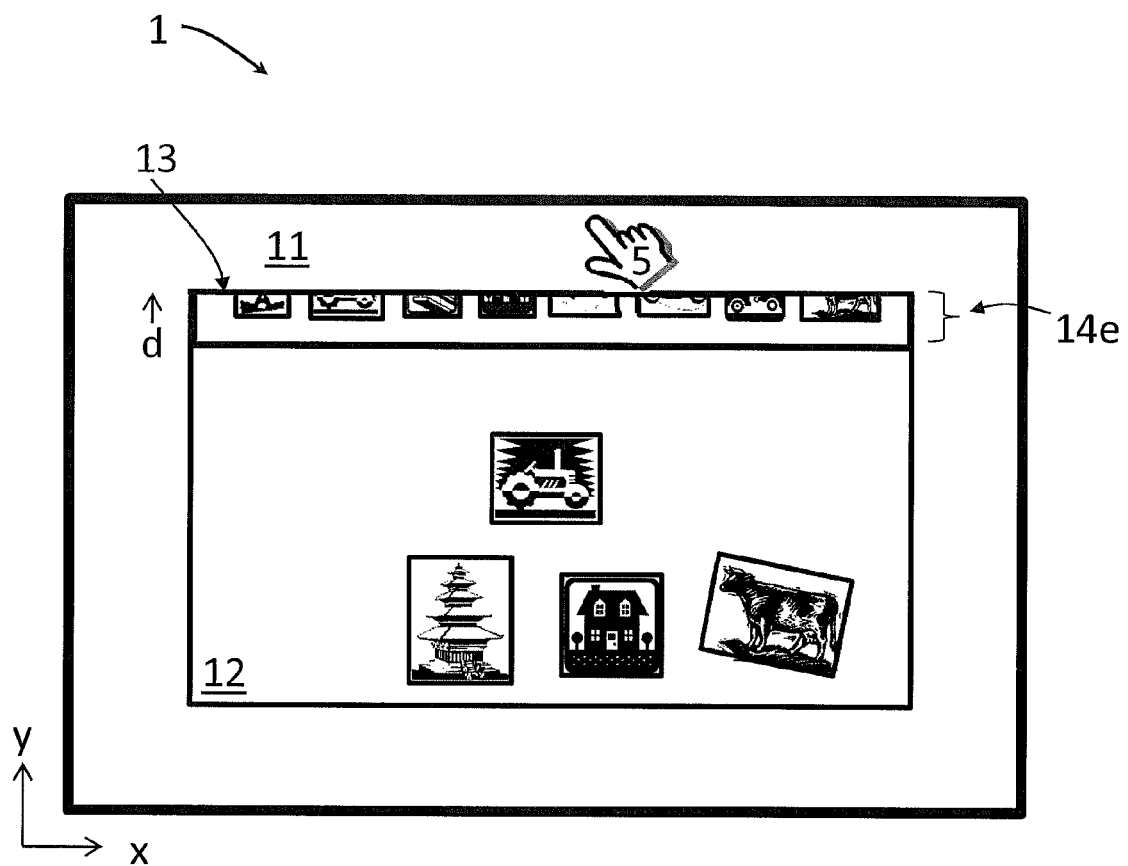

Once a user has copied and manipulated a desired number of image objects displayed in the drawer 14e, the drawer may be returned to a closed position. For example, as shown in FIG. 25, closing of the drawer 14e may be initiated by providing an input contact (5) within the overscan region 11 corresponding to the drawer 14e. Here, the input contact (5) may comprise a single touch input to the overscan region 11. As a result, the drawer 14e may close along a direction 'd', and the image objects displayed within the display region 12 may revert back to their original positions, as shown in FIG. 21. Alternatively, the drawer 14e may be closed upon receiving a different contact input, as shown in FIG. 26.

Figure 26:
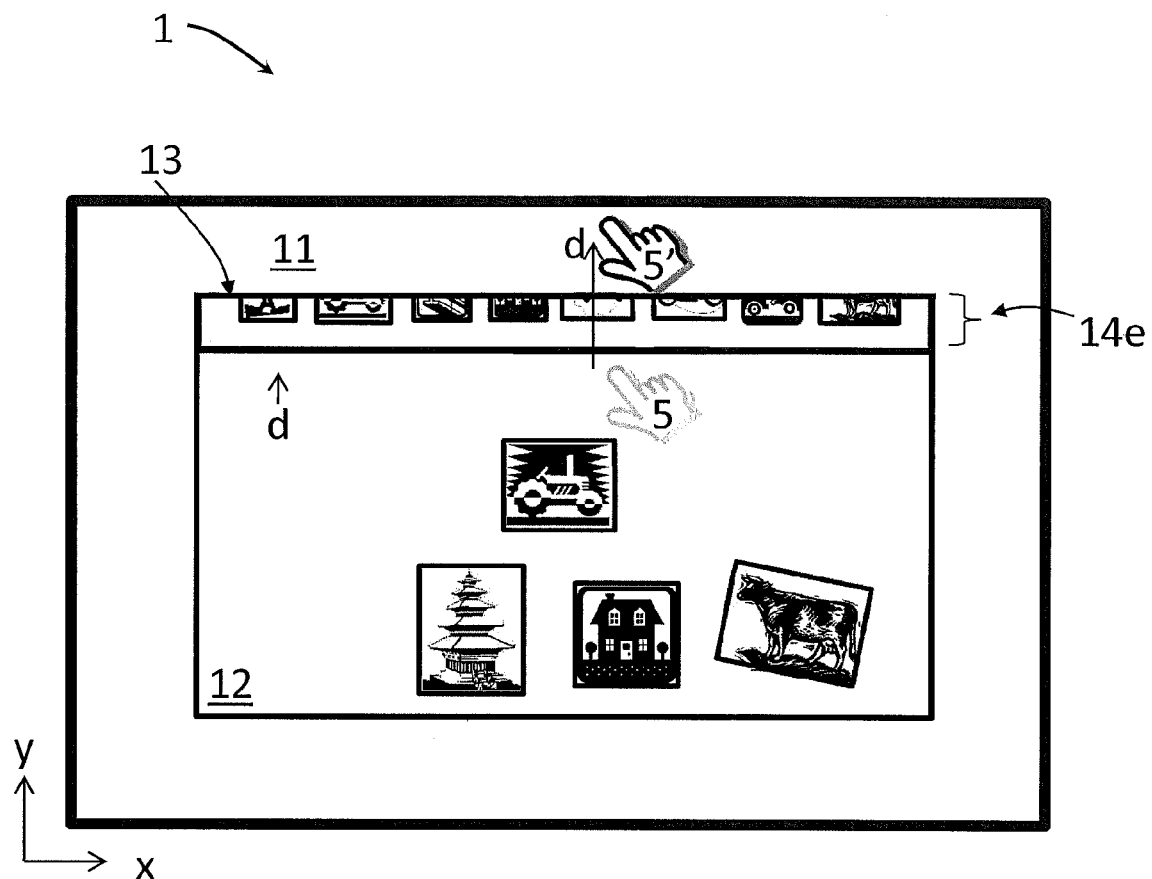

In some implementations, a swiping contact input may be provided in order to initiate closing of the drawer 14e, as shown in FIG. 26. For example, a user may initiate closing of the drawer 14e by providing an initial swiping contact input (5) beginning within the display region 12 and providing a continued swiping contact input (5') along a direction of the y-axis into the corresponding portion of the overscan region 11 across the drawer 14e and across the interface boundary 13. As a result, the drawer 14e may close along a direction 'd', and the image objects displayed within the display region 12 may revert back to their original positions, as shown in FIG. 21.

Figure 27:
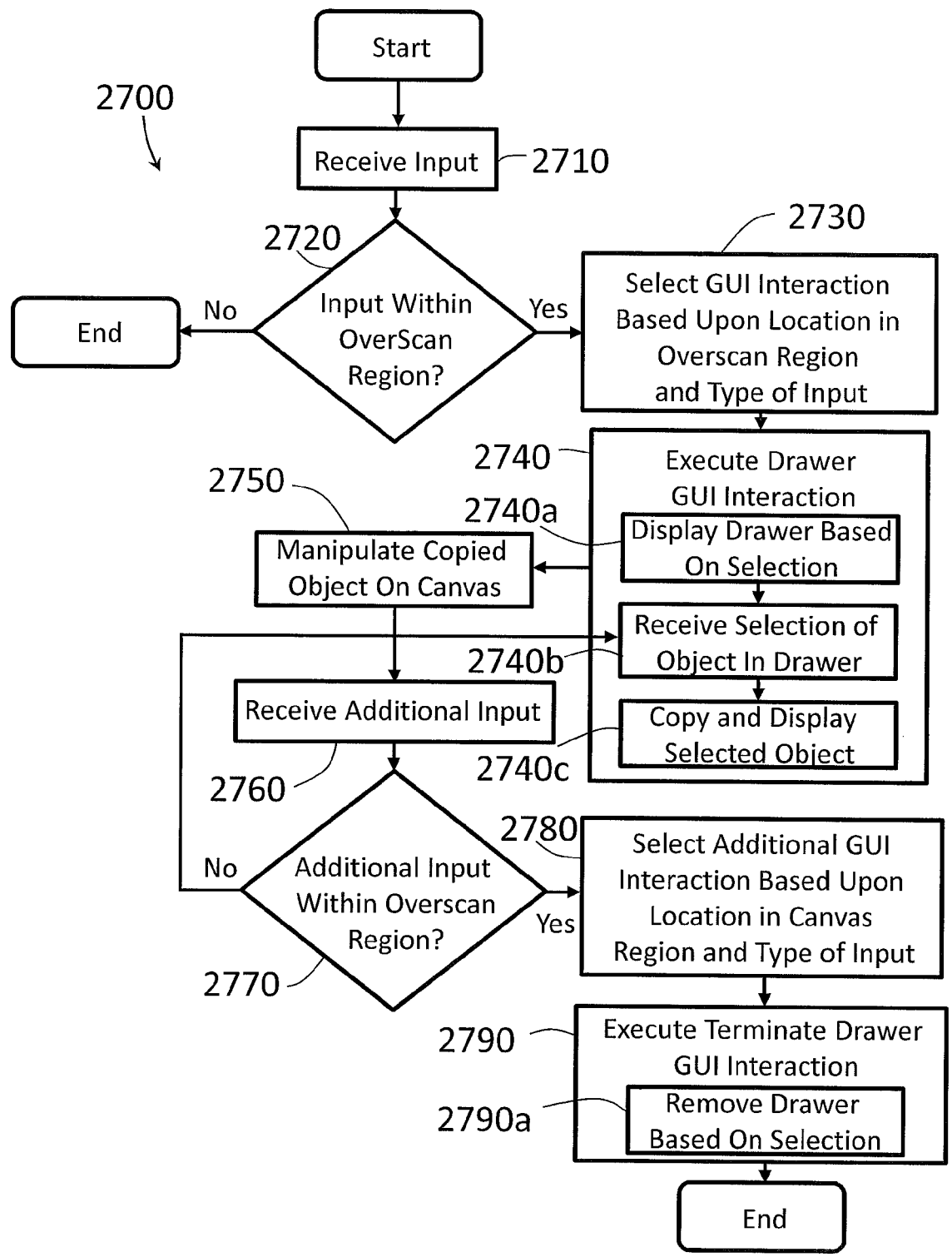
FIG. 27 is a flowchart of an example of an interaction process for selecting a user interface interaction for display of, and interaction with, a pull-down drawer display menu configured to provide a user with a selection of image objects.

FIG. 27 is a flowchart of an example of an interaction process 2700 for selecting a user interface interaction regarding a pull-down display ("drawer") configured to provide a user with a selection of image objects. In some implementations, the process 2700 illustrated in FIG. 27 may be performed by, for example, the display device 1 of FIGS. 1 and 2.

A contact input is received at the display device 1 (2710).

A determination is made whether the received contact input is an input at a location within the overscan region 11 (2720). If the received contact input is not an input at a location within the overscan region 11, then process 2700 ends. In some implementations, when the contact input is received within the display region 12 and not within the overscan region 11, processing of the contact input may occur using standard or conventional touchscreen contact input processing. However, if the received contact input corresponds to input received within the overscan region 11, then a GUI interaction is selected based on the location of the contact input within the overscan region 11 and the type of contact input (2730). In this example, the drawer GUI interaction is selected based upon a determination that the contact input is received at a location within the portion of the overscan region 11 assigned to the drawer 14e and based upon a determination that the contact input corresponds to a type of input associated with the drawer GUI interaction (e.g., the contact input corresponds to a vertical swipe beginning at a location in the overscan region 11 farther away from the drawer 14e and ending at a location closer to the drawer 14e, which is a type of contact input previously associated with the drawer GUI interaction). The drawer GUI interaction is executed (2740). The execution of the drawer GUI interaction may include displaying/opening the drawer 14e (2740a), receiving contact input associated with a particular image objected displayed in the drawer 14e associated with selecting the particular image object (2740b), and copying of the selected image object in response to and based on the contact input within the drawer 14e and displaying the copied image object at a location overlying the drawer (2740c).

Additional contact input may be received at a location of the copied image object in order to manipulate the copied image object onto the canvas (2750). Additional contact input may be received at locations of the touchscreen display (2760). A determination is made whether the received additional contact input was received outside of the drawer 14e but within the overscan region 11 (2770). If it is determined that the received additional contact input was received outside of the drawer 14e and was not received within the overscan region 11, then process 2700 returns to operation 2740b to await further input from the user. In some implementations, when the additional contact input is received within the display region 12 (and outside of the drawer 14e) and not within the overscan region, processing of the contact input may occur using standard or conventional touchscreen contact input processing. However, if it is determined that the received additional contact input was received outside of the drawer 14e but within the overscan region 11, then an additional GUI interaction may be selected based upon a location in the overscan region 11 that received the additional contact input and based on the type of contact input that was received within the overscan region 11 (2780). In this example, a terminate drawer GUI interaction is selected based upon a determination that the contact input is received within the location of the overscan region 11 assigned to the drawer 14e and based upon a determination that the contact input corresponds to a type of input associated with the terminate drawer GUI interaction (e.g., the contact input corresponds to a vertical swipe beginning at a location in the overscan region 11 closer to the drawer 14e and ending at a location farther away from the drawer 14e, which is a type of contact input previously associated with the terminate drawer GUI interaction). Alternatively, a type of input associated with the terminate drawer GUI interaction may include a contact input at location within the overscan region 11 that corresponds to a location of the drawer 14e, which is a type of contact input previously associated with the terminate drawer GUI interaction.

Execution of the terminate drawer GUI interaction occurs (2790). The execution of the terminate drawer GUI interaction results in the drawer 14e being removed (i.e., closed or docked) (2790a), and process 2700 ends.

In some implementations, opening (or displaying) of the viewer 14a, the keyboard 14b, the menu 14c, the menu 14d, and/or the drawer 14e may be invoked based upon a specific gesture (or gestures) previously associated with the viewer 14a, the keyboard 14b, the menu 14c, the menu 14d, and/or the drawer 14e that may be provided within portions of the overscan region 11 not previously associated with the viewer 14a, the keyboard 14b, the menu 14c, the menu 14d, and/or the drawer 14e. For example, a first specific gesture comprising a first circular motion (i.e., a complete circle, such as an "o") along with a diagonal swipe may be associated with an "opening" of the viewer 14a and a second and different specific gesture comprising a second circular motion (i.e., less than a complete circle, such as a "c") along with a diagonal swipe may be associated with a "closing" of the viewer 14a. Here, the first circular motion and the diagonal swipe may be provided sequentially while maintaining constant contact (or substantially constant contact) within the overscan region 11. Similarly, the second circular motion and the diagonal swipe may be provided sequentially while maintaining constant contact (or substantially constant contact) within the overscan region 11.

In some implementation, these first and second specific gestures may be provided in portions (either the same portions or different portions) of the overscan region 11 not associated with the invoking (or displaying) of the viewer 14a, as is shown in FIGS. 4 and 6. For example, invoking (or displaying) of the viewer 14a may result from providing the first specific gesture at a side location (Side1 or Side2, in FIG. 2) of the overscan region 11. Additionally, removing the display of the viewer 14a may result from providing the second specific gesture at a top/bottom (Top or Bottom, in FIG. 2) of the overscan region 11.

In some implementations, invoking (or displaying) of the viewer 14a may result from providing the first specific gesture in a first portion of the overscan region 11. Additionally, removing the display of the viewer 14a may result from providing the second specific gesture at substantially the same first portion of the overscan region 11. Thus, the location of receiving of the first and specific gestures within the overscan region 11 may be substantially different or substantially different from one another.

Similarly, in some implementations, any or all of the keyboard 14b, the menu 14c, the menu 14d, and/or the drawer 14e may be invoked using specific gestures, either within substantially the same portions of the overscan region 11 or within substantially different portions of the overscan region 11.

Figure 28:
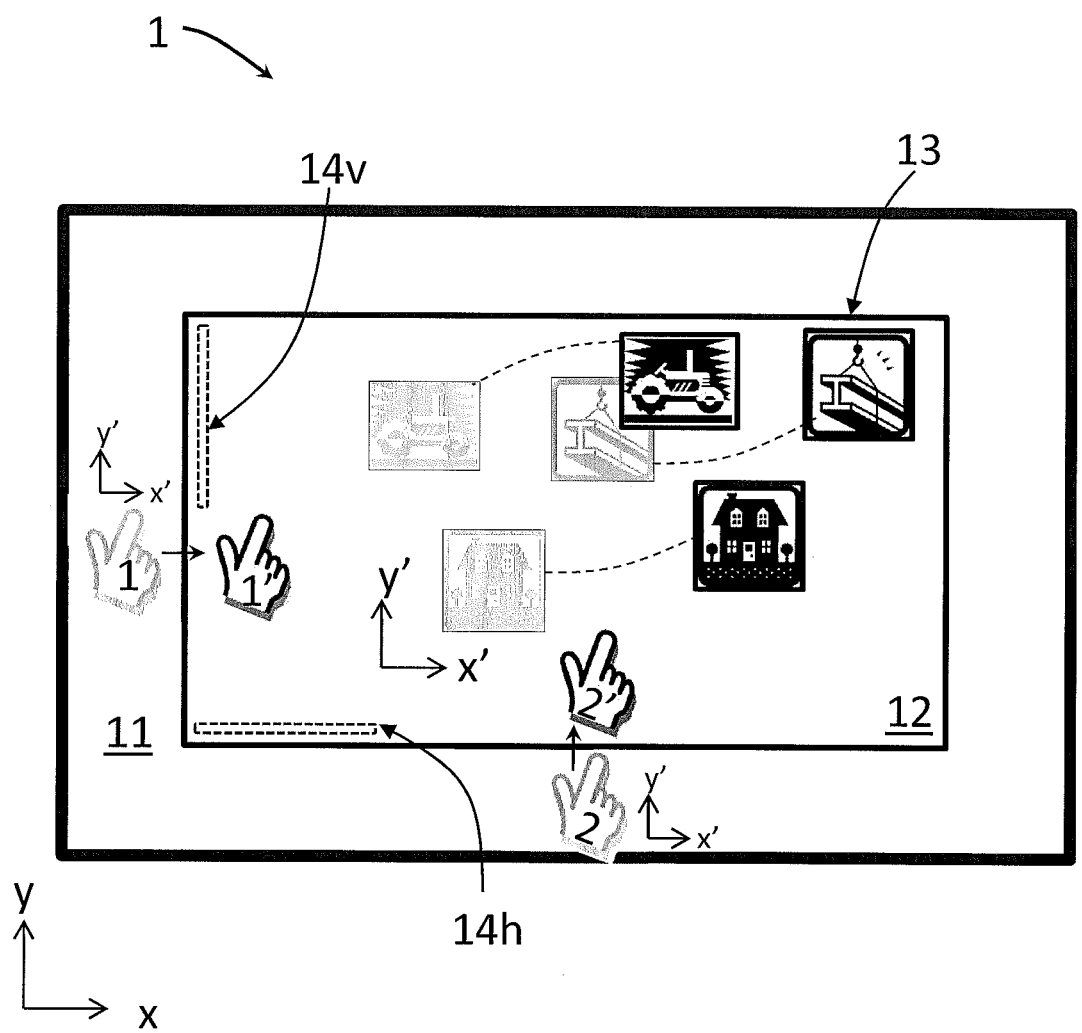
FIG. 28 is a diagram of a display device configured to receive contact inputs within portions of an overscan region and a display region to manipulate camera views of a canvas.

FIG. 28 is a diagram of a display device 1 configured to receive contact input within portions of an overscan region 11 and a display region 12 to manipulate camera views of a canvas. In some implementations, a display device 1 may include a display region 12 displaying image objects of a canvas having orientations along x- and y-axis. A user may manipulate the camera displaying the image objects of the canvas using contact input(s). For example, a user may provide an initial contact input (1) within the overscan region 11 and may continue along the x-axis direction into the display region 12 across an interface boundary 13 while maintaining a subsequent contact input (1'). Here, the user's subsequent contact input (1') is continuous with the initial contact input (1) without interrupting contact between the overscan region 11 and the display region 12, i.e., a swiping motion beginning within the overscan region 11 and continuing into the display region 12. As a result, the canvas showing the image objects displayed within the display region 12 may be moved along the corresponding x-axis direction, and the camera will display portions of the canvas along an opposing corresponding x-axis direction. For example, moving the canvas along the positive (+) x-axis direction results in moving the camera along the negative (−) x-axis direction.

Alternatively, in some implementations, or in addition to the contact inputs (1) and (1'), the subsequent contact input (1') may continue along the y-axis direction. For example, although the initial contact input (1) may be within the overscan region 11, the subsequent contact input (1') into the display region 12 may include y-axis direction components. As a result, the camera showing the image objects displayed within the display region 12 may be moved along the corresponding x-axis direction and the corresponding y-axis direction based upon the initial contact input (1) and the subsequent contact input (1').

Similarly, a user may provide an initial contact input (2) within the overscan region 11 and may continue along the y-axis direction into the display region 12 across an interface boundary 13 while maintaining a subsequent contact input (2'). Here, the user's subsequent contact input (2') is continuous with the initial contact input (2) without interrupting contact between the overscan region 11 and the display region 12, i.e., a swiping motion beginning within the overscan region 11 and continuing into the display region 12. As a result, the canvas showing the image objects displayed within the display region 12 may be moved along the corresponding y-axis direction, and the camera will display portions of the canvas along an opposing corresponding y-axis direction. For example, moving the canvas along the positive (+) y-axis direction results in moving the camera along the negative (−) y-axis direction.

Alternatively, in some implementations, or in addition to the contact inputs (2) and (2'), the subsequent contact input (2') may continue along the x-axis direction. For example, although the initial contact input (2) may be within the overscan region 11, the subsequent contact input (2') into the display region 12 may include x-axis direction components. As a result, the camera showing the image objects displayed within the display region 12 may be moved along the corresponding y-axis direction and the corresponding x-axis direction based upon the initial contact input (2) and the subsequent contact input (2').

In some implementations, a vertical scroll bar 14v and a horizontal scroll bar 14h may be displayed on the display region 12 in order to provide a user with feedback regarding the location of the camera with respect to an overall area of a canvas. Since the device 1 is configured to provide a user with camera views of the entire area of the canvas and selectable area portions of the canvas, the vertical scroll bar 14v and the horizontal scroll bar 14h move along vertical and horizontal directions of the display region 12 in accordance with the amounts of movement of the camera. For example, as the user provides the contact inputs (1) and (1'), i.e., moving the canvas along a direction corresponding to a direction substantial to the direction of the contact inputs (1) and (1'), the horizontal scroll bar will move horizontally along a direction substantially opposite to the sequence of contact inputs (1) and (1'). Here, moving the canvas along a direction corresponding to a direction substantially the same as the direction of the contact inputs (1) and (1') results in changing a camera view of the canvas along a direction substantially opposite to the direction of the contact inputs (1) and (1').

Similarly, in some implementations, as the user provides the contact inputs (2) and (2'), i.e., moving the canvas along a direction corresponding to a direction substantial to the direction of the contact inputs (2) and (2'), the vertical scroll bar will mover vertically along a direction substantially opposite to the sequence of contact inputs (2) and (2'). Here, moving the canvas along a direction corresponding to a direction substantially the same as the direction of the contact inputs (2) and (2') results in changing a camera view of the canvas along a direction substantially opposite to the direction of the contact inputs (2) and (2').

In addition, in some implementations, as the user provides the contact inputs (1)/(1') and (2)/(2'), i.e., moving the canvas along x- and y-axis directions, the vertical and horizontal scroll bars will move vertically and horizontally, respectively, along a direction substantially opposite to the sequence of contact inputs (1)/(1') and (2)/(2'). Here, moving the canvas along a direction corresponding to a direction substantially the same as the direction of the contact inputs (1)/(1') and (2)/(2') results in changing a camera view of the canvas along a direction substantially opposite to the direction of the contact inputs (1)/(1') and (2)/(2').

Figure 29:
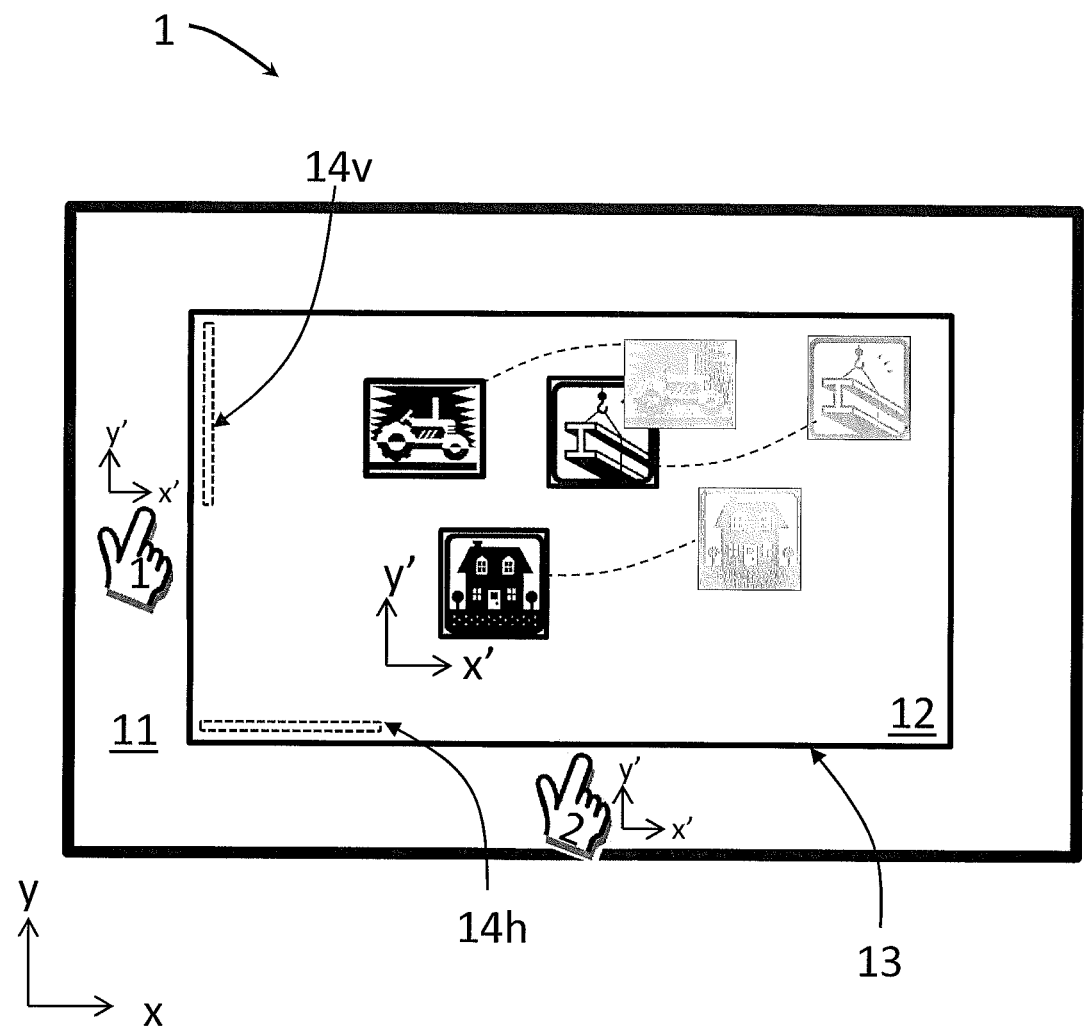
FIG. 29 is a diagram of a display device configured to receive contact inputs within portions of an overscan region to manipulate camera views of a canvas.

FIG. 29 is a diagram of a display device 1 configured to receive contact input within portions of an overscan region 11 to manipulate camera views of a canvas. In some implementations, a display device 1 may include a display region 12 displaying image objects of a canvas having orientations along x- and y-axis. A user may manipulate the camera displaying the image objects of the canvas using contact input(s). For example, a user may provide contact input (1) within a vertical portion of the overscan region 11 along both x- and y-axis directions without continuing the contact input (1) into the display region 12 across the interface boundary 13. As a result, the canvas showing the image objects displayed within the display region 12 may be moved along the corresponding x- and y-axis directions, and the camera will display portions of the canvas along opposing corresponding x- and y-axis directions. For example, moving the canvas along the positive (+) x- and y-axis directions results in moving the camera along the negative (−) x- and y-axis directions.

Similarly, in some implementations, a user may manipulate the camera displaying the image objects of the canvas using contact input(s). For example, a user may provide contact input (1) within a horizontal portion of the overscan region 11 along both x- and y-axis directions without continuing the contact input (2) into the display region 12 across the interface boundary 13. As a result, the canvas showing the image objects displayed within the display region 12 may be moved along the corresponding x- and y-axis directions, and the camera will display portions of the canvas along opposing corresponding x- and y-axis directions. For example, moving the canvas along the positive (+) x- and y-axis directions results in moving the camera along the negative (−) x- and y-axis directions.

In some implementations, the overscan region 11 may be configured to have a width (or widths) in order to accommodate a user's contact inputs substantially within the overscan region. For example, as shown in FIG. 2, the touchscreen device 15 purposely extends to overlie an entirety of the overscan region 11. Thus, the user may make full use of an entirety of the overscan region 11 in order to provide contact input to the display device 1. For example, not only does the overscan region 11 receive contact input, but the overscan region 11 is configured to receive subsequent contact input(s). As shown in FIG. 29, manipulation of the canvas (or camera) may be determined solely based upon two-dimensional input received within the overscan region 11. Thus, the overscan region 11 must possess sufficient area in order to receive the two-dimensional input.

Figure 30:
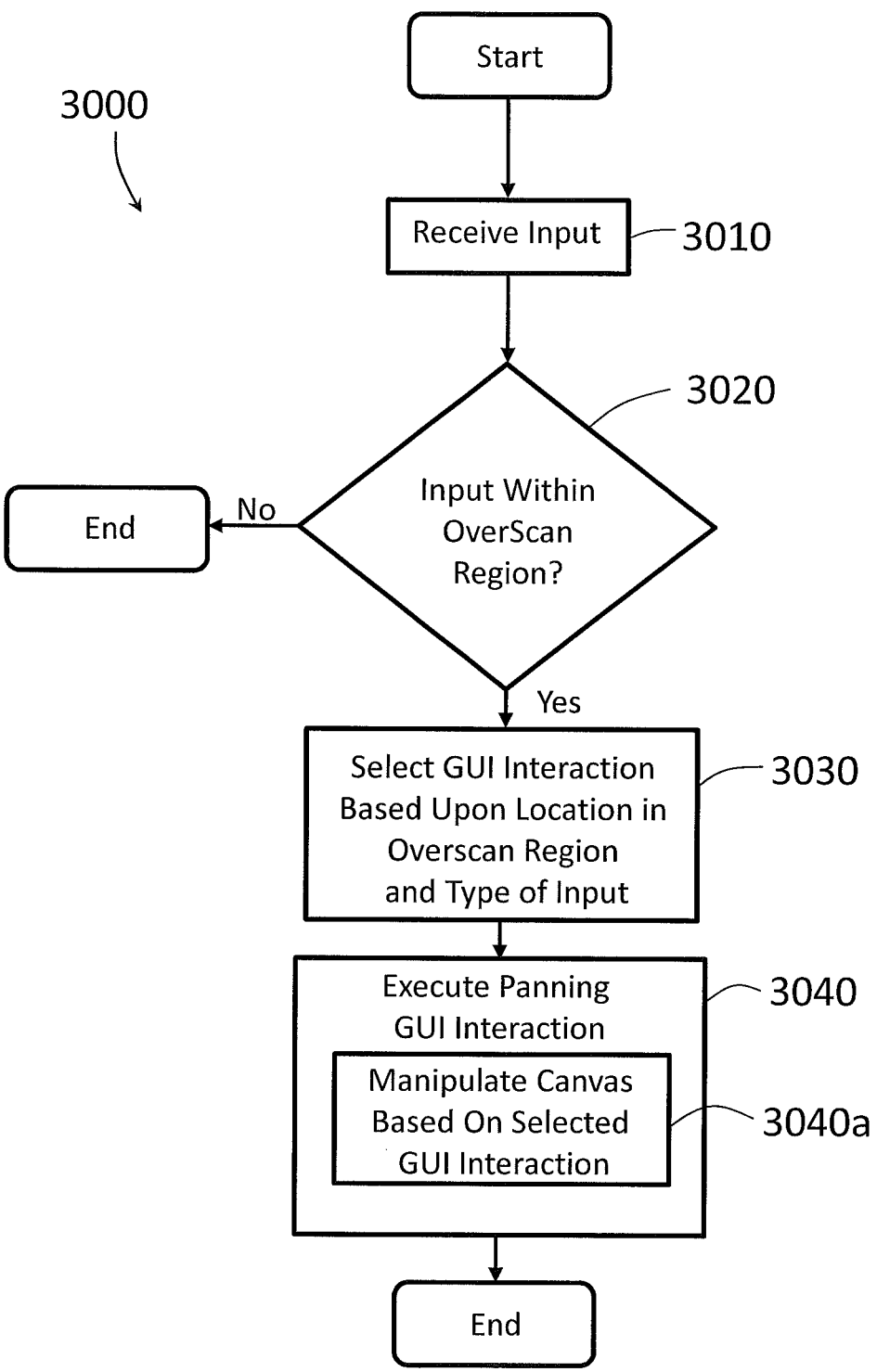
FIG. 30 is a flowchart of an example of an interaction process for selecting a user interface interaction for panning of camera views of a canvas.

FIG. 30 is a flowchart of an example of an interaction process 3000 for selecting a user interface interaction regarding panning of camera views of a canvas. In some implementations, the process 3000 illustrated in FIG. 30 may be performed by, for example, the display device 1 of FIGS. 1 and 2.

A contact input is received at the display device 1 (3010).

A determination is made whether the received contact input is an input at a location within the overscan region 11 (3020). If the received contact input is not an input at a location within the overscan region 11, then process 3000 ends. In some implementations, when the contact input is received within the display region 12 and not within the overscan region 11, processing of the contact input may occur using standard or conventional touchscreen contact input processing. However, if the received contact input corresponds to input received within the overscan region 11, then a GUI interaction is selected based on the location of the contact input within the overscan region 11 and the type of contact input (3030). In this example, the camera panning GUI interaction is selected based upon a determination that the contact input is received at a location within the portion of the overscan region 11 and based upon a determination that the contact input corresponds to a type of input associated with the camera panning GUI interaction (e.g., the contact input corresponds a vertical and/or horizontal swipe beginning at a location within the overscan region 11). In some implementations, as detailed above, the swipe may begin within the overscan region 11 and continue across the interface boundary 13 into the display region 12. In some implementations, as detailed above, the swipe may begin and end within the overscan region 11 without continuing across the interface boundary 13 into the display region 12. In some implementations, the swipe may begin within the overscan region 11, continuing across the interface boundary 13 into the display region 12, and then end within the overscan region 11, either along one or both of the x-axis and y-axis directions.

The camera panning GUI interaction is executed (3060). The execution of the camera panning GUI interaction may include manipulating the canvas (or camera, depending on the frame of reference regarding the viewer or the image objects) in response to and based on the contact input received within the overscan region 11 (3060a).

Figure 31A:
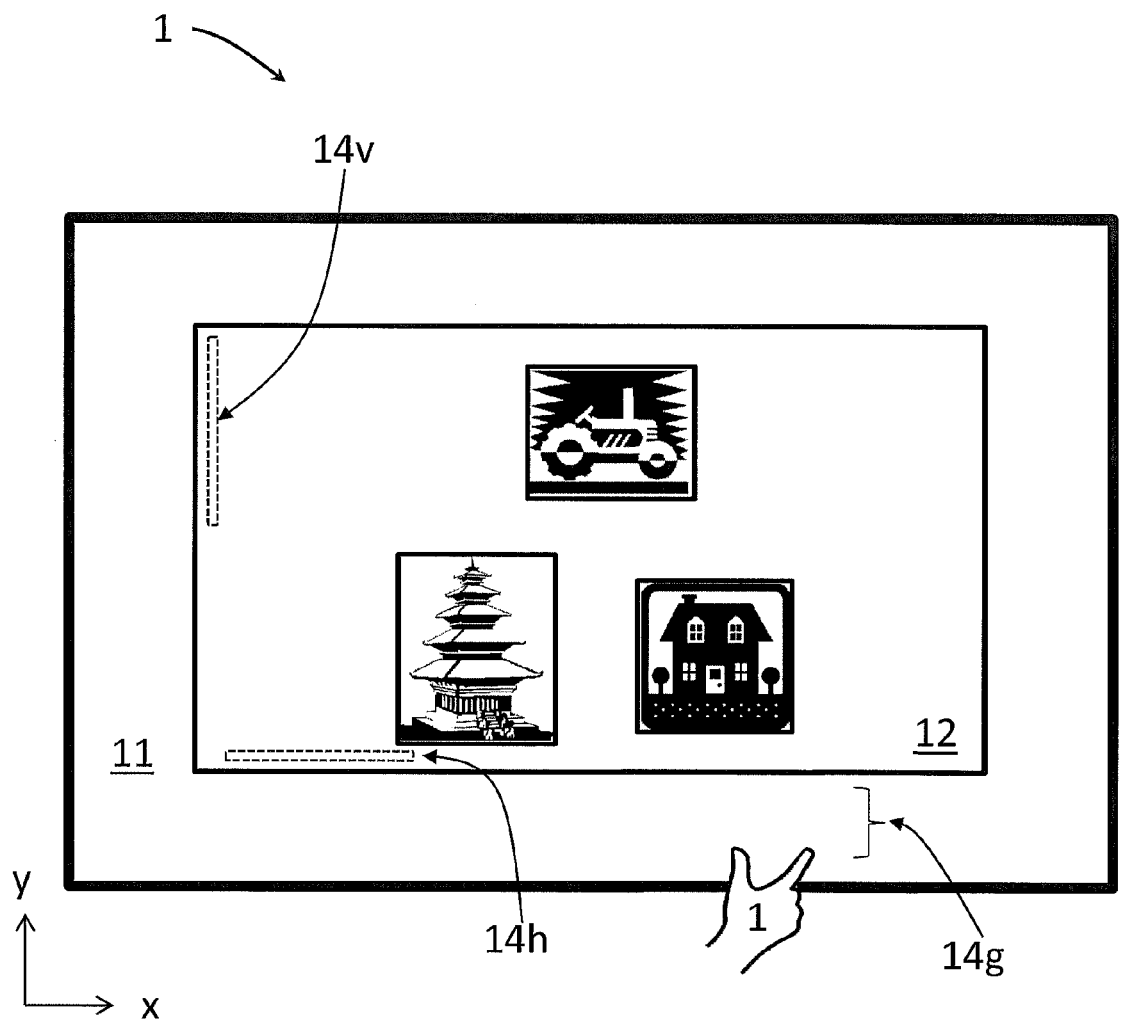
FIGS. 31a and 31b are diagrams of a display device configured to receive contact inputs within portions of an overscan region for manipulating camera views of a canvas.
Figure 31B:
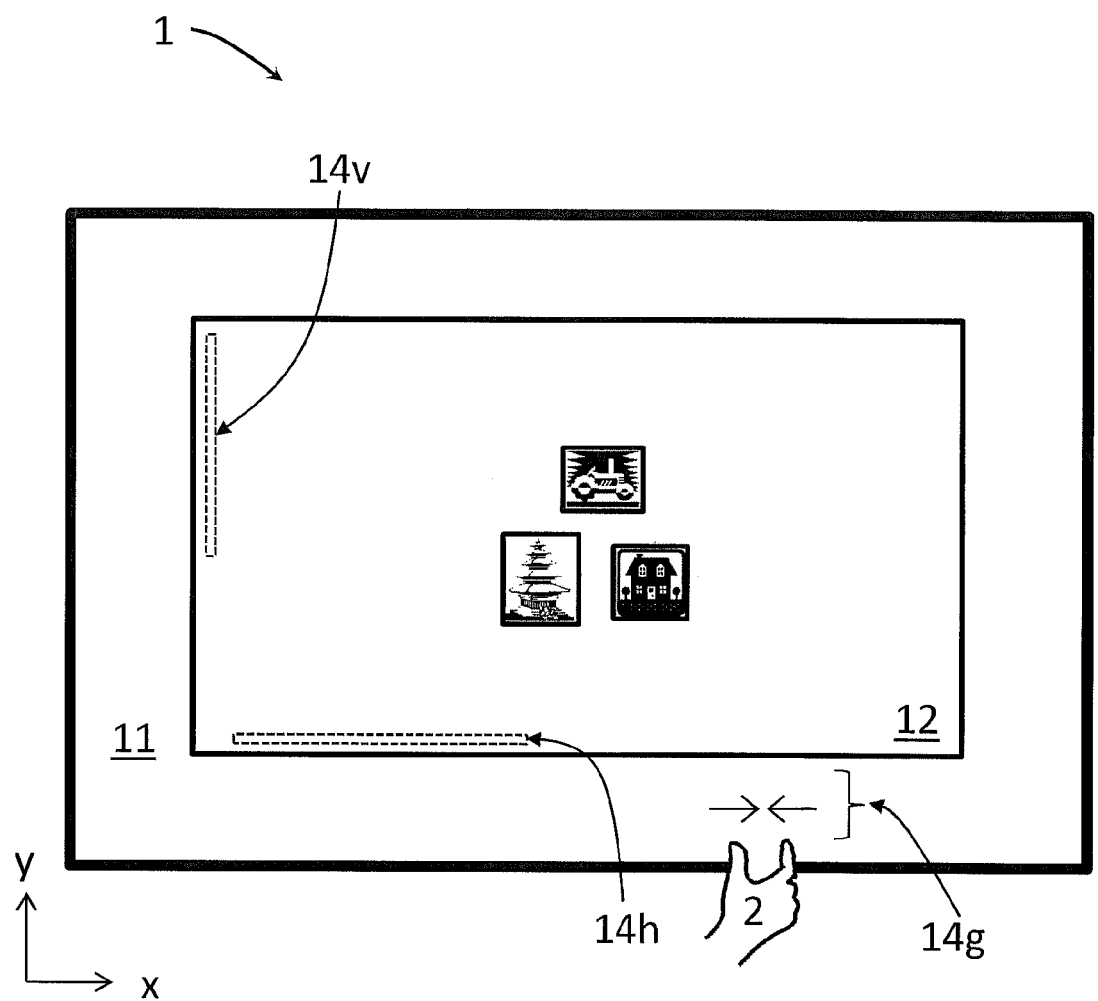

FIGS. 31a and 31b are diagrams of a display device 1 configured to receive contact inputs within portions of an overscan region 11 to manipulate camera views of a canvas. In some implementations, a display device 1 may include a display region 12 displaying image objects of a canvas having orientations along x- and y-axis. A user may manipulate a camera displaying the image objects of the canvas using contact input(s). For example, a user may provide an initial two-contact input (1) within a portion 14g of the overscan region 11. Upon providing the two-contact input (1), vertical and horizontal scroll bars 14v and 14h may be displayed within the display region providing the user with an indication regarding position of the camera with respect to an entirety of the canvas. After the initial two-contact input (1) is received, the user may provide a subsequent two-contact input (2) within the portion 14g of the overscan region 11, as shown in FIG. 31b. For example, the user may provide a "pinching" type input (2), which will cause the camera to zoom-out from the canvas. In some implementations, a speed in which the user provides the "pinching" type input (2) may determine a speed at which the camera zooms-out from the canvas. For example, providing the "pinching" type input (2) in a relatively slow manner, may result in zooming-out from the canvas in a correspondingly slow speed. Conversely, providing the "pinching" type input (2) in a relatively fast manner, may result in zooming-out from the canvas in a correspondingly fast speed.

As a result of providing the "pinching" type input (2), the image objects will decrease in size, but the camera will not pan the canvas. In addition, the vertical and horizontal scroll bars 14v and 14h will increase in length providing the user with an indication that the camera is showing an increased area of the canvas, as opposed to the vertical and horizontal scroll bars 14v and 14h shown in FIG. 31a, which are relatively shorter than the vertical and horizontal scroll bars 14v and 14h shown in FIG. 31b.

Figure 32A:
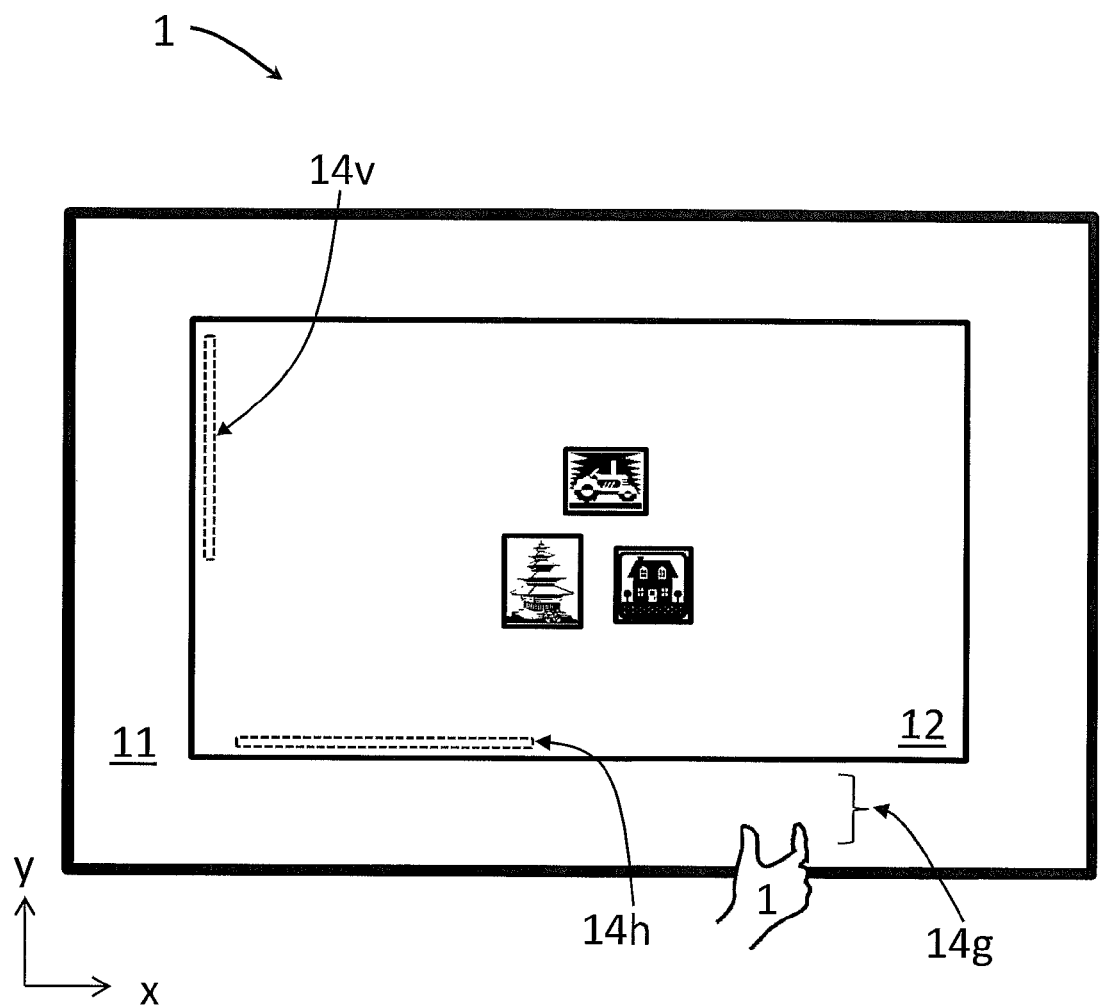
FIGS. 32a and 32b are diagrams of a display device configured to receive contact inputs within portions of an overscan region for manipulating camera views of a canvas.
Figure 32B:
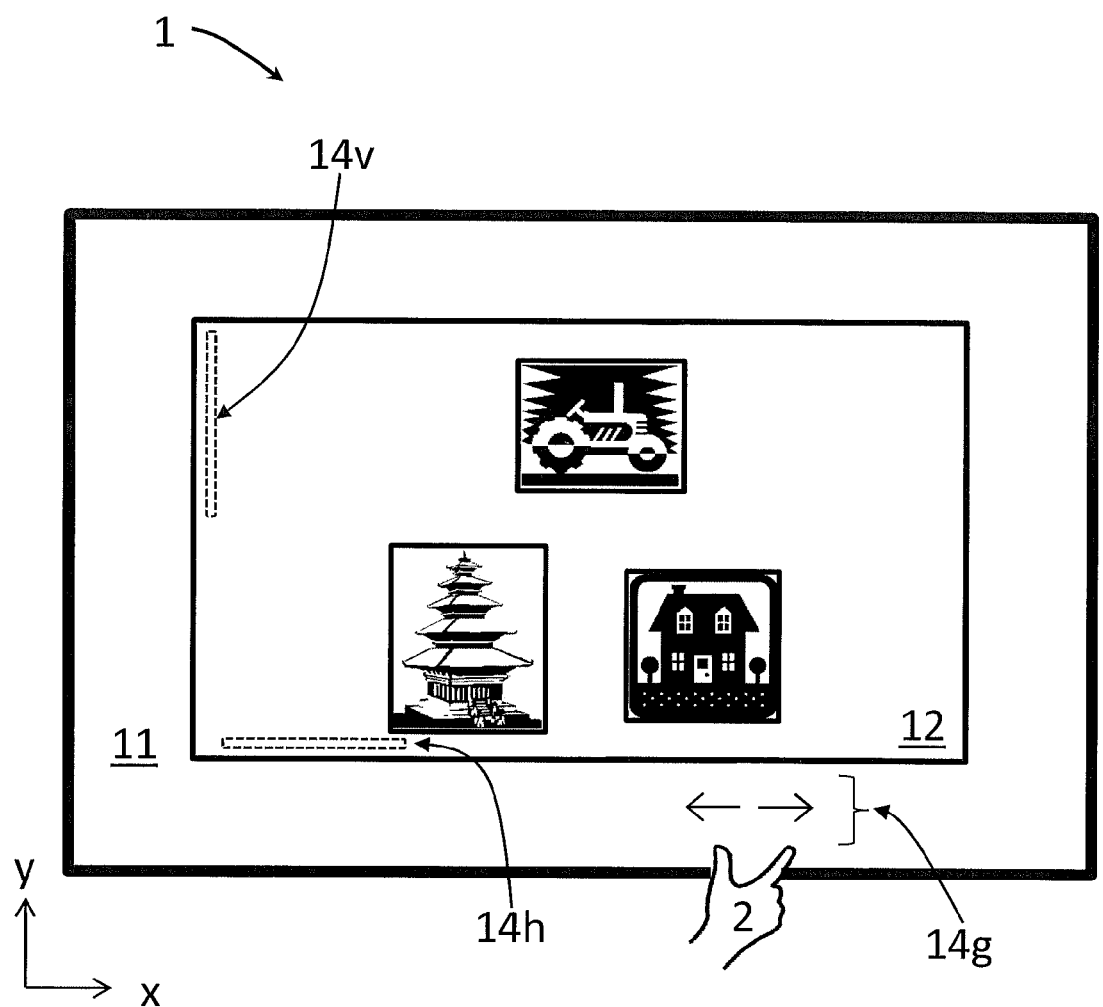

FIGS. 32a and 32b are diagrams of a display device 1 configured to receive contact inputs within portions of an overscan region 11 for manipulating camera views of a canvas. In some implementations, a display device 1 may include a display region 12 displaying image objects of a canvas having orientations along x- and y-axis. A user may manipulate a camera displaying the image objects of the canvas using contact input(s). For example, a user may provide an initial two-contact input (1) within a portion 14g of the overscan region 11. Upon providing the two-contact input (1), vertical and horizontal scroll bars 14v and 14h may be displayed within the display region providing the user with an indication regarding position of the camera with respect to an entirety of the canvas. After the initial two-contact input (1) is received, the user may provide a subsequent two-contact input (2) within the portion 14g of the overscan region 11, as shown in FIG. 32b. For example, the user may provide a "spreading" type input (2), which will cause the camera to zoom-in to the canvas.

In some implementations, a speed in which the user provides the "spreading" type input (2) may determine a speed at which the camera zooms-in to the canvas. For example, providing the "spreading" type input (2) in a relatively slow manner, may result in zooming-in to the canvas in a correspondingly slow speed. Conversely, providing the "spreading" type input (2) in a relatively fast manner, may result in zooming-in to the canvas in a correspondingly fast speed.

As a result of providing the "spreading" type input (2), the image objects will increase in size, but the camera will not pan the canvas. In addition, the vertical and horizontal scroll bars 14v and 14h will decrease in length providing the user with an indication that the camera is showing a reduced area of the canvas, as opposed to the vertical and horizontal scroll bars 14v and 14h shown in FIG. 32a, which are relatively longer than the vertical and horizontal scroll bars 14v and 14h shown in FIG. 32b.

In some implementations, such as FIGS. 31a, 31b, 32a, and 32b, the portion 14g of the overscan region 11 may be prearranged to provide the zoom-out/in functions. For example, although the portion 14g of the overscan region 11 is shown being positioned along a horizontal lower-right region of the overscan region 11, the portion 14g of the overscan region 11 may also be positioned along a vertical right side region of the overscan region 11. Similarly, based upon whether the user is right-handed or left-handed, the portion 14g of the overscan region 11 may be positioned along a horizontal upper/lower-right and/or left region of the overscan region 11.

Figure 33:
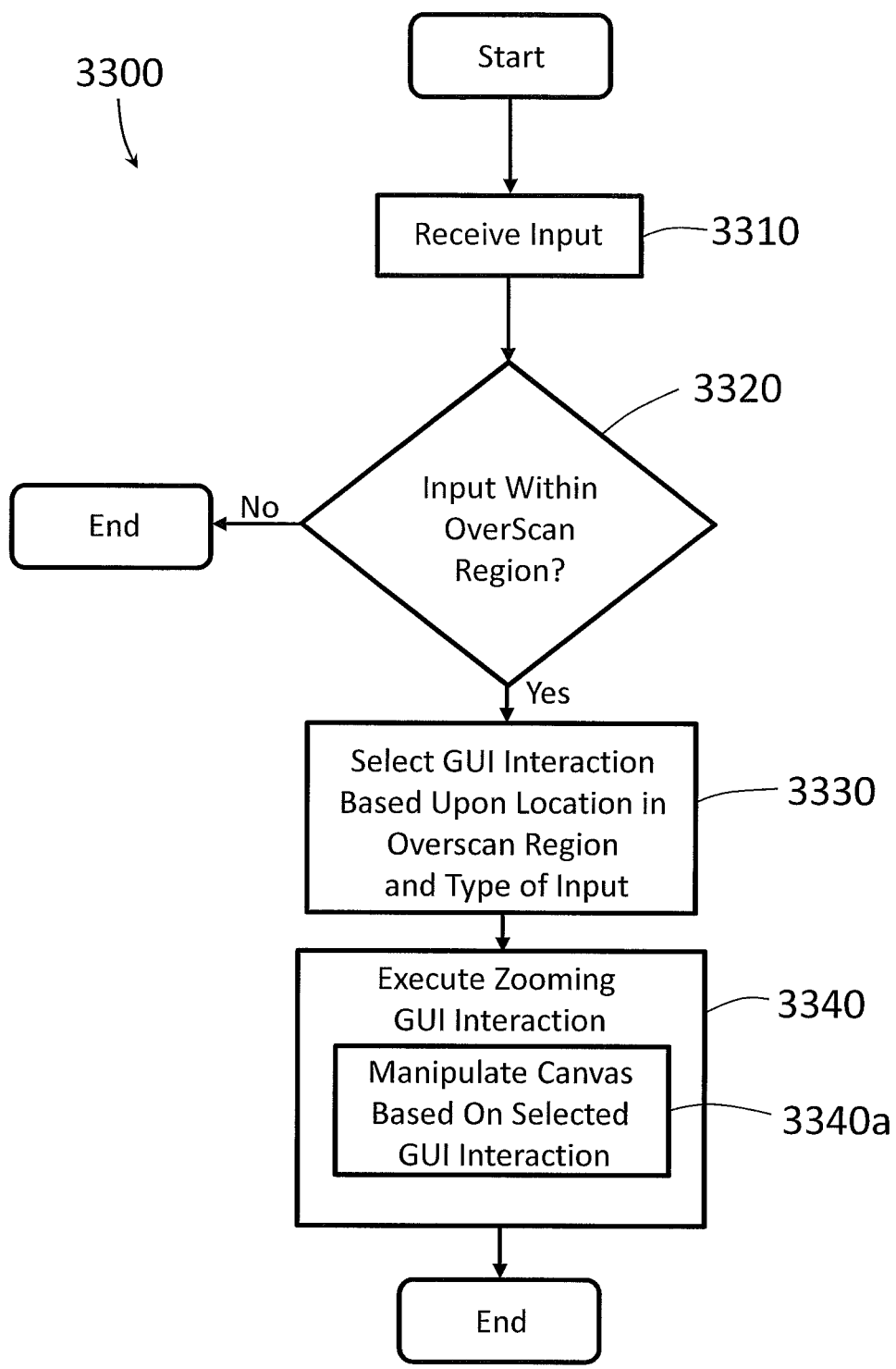
FIG. 33 is a flowchart of an example of an interaction process for selecting a user interface interaction for zooming of camera views of a canvas.

FIG. 33 is a flowchart of an example of an interaction process 3300 for selecting a user interface interaction regarding panning of a camera view. In some implementations, the process 3300 illustrated in FIG. 33 may be performed by, for example, the display device 1 of FIGS. 1 and 2.

A contact input is received at the display device 1 (3310).

A determination is made whether the received contact input is an input at a location within the overscan region 11

(3320). If the received contact input is not an input at a location within the overscan region 11, then process 3300 ends. In some implementations, when the contact input is received within the display region 12 and not within the overscan region 11, processing of the contact input may occur using standard or conventional touchscreen contact input processing. However, if the received contact input corresponds to input received within the overscan region 11, then a GUI interaction is selected based on the location of the contact input within the overscan region 11 and the type of contact input (3330). In this example, the camera zoom GUI interaction is selected based upon a determination that the contact input is received at a location 14g within the portion of the overscan region 11 and based upon a determination that the contact input corresponds to a type of input associated with the camera zooming GUI interaction (e.g., the contact input corresponds a "pinching" or "spreading" motion at a location within the overscan region 11). In some implementations, as detailed above, the "pinching" or "spreading" motion may be provided within the portion 14g of the overscan region 11 assigned to receive "pinching" and/or "spreading" motions. For example, the camera zooming GUI interaction may include a zoom-out functionality in which sizes of the image objects displayed within the display region 12 decrease in accordance with an amount of "pinching" the contact input provides. Conversely, the camera zooming GUI interaction may include a zoom-in functionality in which sizes of the image objects displayed within the display region 12 increase in accordance with an amount of "spreading" the contact input provides. The camera zooming GUI interaction is executed (3340). The execution of the camera zooming GUI interaction may include manipulating the canvas (or camera, depending on the frame of reference regarding the viewer or the image objects) in response to and based on the contact input received within the portion 14g of the overscan region 11 (3340a).

Figure 34:
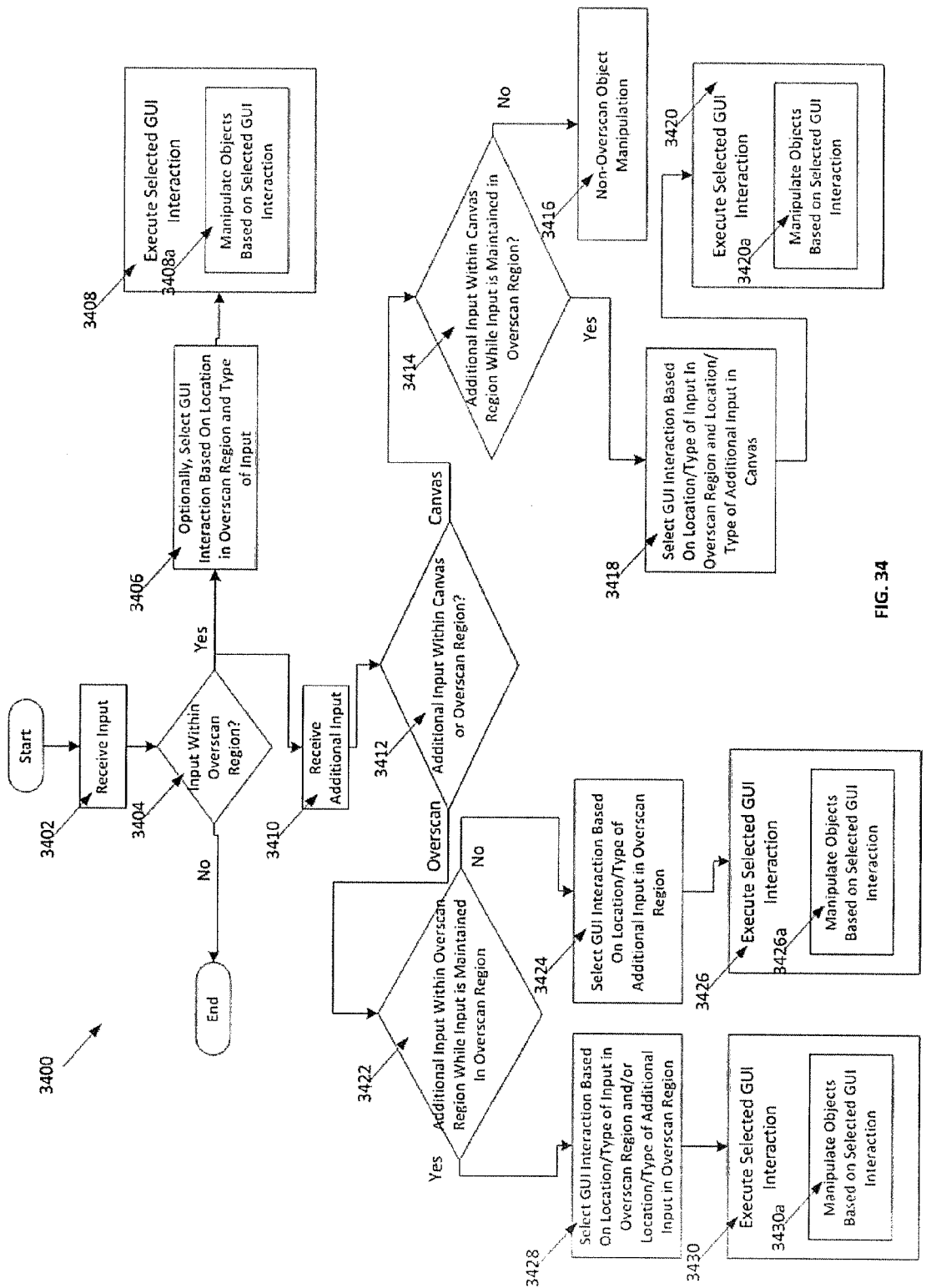
FIG. 34 is a flowchart of an exemplary interaction process for selecting a user interface interaction based on user input within an overscan region.

FIG. 34 is a flowchart of an example of an interaction process 3400 for initiating a GUI interaction in response to user input within an overscan region. Process 3400 is similar to process 300 except that it explicitly provides for GUI interactions that are triggered by (1) a combination of an input within the overscan region and an additional input within the display region (e.g., canvas region) that are concurrently maintained; and (2) a combination of an input within the overscan region and an additional input within the overscan region that are concurrently maintained. In some implementations, the process 3400 illustrated in FIG. 34 may be performed by, for example, the display device 1 of FIGS. 1 and 2.

A contact input is received at the display device 1 (3402). A determination is made whether the received contact input was received within the overscan region 11 (3404). If it is determined that the received contact input was not received within the overscan region 11, then the process 3400 ends. In some implementations, when the contact input is received within the display region and not within the overscan region, processing of the contact input may occur using standard or conventional touchscreen contact input processing.

However, if it is determined that the received contact input was received within the overscan region 11, then, optionally, a Graphic User Interface (GUI) interaction is selected (3406) and executed based on the type of contact input that was received and/or based on a location in the overscan region that received the contact input (3408 and 3408a). In some implementations, the received contact input may not correspond to a type of input that is recognized by the system for triggering a GUI interaction and, therefore, no GUI interaction may be selected in response to the received contact input.

An additional input is received at the display device 1 (3410). A determination is made whether the additional input is within the display region 12 (e.g., canvas) or within the overscan region 11 (3412). If the additional input is determined to be located within the display region 12 (e.g., canvas), a determination is made whether the initial overscan input received during operation 3402 has been maintained (3414). Stated differently, a determination is made whether the input mechanism that generated or is generating the overscan initial input has maintained engagement with the touch screen when the additional canvas input is received (e.g., has maintained continuous or substantially continuous engagement with the touch screen from the time at which the initial overscan gesture began through the time that the additional canvas gesture begins or, in some implementations, ends). If the initial overscan input received during operation 3402 has not been maintained (i.e., the one or more input mechanisms have discontinued contact or engagement with the touch screen when the additional canvas input is received), the additional canvas input is deemed unrelated to an overscan input and, therefore, is processed by the display device 1 in accordance with standard object manipulation techniques that do not leverage overscan inputs (3416).

However, if the initial overscan input received during operation 3402 has been maintained when the additional canvas input is received, a GUI interaction is selected based on the location and type of the initial overscan input and based on the location and type of the additional canvas input (3418). The selected GUI interaction may be executed (3420) and may result in the manipulation of objects displayed on the canvas (3420a).

Thus, in process 3400, a particular GUI interaction may be selected that is based on a combined input formed from both overscan touches/engagement and concurrent display region (e.g., canvas) touches/engagement. For example, a particular GUI interaction may be selected based on a first multi-touch gesture being detected in a first portion of the overscan region 11 and a second multi-touch gesture being concurrently detected in a first portion of the display region 12 or canvas. As such, this particular GUI interaction may only be selected when two distinct and predetermined multi-touch gestures are concurrently detected in two distinct regions of the surface of the display device 1, i.e., one particular gesture in the first portion of the overscan region 11 and another particular gesture in the first portion of the display region 12. If, for example, the second multi-touch gesture were instead concurrently detected in a second portion of the display region 12 rather than in the first portion, then the particular GUI interaction noted above may not be selected and a different GUI interaction may instead be selected based on the two gestures. Alternatively, rather than selecting a different GUI interaction based on the two gestures, each gesture may instead be treated independently from each other. That is, the overscan gesture may result in selection of a particular GUI interaction based on the gesture and its location in the overscan region 11, and the canvas gesture may result in concurrent execution of standard object manipulation processing that does not leverage overscan inputs. Examples of a GUI interaction that is selected based on a combination of an overscan region contact input and a canvas/display region contact input are described below with respect to FIGS. 35-42.

Notably, while process 3400 contemplates the overscan region contact input (or multi-touch gesture) being the initial input and the canvas/display region contact input (or multi-touch gesture) being the subsequent additional input, other implementations may have a different temporal ordering of the inputs. For example, the canvas/display region contact input may be the initial input and the overscan region contact input may be the subsequent additional input, or both inputs may be received simultaneously.

Referring back to FIG. 34, if the additional input is determined to be located in the overscan region 12, then a determination is made whether the initial overscan input received during operation 3402 has been maintained (3422). Stated differently, a determination is made whether the input mechanism that generated or is generating the overscan initial input has maintained engagement with the touch screen when the additional overscan input is received (e.g., has maintained continuous or substantially continuous engagement with the touch screen from the time at which the initial overscan gesture began through the time that the additional overscan gesture begins or, in some implementations, ends). If the initial overscan input received during operation 3402 has not been maintained (i.e., the one or more input mechanisms have discontinued contact or engagement with the touch screen when the additional overscan input is received), the additional overscan input may be deemed unrelated to the initial overscan input and, therefore, may be separately and independently used to select and execute its own separate Graphic User Interface (GUI) interaction (3424, 3426 and 3426a) based on the type of the additional overscan input and/or based on a location in the overscan region that received the additional overscan input.

However, if the initial overscan input received during operation 3402 has been maintained when the additional overscan input is received, then a GUI interaction is selected based on the location of the initial overscan input, the contact type of the initial overscan input, the location of the additional overscan input, and/or the contact type of the additional overscan input (3428). The selected GUI interaction may then be executed (3430) to, for example, enable manipulation of objects displayed in the display region 12 (3430a).

Notably, in some implementations, the initial overscan input and the additional overscan inputs may result in two different and independent GUI interactions occurring separately and concurrently. For example, the initial overscan input may be vertical slide up that initiates a keyboard GUI interaction that results in a keyboard appearing to slide up from the overscan region and into the bottom of the display region. While the user is using one hand to slide-up the keyboard, the user may concurrently use a second hand to initiate a separate terminate viewer GUI interaction that results in a viewer displayed at the top of the display region to appear to slide up into the overscan region and out-of-view. The sliding up of the viewer may occur concurrently with the sliding up of the keyboard.

In some implementations, the initial overscan input results in selection and execution of an initial GUI interaction and the subsequent overscan input results in a termination of the initial GUI interaction by replacing the initial GUI interaction with a subsequent GUI interaction. For example, the initial overscan input may be the sliding of a single-finger vertically in portion 11c of the overscan region 11 that results in a viewer GUI interaction that triggers a viewer to begin sliding up from the overscan region into the display region 12. The subsequent overscan input may be a second finger that slides a bit slower than the first finger along the same portion 11c of the overscan region 11 that combines with the first finger to create a two-finger sliding and separating gesture that replaces the viewer GUI interaction with a combined zooming/panning GUI interaction that zooms the camera view based on the distance change between the two fingers and pans the camera view as a function of the movement of the centroid of the positions of the two fingers.

While process 3400 discloses a single initial input and a single additional input, it should be understood that any number of overscan and/or display region inputs that are concurrently maintained (i.e., concurrently engaging the touch screen at the same time) may be combined to select different GUI interactions. Similarly, any number of overscan and/or display region inputs that are concurrently maintained may be treated separately and independently such that each overscan input may trigger its own separate GUI interaction that occurs concurrently with those triggered by the other inputs and each display region input may trigger its own execution of standard object manipulation processing that does not leverage overscan inputs that occurs concurrently with those triggered by the other inputs.

Figure 35A:
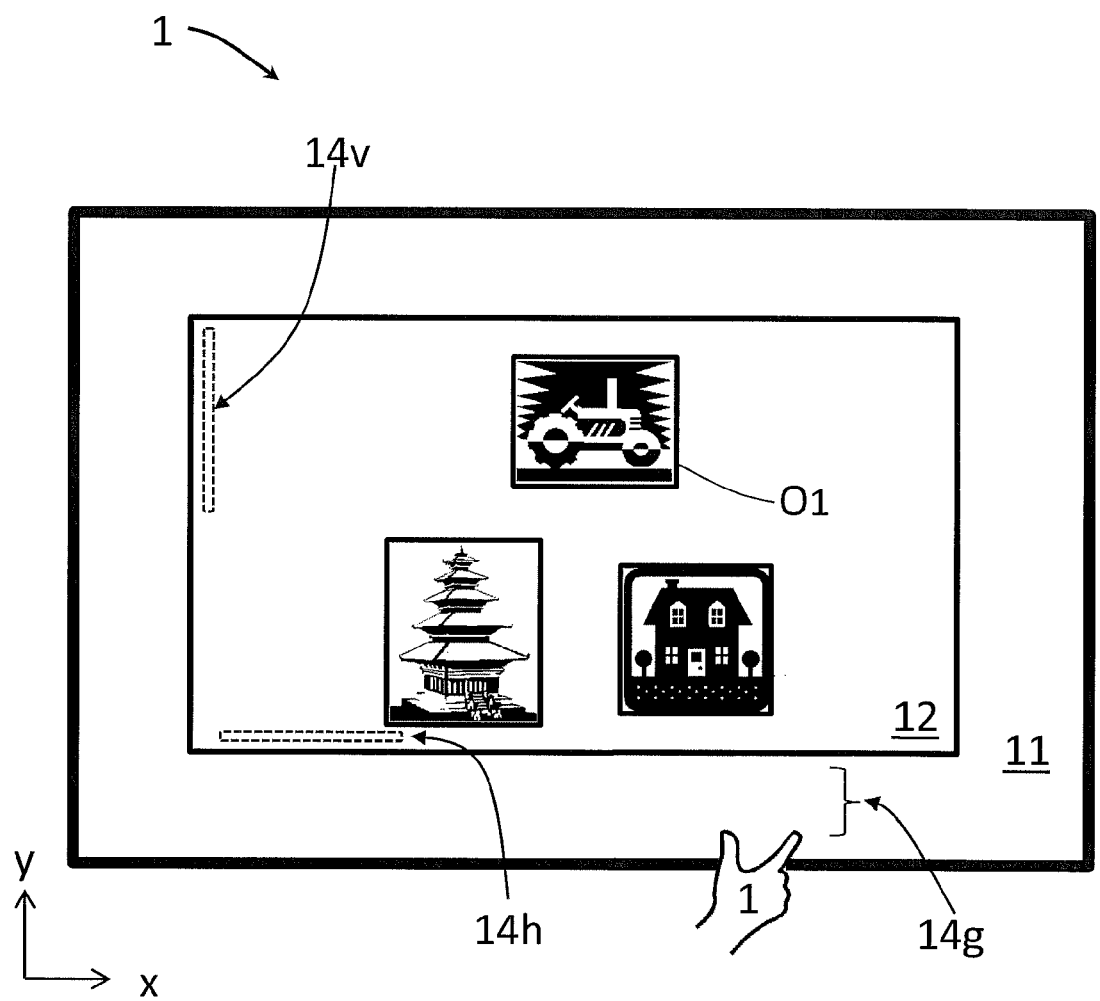
FIGS. 35a and 35b are diagrams of a display device configured to receive contact inputs within portions of an overscan region and a display region to manipulate camera views of a canvas.
Figure 35B:
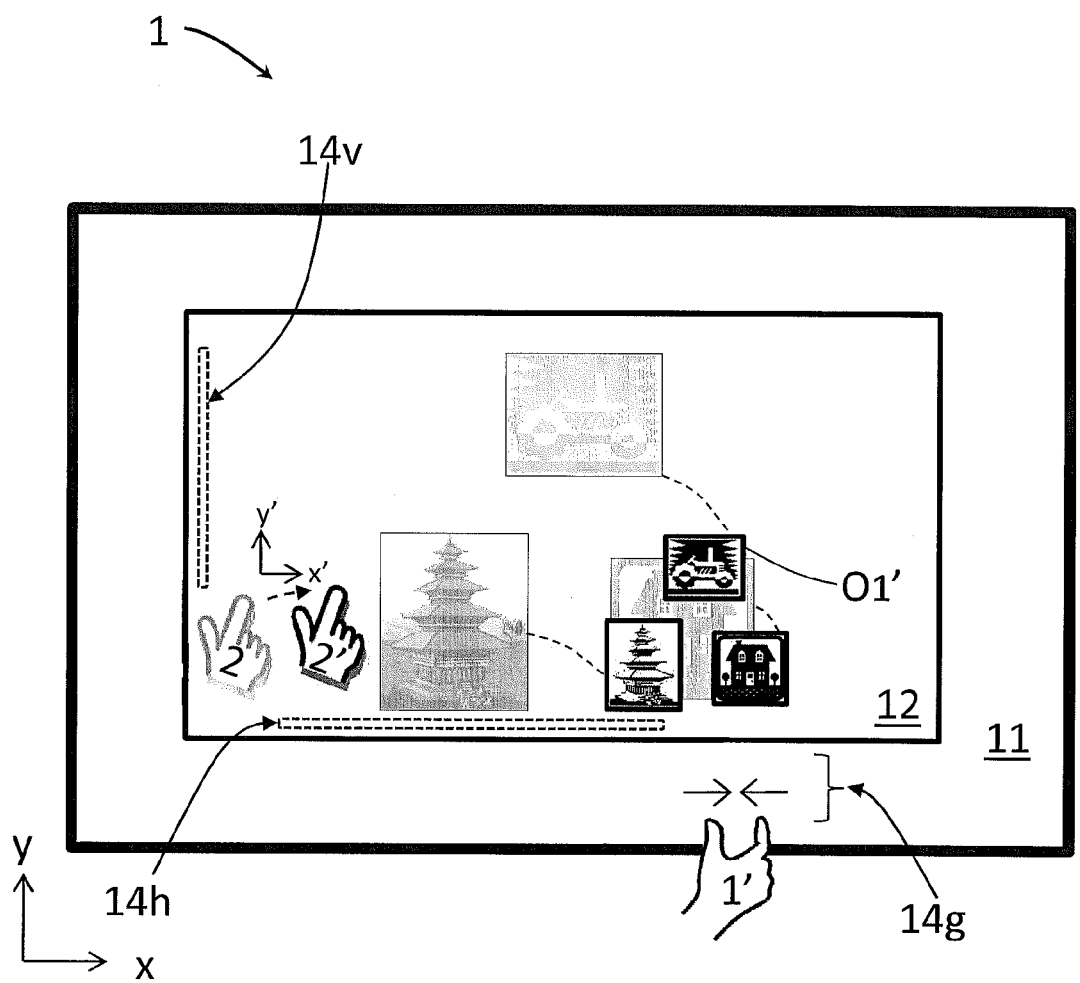

FIGS. 35a and 35b are diagrams of a display device 1 configured to receive contact inputs within portions of an overscan region 11 and a display region 12 to manipulate camera views of a canvas. In some implementations, a display device 1 may include a display region 12 displaying image objects of a canvas having orientations along x- and y-axis. A user may manipulate a camera displaying the image objects of the canvas using contact input(s). For example, a user may provide an initial two-contact input (1) within a portion 14g of the overscan region 11, wherein an image object O1 is shown. Upon providing the two-contact input (1), vertical and horizontal scroll bars 14v and 14h may be displayed within the display region providing the user with an indication regarding position of the camera with respect to an entirety of the canvas. After the initial two-contact input (1) is received, the user may provide a subsequent two-contact input (1') within the portion 14g of the overscan region 11, as shown in FIG. 34b. For example, the user may provide a "pinching" type input (1'), which will cause the camera to zoom-out from the canvas, wherein the image object O1' is shown.

In some implementations, a speed in which the user provides the "pinching" type input (2) may determine a speed at which the camera zooms-out from the canvas. For example, providing the "pinching" type input (2) in a relatively slow manner, may result in zooming-out from the canvas in a correspondingly slow speed. Conversely, providing the "pinching" type input (2) in a relatively fast manner, may result in zooming-out from the canvas in a correspondingly fast speed.

Additionally, in some implementations, such as FIG. 34b, the user may provide an additional contact input (2) within the display region 12 and a subsequent contact input (2'). For example, the subsequent contact input (2') may include both x- and y-axis components. Here, the additional and subsequent contact inputs (2) and (2') may be provided during entry of the "pinching" type input (1'). As a result, not only do the image objects decrease in size, but the canvas is moved along a direction of the subsequent contact input (2') with respect to the additional contact input (2). In addition, the vertical and horizontal scroll bars 14v and 14h will increase in length providing the user with an indication that the camera is showing an increased area of the canvas, as opposed to the vertical and horizontal scroll bars 14v and 14h shown in FIG. 34a, which are relatively shorter than the vertical and horizontal scroll bars 14v and 14h shown in FIG. 34b.

In addition, in some implementations, such as that shown in FIG. 34b, providing the contact inputs (1)/(1') and (2)/(2'), i.e., zoom-out of the canvas and moving the canvas (panning the camera) along x- and y-axis directions, will move the vertical and horizontal scroll bars 14v and 14h vertically and horizontally, respectively, along a direction substantially opposite to the sequence of contact inputs (1)/(1') and (2)/(2'). Moreover, the vertical and horizontal scroll bars 14v and 14h will lengthen corresponding to the amount of zoom-out of the canvas provided by the contact inputs (1)/(1'). Here, moving the canvas along a direction corresponding to a direction substantially the same as the direction of the contact inputs (1)/(1') and (2)/(2') results in changing a camera view of the canvas along a direction substantially opposite to the direction of the contact inputs (1)/(1') and (2)/(2').

Figure 36A:
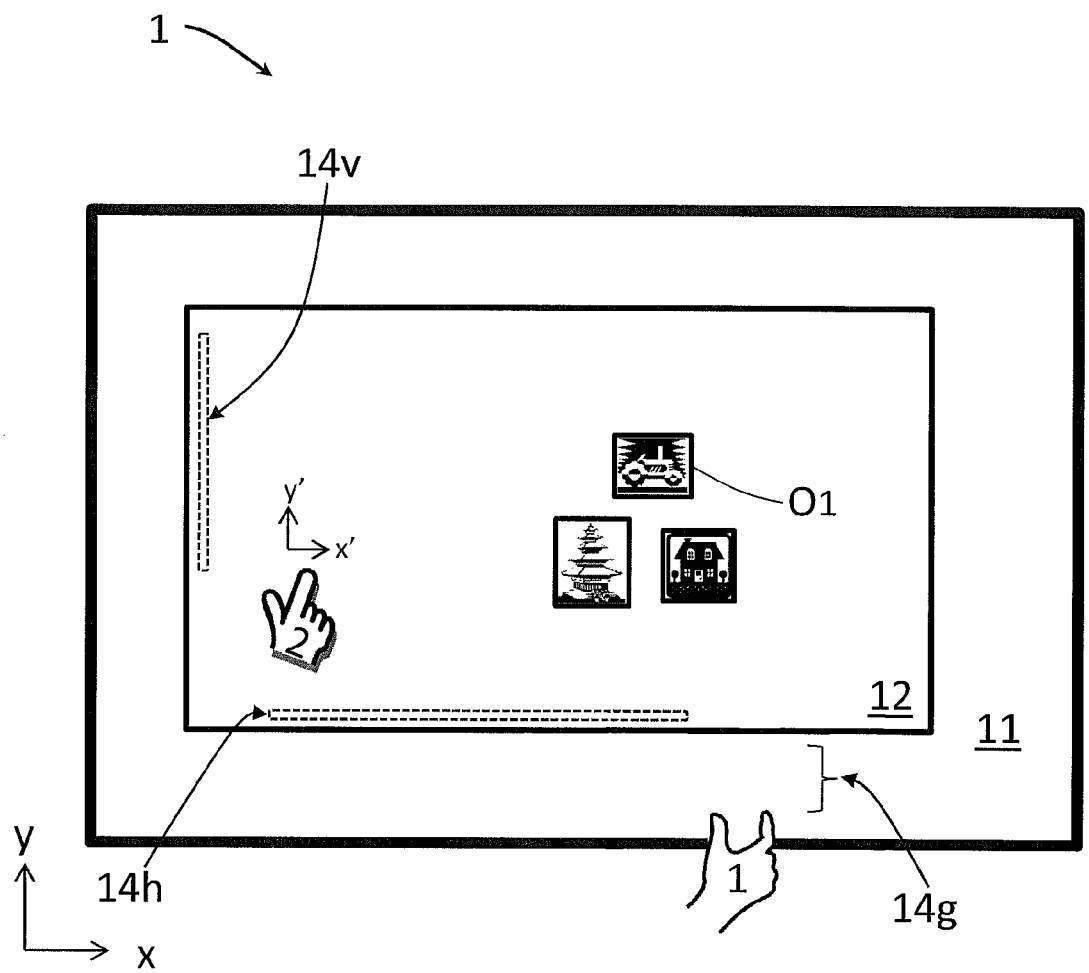
FIGS. 36a and 36b are diagrams of a display device configured to receive contact inputs within portions of an overscan region and a display region to manipulate camera views of a canvas.
Figure 36B:
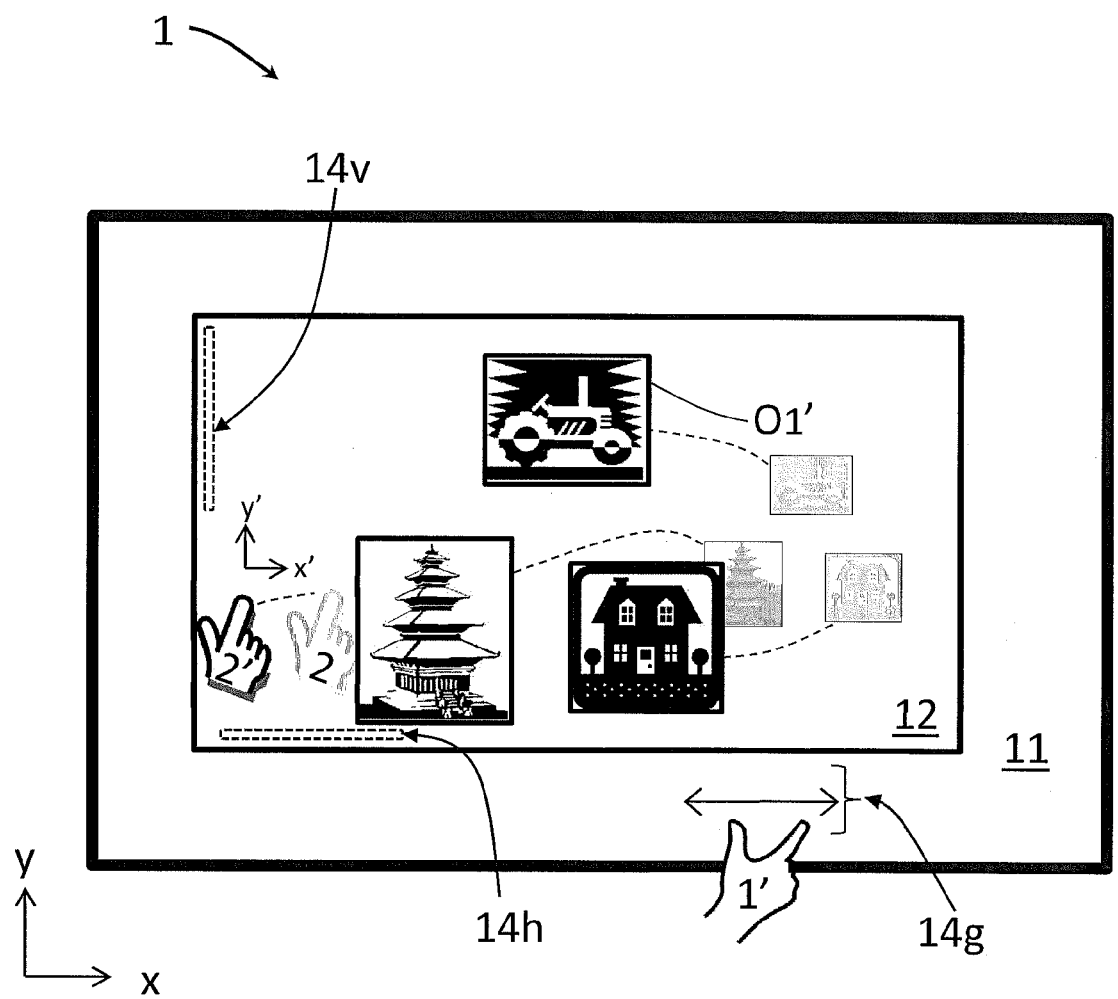

FIGS. 36*a* and 36*b* are diagrams of a display device 1 configured to receive contact inputs within portions of an overscan region 11 and a display region 12 to manipulate camera views of a canvas. In some implementations, a display device 1 may include a display region 12 displaying image objects of a canvas having orientations along x- and y-axis. A user may manipulate a camera displaying the image objects of the canvas using contact input(s). For example, a user may provide an initial two-contact input (1) within a portion 14*g* of the overscan region 11, wherein an image object O1 is shown. Upon providing the two-contact input (1), vertical and horizontal scroll bars 14*v* and 14*h* may be displayed within the display region providing the user with an indication regarding position of the camera with respect to an entirety of the canvas. After the initial two-contact input (1) is received, the user may provide a subsequent two-contact input (1') within the portion 14*g* of the overscan region 11, as shown in FIG. 35*b*. For example, the user may provide a "spreading" type input (1'), which will cause the camera to zoom-in to a canvas, wherein the image object O1' is shown.

In some implementations, a speed in which the user provides the "spreading" type input (2) may determine a speed at which the camera zooms-in to the canvas. For example, providing the "spreading" type input (2) in a relatively slow manner, may result in zooming-in to the canvas in a correspondingly slow speed. Conversely, providing the "spreading" type input (2) in a relatively fast manner, may result in zooming-in to the canvas in a correspondingly fast speed.

Additionally, in some implementations, such as FIG. 35*b*, the user may provide an additional contact input (2) within the display region 12 and a subsequent contact input (2'). For example, the subsequent contact input (2') may include both x- and y-axis components. Here, the additional and subsequent contact inputs (2) and (2') may be provided during entry of the "spreading" type input (1'). As a result, not only do the image objects increase in size (i.e., the zoom-in of the canvas), but the canvas is moved along a direction of the subsequent contact input (2') with respect to the additional contact input (2). In addition, the vertical and horizontal scroll bars 14*v* and 14*h* will decrease in length providing the user with an indication that the camera is showing a reduced area of the canvas, as opposed to the vertical and horizontal scroll bars 14*v* and 14*h* shown in FIG. 35*a*, which are relatively longer than the vertical and horizontal scroll bars 14*v* and 14*h* shown in FIG. 35*b*.

In addition, in some implementations, such as that shown in FIG. 35*b*, providing the contact inputs (1)/(1') and (2)/(2'), i.e., zoom-in of the canvas and moving the canvas (panning the camera) along x- and y-axis directions, will move the vertical and horizontal scroll bars 14*v* and 14*h* vertically and horizontally, respectively, along a direction substantially opposite to the sequence of contact inputs (1)/(1') and (2)/(2'). Moreover, the vertical and horizontal scroll bars 14*v* and 14*h* will shorten corresponding to the amount of zoom-in of the canvas provided by the contact inputs (1)/(1'). Here, moving the canvas along a direction corresponding to a direction substantially the same as the direction of the contact inputs (1)/(1') and (2)/(2') results in changing a camera view of the canvas along a direction substantially opposite to the direction of the contact inputs (1)/(1') and (2)/(2').

Figure 37A:
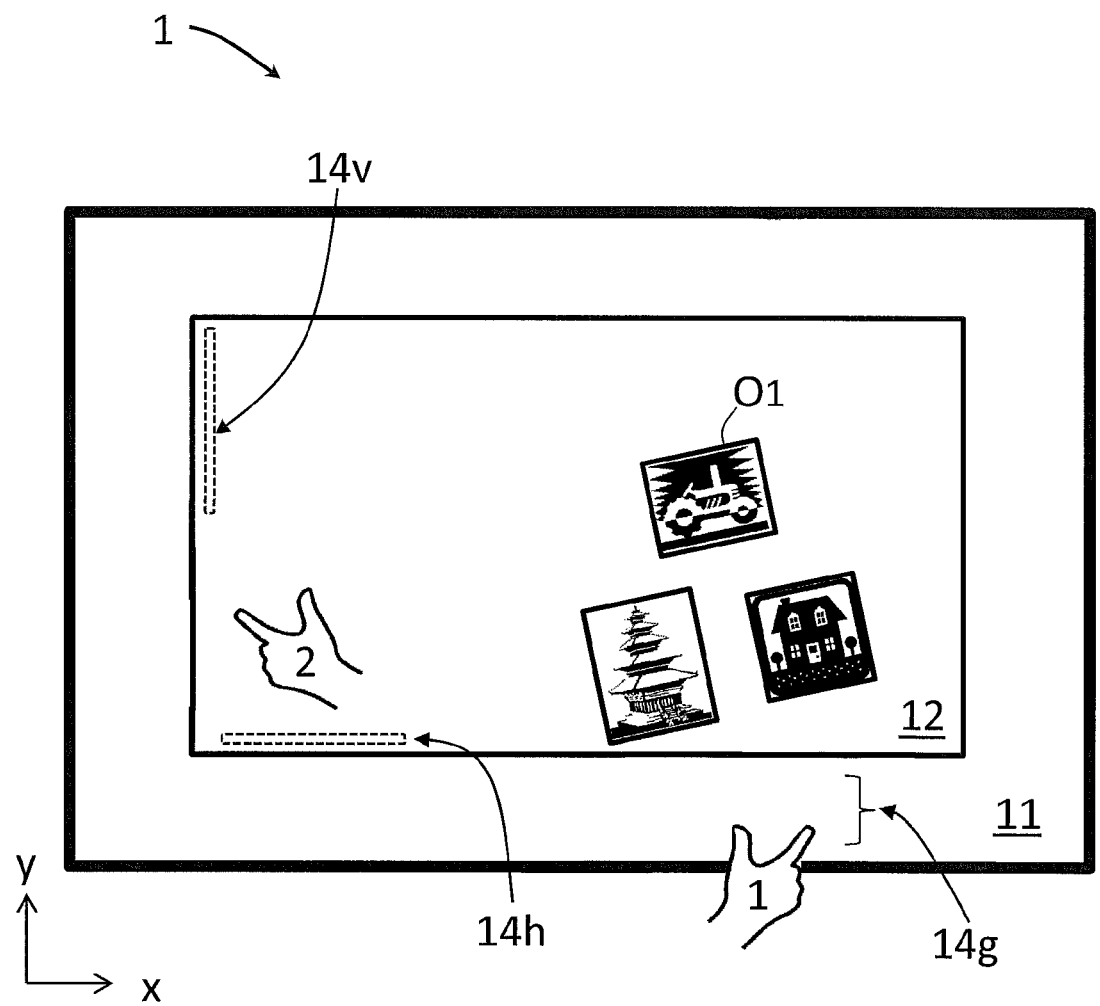
FIGS. 37a and 37b are diagrams of a display device configured to receive contact inputs within portions of an overscan region and a display region to manipulate camera views of a canvas.
Figure 37B:
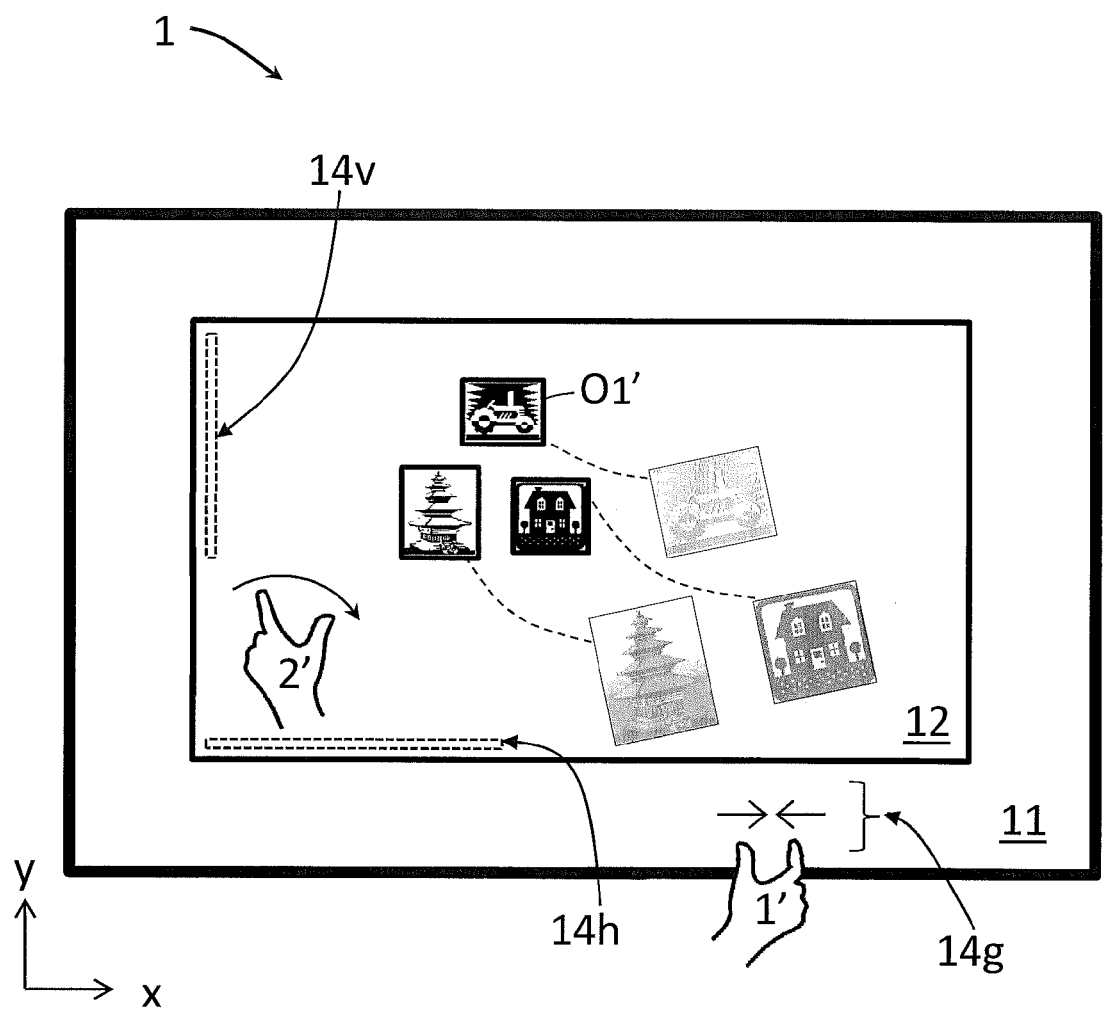

FIGS. 37*a* and 37*b* are diagrams of a display device 1 configured to receive contact inputs within portions of an overscan region 11 and a display region 12 to manipulate camera views of a canvas. In some implementations, a display device 1 may include a display region 12 displaying image objects of a canvas having orientations along x- and y-axis. A user may manipulate a camera displaying the image objects of the canvas using contact input(s). For example, a user may provide an initial two-contact input (1) within a portion 14*g* of the overscan region 11, wherein an image object O1 is shown. Upon providing the two-contact input (1), vertical and horizontal scroll bars 14*v* and 14*h* may be displayed within the display region providing the user with an indication regarding position of the camera with respect to an entirety of the canvas. After the initial two-contact input (1) is received, the user may provide a subsequent two-contact input (1') within the portion 14*g* of the overscan region 11, as shown in FIG. 37*b*. For example, the user may provide a "pinching" type input (1'), which will cause the camera to zoom-out from the canvas, wherein the image object O1 is rotated clockwise and shown as image object O1'.

In some implementations, a speed in which the user provides the "pinching" type input (2) may determine a speed at which the camera zooms-out from the canvas. For example, providing the "pinching" type input (2) in a relatively slow manner, may result in zooming-out from the canvas in a correspondingly slow speed. Conversely, providing the "pinching" type input (2) in a relatively fast manner, may result in zooming-out from the canvas in a correspondingly fast speed.

Additionally, in some implementations, such as in FIG. 37*b*, the user may provide an additional two-contact input (2) within the display region 12 and a subsequent two-contact input (2'). For example, the subsequent contact input (2') may include a clockwise rotational movement. Here, the additional and subsequent contact inputs (2) and (2') may be provided during entry of the "pinching" type input (1'). As a result, not only do the image objects decrease in size (i.e., zoom out of the canvas), but the canvas is rotated clockwise about an angle of the subsequent contact input (2') with respect to the additional two-contact input (2). In addition, the vertical and horizontal scroll bars 14*v* and 14*h* will increase in length providing the user with an indication that the camera is showing an increased area of the canvas, as opposed to the vertical and horizontal scroll bars 14*v* and 14*h* shown in FIG. 37*a*, which are relatively shorter than the vertical and horizontal scroll bars 14*v* and 14*h* shown in FIG. 37*b*.

In addition, in some implementation, such as that shown in FIG. 37*b*, providing the two-contact inputs (1)/(1') and (2)/(2'), i.e., zoom-out of the canvas and clockwise rotation of the canvas about an angle based upon the additional and subsequent two contact inputs (2) and (2'), will lengthen the vertical and horizontal scroll bars 14*v* and 14*h* vertically and horizontally, respectively, along a direction substantially opposite to the sequence of contact inputs (1) and (1') corresponding to the amount of zoom-out of the canvas provided by the contact inputs (1) and (1'). Here, moving the canvas along a direction corresponding to a direction substantially the same as the direction of the contact inputs (1) and (1') results in changing a camera view of the canvas along a direction substantially opposite to the direction of the two-contact inputs (1) and (1').

Figure 38A:
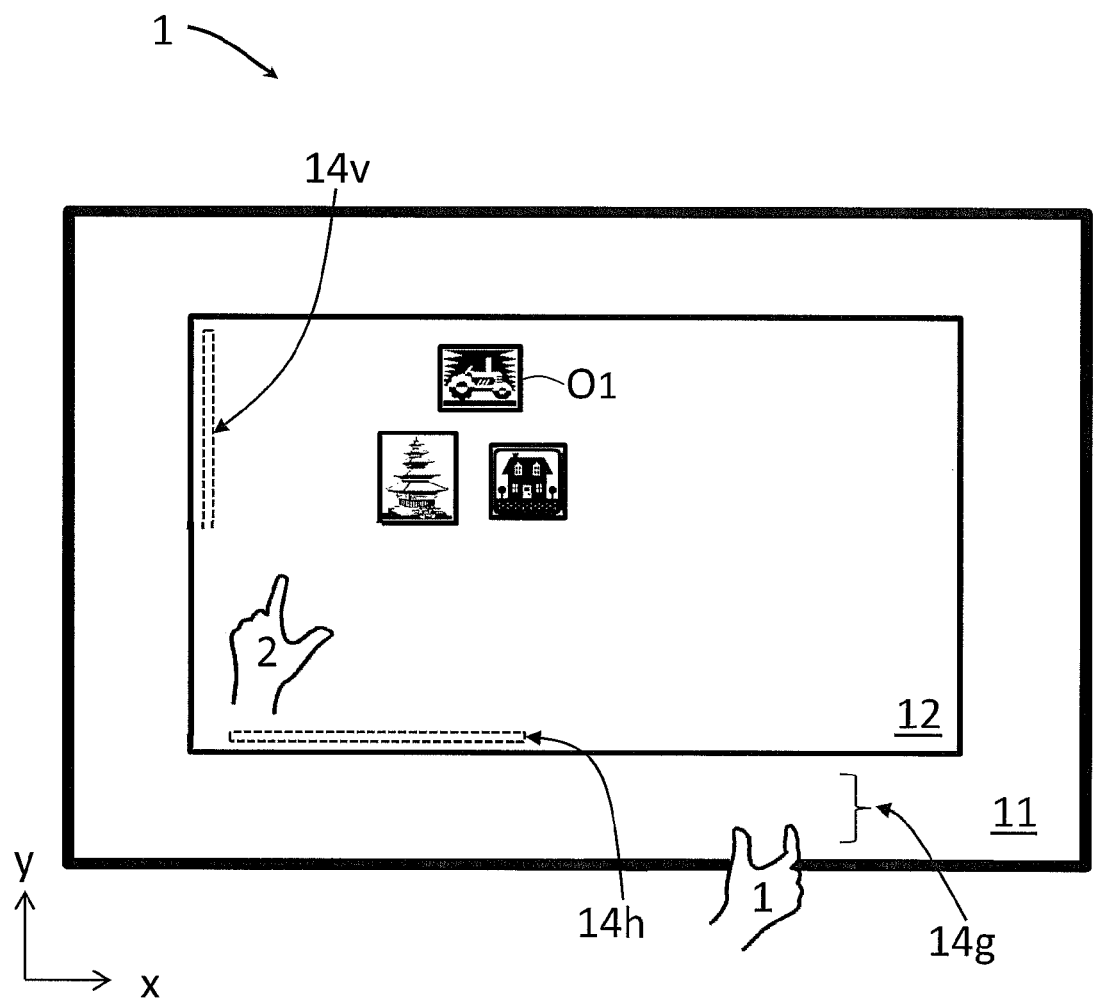
FIGS. 38a and 38b are diagrams of a display device configured to receive contact inputs within portions of an overscan region and a display region to manipulate camera views of a canvas.
Figure 38B:
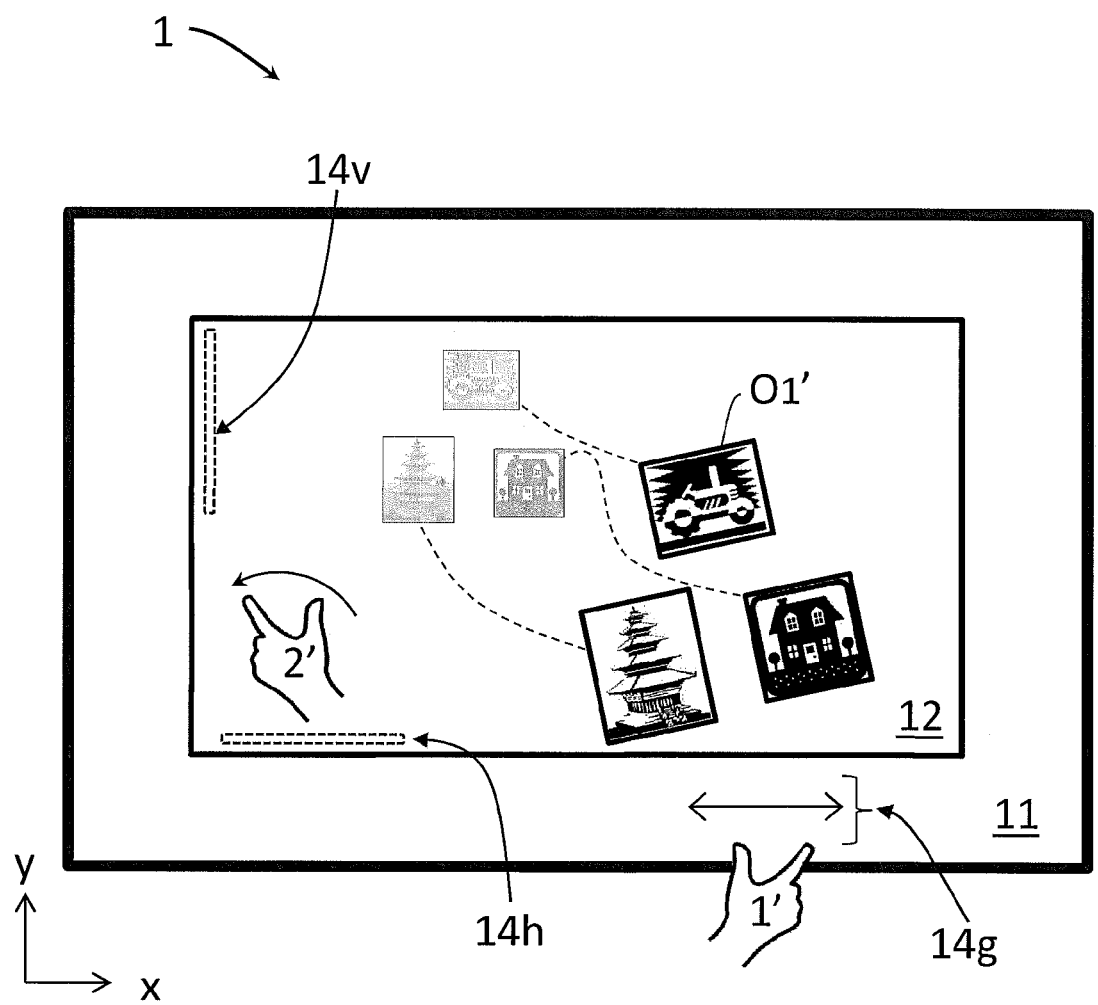

FIGS. 38*a* and 38*b* are diagrams of a display device 1 configured to receive contact inputs within portions of an overscan region 11 and a display region 12 to manipulate camera views of a canvas. In some implementations, a display device 1 may include a display region 12 displaying image objects of a canvas having orientations along x- and y-axis. A user may manipulate a camera displaying the image objects of the canvas using contact input(s). For example, a user may provide an initial two-contact input (1) within a portion 14g of the overscan region 11, wherein an image object O1 is shown. Upon providing the two-contact input (1), vertical and horizontal scroll bars 14v and 14h may be displayed within the display region providing the user with an indication regarding position of the camera with respect to an entirety of the canvas. After the initial two-contact input (1) is received, the user may provide a subsequent two-contact input (1') within the portion 14g of the overscan region 11, as shown in FIG. 38b. For example, the user may provide a "spreading" type input (1'), which will cause the camera to zoom-in to the canvas, wherein the image object O1 is rotated counter-clockwise and shown as image object O1'.

In some implementations, a speed in which the user provides the "spreading" type input (2) may determine a speed at which the camera zooms-in to the canvas. For example, providing the "spreading" type input (2) in a relatively slow manner, may result in zooming-in to the canvas in a correspondingly slow speed. Conversely, providing the "spreading" type input (2) in a relatively fast manner, may result in zooming-in to the canvas in a correspondingly fast speed.

Additionally, in some implementations, as shown in FIG. 38b, the user may provide a two-contact input (2) within the display region 12 and a subsequent two-contact input (2'). For example, the subsequent contact input (2') may include a counter-clockwise rotational movement. Here, the additional and subsequent contact inputs (2) and (2') may be provided during entry of the "spreading" type input (1'). As a result, not only do the image objects increase in size, but the canvas is rotated counter-clockwise about an angle of the subsequent contact input (2') with respect to the two-contact input (2). In addition, the vertical and horizontal scroll bars 14v and 14h will decrease in length providing the user with an indication that the camera is showing a reduced area of the canvas, as opposed to the vertical and horizontal scroll bars 14v and 14h shown in FIG. 38a, which are relatively longer than the vertical and horizontal scroll bars 14v and 14h shown in FIG. 38b.

In addition, in some implementations, such as that shown in FIG. 38b, providing the two-contact inputs (1)/(1') and (2)/(2'), i.e., zoom-in of the canvas and counter-clockwise rotation of the canvas about an angle based upon the initial and subsequent two contact inputs (2) and (2'), will shorten the vertical and horizontal scroll bars 14v and 14h vertically and horizontally, respectively, along a direction substantially opposite to the sequence of contact inputs (1) and (1') corresponding to the amount of zoom-in of the canvas provided by the contact inputs (1) and (1'). Here, moving the canvas along a direction corresponding to a direction substantially the same as the direction of the contact inputs (1) and (1') results in changing a camera view of the canvas along a direction substantially opposite to the direction of the two-contact inputs (1) and (1').

Figure 39:
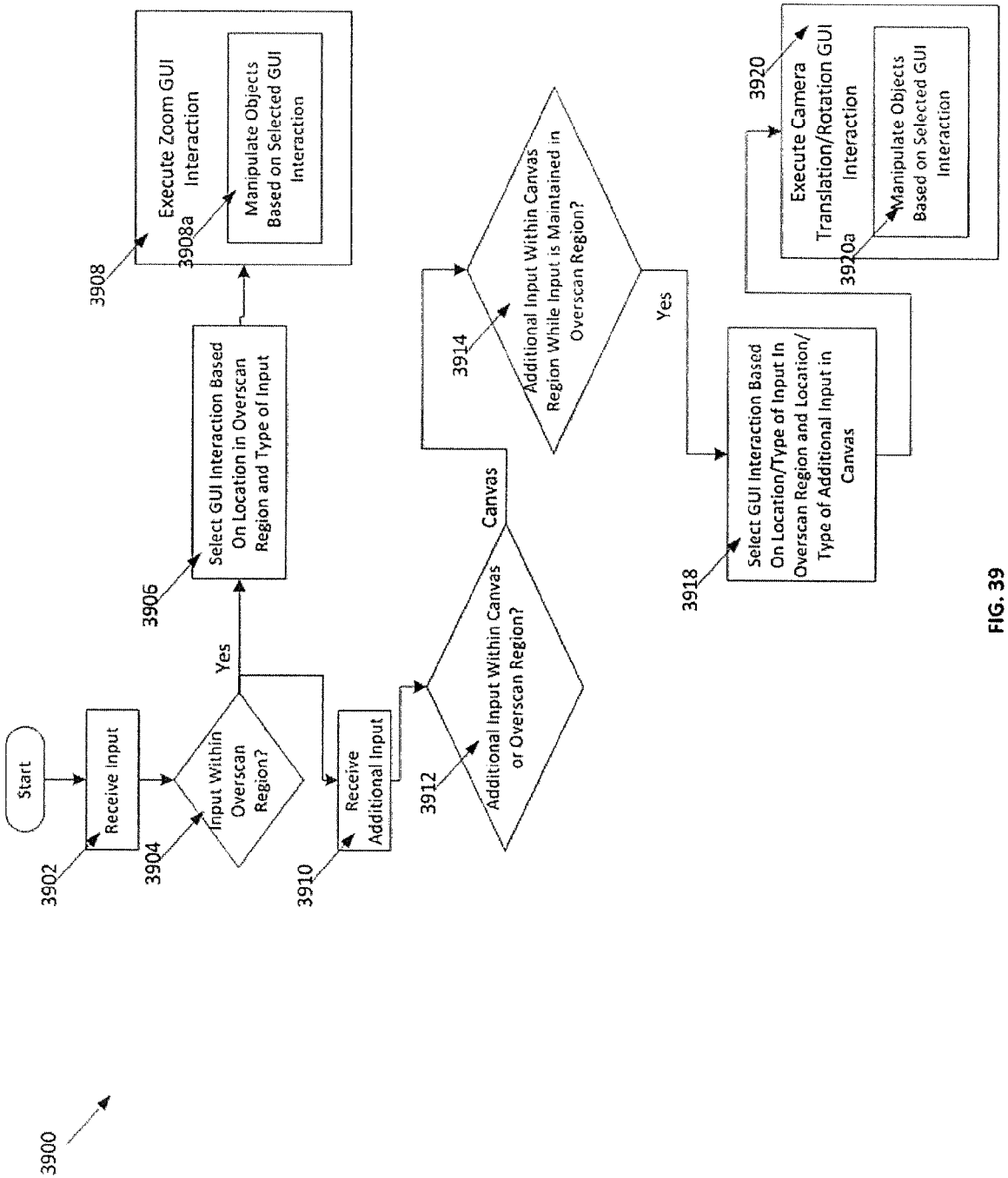
FIG. 39 is a flowchart of an example of an interaction process for selecting a user interface interaction for manipulating camera views of a canvas.

FIG. 39 is a flowchart of an example of an interaction process 3900 for enabling interaction with camera views of a canvas. Process 3900 is an example of process 3400 where the overscan input triggers a zoom GUI interaction (i.e., a zooming in or out of the camera view of the canvas) and the additional canvas input triggers a camera translation/rotation GUI interaction (i.e., a translating or rotating of the camera view of the canvas). In some implementations, the process 3900 illustrated in FIG. 39 may be performed by, for example, the display device 1 of FIGS. 1 and 2.

A contact input is received at the display device 1 (3902). A determination is made whether the received contact input was received within the overscan region 11 (3904). After the received contact input is determined to be received within the overscan region 11, a zoom GUI interaction is selected (3906) and executed based on the type of contact input that was received and/or based on a location in the overscan region that received the contact input (3908 and 3908a). In some implementations, as detailed above, the received contact input may be a two-finger "pinching" or "spreading" motion provided within the portion 14g of the overscan region 11 assigned to receive "pinching" and/or "spreading" motions. For example, the zoom GUI interaction may perform a zoom-out function in which sizes of the image objects displayed within the display region 12 decrease in accordance with an amount of "pinching" the contact input provides. Conversely, the zoom GUI interaction may perform a zoom-in functionality in which sizes of the image objects displayed within the display region 12 increase in accordance with an amount of "spreading" the contact input provides.

An additional input is received at the display device 1 (3910). A determination is made whether the additional input is within the display region 12 (e.g., canvas) or within the overscan region 11 (3912). The additional input is determined to be located within the display region 12 (e.g., canvas) and, therefore, a determination is made whether the initial overscan input received during operation 3902 has been maintained (3914). Stated differently, a determination is made whether the input mechanism that generated or is generating the overscan initial input has maintained engagement with the touch screen when the additional canvas input is received (e.g., has maintained continuous or substantially continuous engagement with the touch screen from the time at which the initial overscan gesture began through the time that the additional canvas gesture begins or, in some implementations, ends). In this example, the initial overscan input received during operation 3402 has been maintained when the additional canvas input is received, and, therefore, a camera translation/rotation GUI interaction is selected based on the location and type of the initial overscan input and based on the location and type of the additional canvas input (3918). The selected camera translation/rotation GUI interaction may be executed (3920) and may result in the camera view of the canvas translating and/or rotating which results in a corresponding manipulation of the displayed objects as shown, for example, in FIGS. 35 through 38 (3920a).

Thus, in exemplary process 3900, the display device 1 selects a zoom GUI interaction in response to an initial overscan engagement input, such as for, example, a two-finger contact input corresponding to a "pinching" or "spreading" motion. The display device 1 executes the selected zoom GUI interaction to cause the camera view to zoom-in and/or out of the canvas responsive to the pinching and/or spreading motions. An additional canvas engagement input, such as, for example, a single-finger contact input similar to that shown in FIG. 35B or FIG. 36B, is received by the display region of the display device while the two fingers providing the initial overscan engagement input remain engaged and thereby continue to provide input to the overscan region of the display device. The display device 1 selects the camera translation/rotation GUI interaction based on its concurrent detection of the two-finger contact input within the overscan region and the single-finger contact input within the display region. As the three fingers move while concurrently remaining engaged with the touch screen, two different GUI interactions concurrently execute to cause the camera view to change: (1) the zoom GUI interaction causes the camera view to zoom-in or zoom-out as a function of the separation distance between the two fingers in the overscan region; and, concurrently, (2) the camera translation/rotation GUI interaction causes the camera view to translate as a function of the translation of the single additional finger in the display region.

In another example, the additional canvas engagement input may be a two-finger contact input similar to that shown in FIG. 37b or FIG. 38b, where the tips of the two fingers rotate such that two touch points/areas corresponding to the tips of the two fingers rotate a given angular amount about their centroid. The display device 1 selects the camera translation/rotation GUI interaction based on its concurrent detection of the two-finger contact input within the overscan region and the two-finger contact input within the display region. As the four fingers move while concurrently remaining engaged with the touch screen, two different GUI interactions concurrently execute to cause the camera view to change: (1) the zoom GUI interaction causes the camera view to zoom-in or zoom-out as a function of the separation distance between the two fingers in the overscan region; and, concurrently, (2) the camera translation/rotation GUI interaction causes the camera view to rotate as a function of the rotation of the two touch points/areas corresponding to the tips of the two fingers contacting/engaging the display region. In some implementations, a centroid of the two touch points/areas corresponding to the tips of the two fingers touching the display region is also calculated such that movement of the centroid additionally causes the translation/rotation GUI interaction to produce a corresponding translation of the camera view as function of the movement of the centroid concurrently with the rotation of the camera view.

Figure 40:
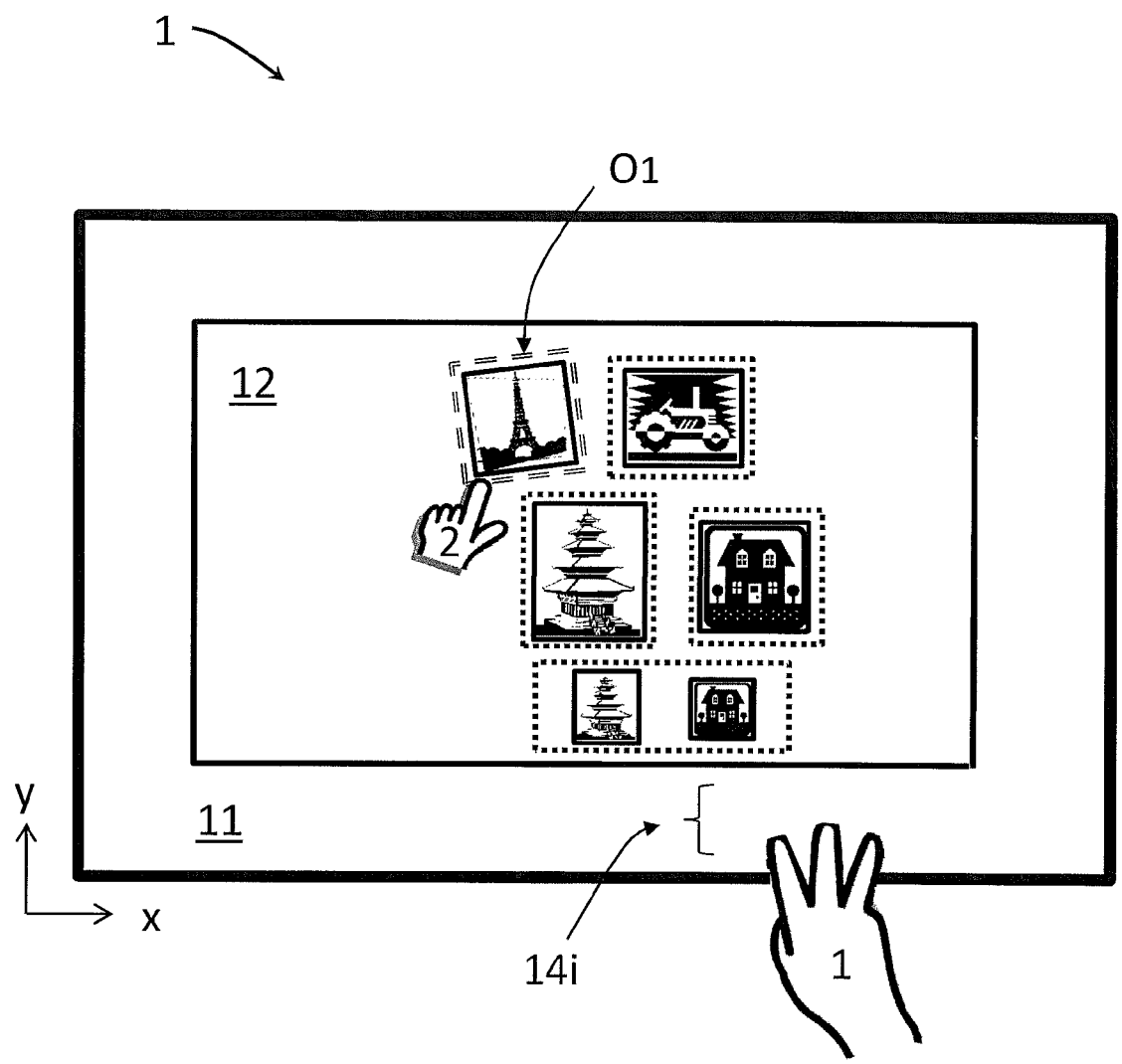
FIGS. 40 and 41 are diagrams of a display device configured to receive contact inputs within portions of an overscan region and a display region to enable selection of displayed image objects and centering a camera view on the selected objects.
Figure 41:
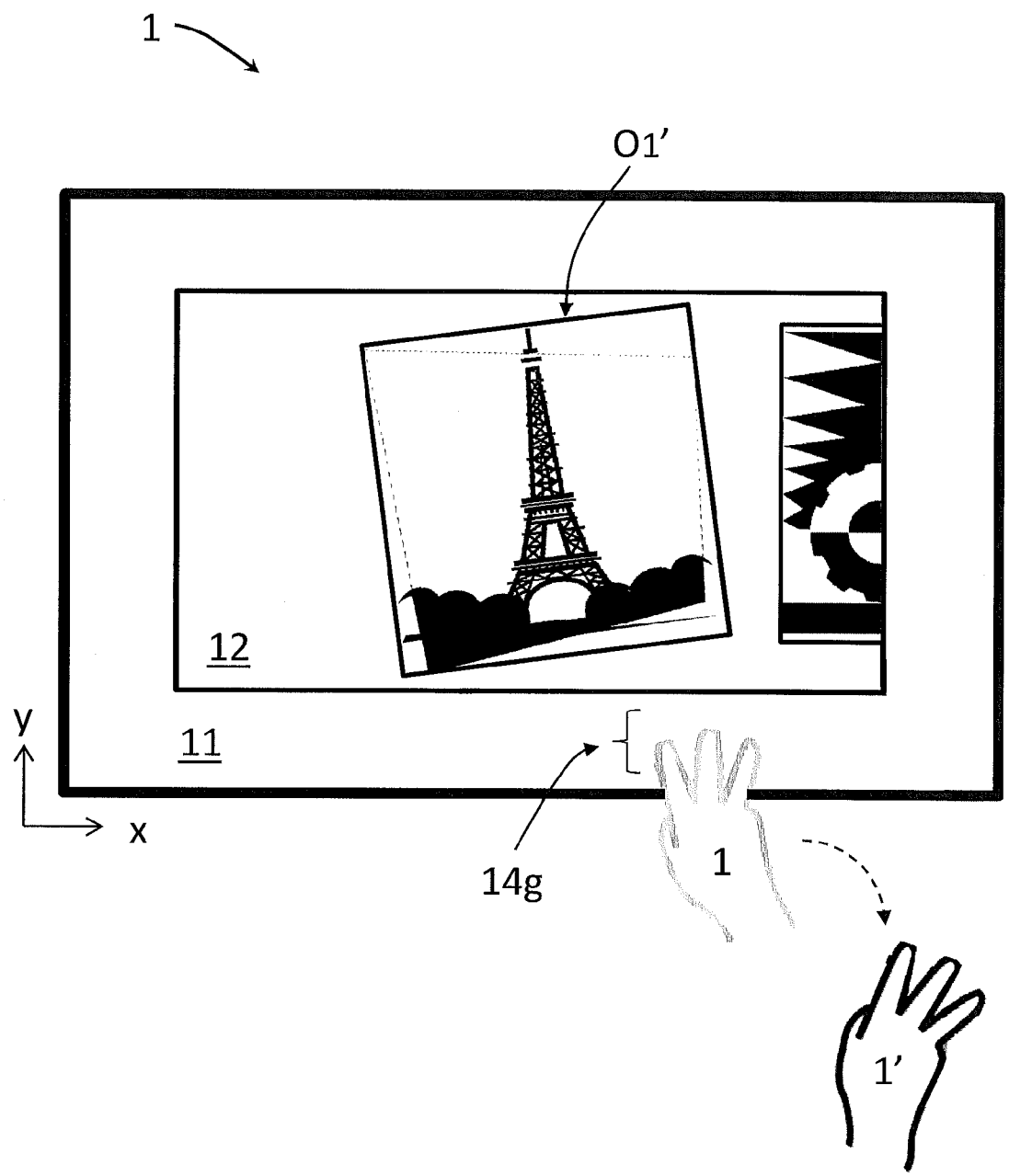

FIGS. 40 and 41 are diagrams of a display device 1 configured to receive contact inputs within portions of an overscan region 11 and a display region 12 to manipulate camera views of a canvas. In some implementations, a display device 1 may include a display region 12 displaying image objects of a canvas having orientations along x- and y-axis. A user may manipulate a camera displaying the image objects of the canvas using contact input(s). For example, as shown in FIG. 40, a user may provide an initial three-contact input (1) within a portion 14i of the overscan region 11, wherein an image object O1 is shown. Upon providing the three-contact input (1), each image object (or grouping of image objects) are highlighted to provide the user with an indication as to availability of the image objects (or grouping of image objects) to be selected by the user. After the initial three-contact input (1) is received, the user may select one of the image objects O1 by providing a momentary contact input (2) at the display region 12. Upon providing the momentary contact input (2), the selected image object O1 is further highlighted indicating the selection by the user of the image object O1.

Next, in some implementations, such as that shown in FIG. 41, the user may provide a subsequent input (1') by removing the three-contact input (1). After the three-contact input (1) is removed, a zoom-in of the canvas and moving the canvas (panning the camera) along x- and y-axis directions may be performed. For example, since the image object O1 was selected, zoom-in of the canvas will be accomplished with the image object O1' being centered within the camera. Here, the original orientation of the image object O1 will be maintained, and the amount of zoom-in of the canvas will be determined in order to display the image object O1' within the display region 12 to its fullest extent as possible.

Figure 42:
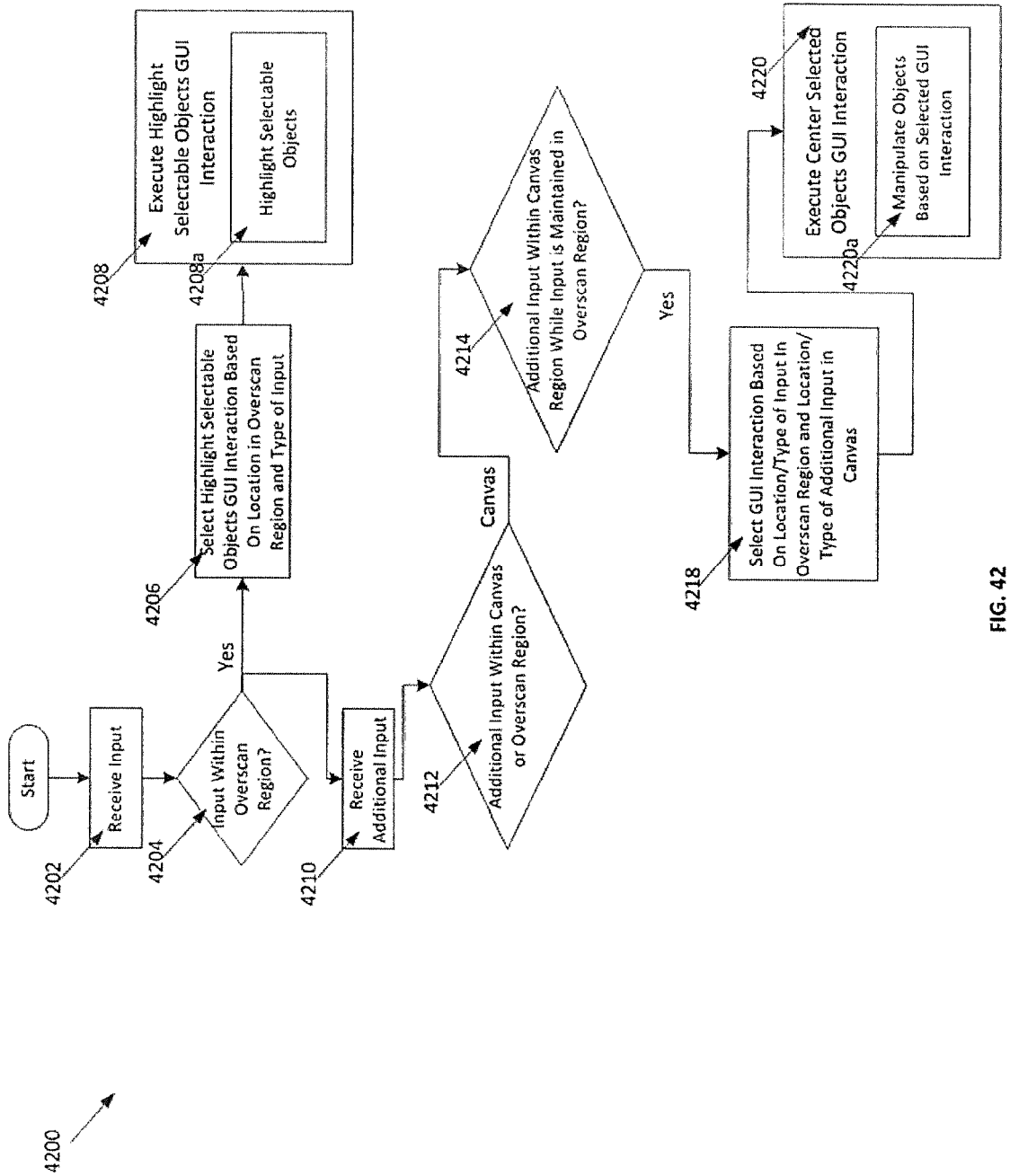
FIG. 42 is a flowchart of an example of an interaction process to enable a user to select displayed image objects and center a camera view on the selected objects.

FIG. 42 is a flowchart of an example of an interaction process 4200 for enabling interaction with camera views of a canvas. Process 4200 is an example of process 3400 where the overscan input triggers a highlight selectable objects GUI interaction (i.e., an interaction that results in a highlighting of those objects on the screen that are selectable by the user) and the additional canvas input triggers a center selected objects GUI interaction (i.e., an interaction that changes the camera view to reorient the selected objects in the center of the screen such that they are displayed to the fullest extent possible in the display region 12). In some implementations, the process 4200 illustrated in FIG. 42 may be performed by, for example, the display device 1 of FIGS. 1 and 2.

A contact input is received at the display device 1 (4202). A determination is made whether the received contact input was received within the overscan region 11 (4204). After the received contact input is determined to be received within the overscan region 11, a highlight selectable objects GUI interaction is selected (4206) and executed based on the type of contact input that was received and/or based on a location in the overscan region that received the contact input (4208). Execution of the GUI interaction may result in making one or more previously non-selectable objects displayed in the display region 12 user-selectable while the contact input is maintained by the user (e.g., while a three-finger contact input remains engaging or contacting the touch screen). Execution of the GUI interaction also may result in visually distinguishing those user-selectable objects from other objects displayed in the display region 12 that are not user-selectable while the contact input is maintained by the user (4208a). The user-selectable objects may be visually distinguished from the non-user-selectable objects by, for example, highlighting the objects that are user-selectable. In some implementations, the user-selectable objects may be visually distinguished from objects that are not user-selectable as a result of a difference in their visual appearance arising from, for example, a difference in color, texture, size, transparency, and/or orientation. FIG. 40 provides an example of a display region 12 where selectable displayed objects are highlighted in response to a three-contact input (e.g., a three-finger press).

Once the contact input is no longer maintained by the user, the highlight selectable GUI interaction may terminate, resulting in the one or more objects no longer being highlighted and no longer being user-selectable. A user may end a contact input (i.e., no longer maintain the contact input) by discontinuing contact/engagement with the touch screen (e.g., by raising all fingers or removing all input mechanisms used to generate the input such that no finger or input mechanism used to generate the input remains contacting/engaging the touch screen) and/or by changing the contact input to a different input corresponding to a different GUI interaction by, for example, raising one or more of the fingers/input mechanisms used to generate the input or placing down one or more additional fingers/input mechanisms that are then combined with the fingers/input mechanisms used to generate the input.

In some implementations, the highlight selectable objects GUI interaction does not make previously non-selectable objects user-selectable. Rather, in these implementations, the highlight selectable objects GUI interaction instead only highlights or otherwise visually distinguishes those objects that have been and continue to be user-selectable for the purpose of enabling a user to quickly identify which objects can be selected by the user. In other implementations, the display region 12 may display both selectable and non-selectable objects, and the highlight selectable objects GUI interaction may then be triggered to make some of the non-selectable objects selectable while highlighting all selectable objects in the display region 12 and, optionally, distinguishing those newly selectable objects from the previously selectable objects.

An additional input is received at the display device 1 corresponding to a user selection of one of the objects displayed within the canvas (4210). A determination is made whether the additional input is within the display region 12 (e.g., canvas) or within the overscan region 11 (4212). The additional input is determined to be located within the display region 12 (e.g., canvas) and, therefore, a determination is made whether the initial overscan input received during operation 4202 has been maintained (4214). Stated differently, a determination is made whether the input mechanism that generated or is generating the overscan initial input has maintained engagement with the touch screen when the additional canvas input is received (e.g., has maintained continuous or substantially continuous engagement with the touch screen from the time at which the initial overscan gesture began through the time that the additional canvas gesture begins or, in some implementations, ends). In this example, the initial overscan input received during operation 3402 has been maintained when the additional canvas input is received, and, therefore, a Center Selected Objects GUI Interaction is selected based on the location and type of the initial overscan input and based on the location and type of the additional canvas input (4218). The Center Selected Objects GUI Interaction may be executed (4220 and 4220a).

Execution of the Center Selected Objects GUI Interaction enables the user to select one or more of the highlighted (or visually distinguished) user-selectable objects by engaging or contacting the respective objects in the display region 12, as shown, for example, in FIG. 40. Additionally, execution of the Center Selected Objects GUI Interaction may then reorient and/or resize the one or more selected objects upon and in response to the user no longer maintaining the initial overscan input received during operation 4202, as shown, for example, in FIG. 41. Specifically, the one or more selected objects may be translated such that the one or more selected objects are centered in the camera view and, optionally, also may be increased in size such that the one or more selected objects occupy a greater portion of the camera view. In some implementations, the one or more selected objects are made as large as possible within the display region 12 while still showing all portions of all of the selected objects. In some implementations, a preferred axis is identified for the one or more selected objects and the one or more selected objects are also rotated or reoriented such that their preferred axis is parallel to a border (e.g., a horizontal or vertical border) of the display region 12 or a border displayed within the display region 12.

In the example shown in FIGS. 40 and 41, the initial overscan input is a three-contact or three-finger contact input in portion 11c of the overscan region 11. The additional canvas input that initiates or triggers the Center Selected Objects GUI Interaction is a single finger contact on the user-selectable object O1 in the display region 12. The user then removes his or her hand from the overscan region 11, thereby discontinuing the three-contact input. In response to the user discontinuing the three-contact input, the Center Selected Objects GUI Interaction reorients and resizes the selected object O1 as shown in FIG. 41.

Some of the above-described implementations refer to the execution of selected GUI interactions as resulting in the manipulation of displayed objects. In other implementations, execution of any or all of the selected GUI interactions can additionally or alternatively result in invoking of objects (i.e., displaying previously undisplayed objects in the display region).

In some implementations, the various contact inputs provided to the overscan region 11 and/or the display region 12 may be used substantially interchangeably with one another. For example, contact inputs provided within the overscan region 11 may similarly be provided as contact inputs provided within the display region 12. Here, the display device 1 may be configured to differentiate between specific contact input types provided within the overscan region 11, as compared to specific contact input types provided within the display region 12. Conversely, contact inputs provided within the display region 12 may similarly be provided as contact inputs provided within the overscan region 11. Moreover, combinations of the contact inputs provided within the overscan region 11 and/or the display region 12 may be used to invoke manipulation of the image objects and/or the canvas (or camera view(s)).

In some implementations, contact inputs provided to the overscan region 11 may be associated with first specific contact input types, whereas contact inputs provided to the display region 12 may be associated with second specific contact input types different from the first specific contact input types. For example, contact inputs associated with the first specific contact input types provided to the display region 12 may not invoke manipulation normally associated with the first specific contact input types provided to the overscan region 11. Conversely, contact inputs associated with the second specific contact input types provided to the overscan region 11 may not invoke manipulation normally associated with the second specific contact input types provided to the display region 12.

In some implementations, the display device 1 may be configured to receive updates to associate (or re-associate or disassociate) specific contact input types with the overscan region 11 and/or the display region 12. For example, the display device 1 may provide a user to selectively customize and assign different specific contact input types with specific functional operations of the display device 1.

In some implementations, the display device 1 may provide the user with the ability to switch to a learning mode in order to customize the user's unique mannerisms with specific functional operations of the display device 1. For example, left-handed users may have preferences that may be different from preferences of right-handed user. Similarly, some users may prefer to orient the display 1 into a portrait orientation and other users may prefer a landscape orientation. In either instance, the display device 1 may be configurable to accommodate preferences of the user.

In some implementations, the display device 1 may be configured to provide a user with the ability to limit entry of contact input within specific portions of the overscan region 11. For example, users who enjoy resting their palms along a bottom portion of the overscan region 11 may "turn off" the bottom portion of the overscan region 11 to prevent receiving contact input, thereby preventing inadvertent entry of contact input within the bottom portion of the overscan region 11.

Alternatively, the display device 1 may be configured to reject certain contact input types within specific portions of the overscan region 11. For example, relatively large contact input (i.e., contact input having an area substantially corresponding at an area of a user's palm) may be selected as undesirable contact input type. Then, the display device 1 may recognize that this "size" of contact input is undesirable, and prevent invoking any functionality associated with the undesirable contact input type. Similarly, specific contact input provided to the display region 12 may be predetermined as an undesirable contact input type. Moreover, combinations of specific contact input(s) simultaneously provided to the overscan region 11 and the display region 12 may be predetermined as an undesirable contact input type. In this implementation, the display device 1 may be provided with a predetermined identification of contact input types that may be classified as "unclear" based upon contact input types classified as being known and acceptable for invoking functionality of the display device 1.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Multi-touch display devices encompass a wide variety of display devices and associated systems and components. Some multi-touch display devices require physical contact with a surface of the multi-touch display device in order to receive input. For example, such a multi-touch display device may receive input by detecting contact with a surface of the multi-touch display device by a finger, a stylus, some other mechanical, electro-mechanical, or magnetic input mechanism and/or any combination of multiple such input mechanisms at the same time. Furthermore, some such multi-touch display devices may be configured such that the surface that receives input may appear to be the same surface on which the multi-touch display device displays objects (whether or not the surface that receives input actually is the same surface as the surface on which the multi-touch display device displays objects). Alternatively, other such multi-touch display devices may receive input on a surface that is clearly remote and distinct from the surface on which the multi-touch display device displays objects. One example of such a multi-touch display system is a multi-point input capable standalone tablet that provides input to a remote and distinct display.

Other multi-touch display devices do not require physical contact with the surface of the multi-touch display device in order to receive input. For example, such multi-touch display devices may receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

Furthermore, the various different transformations and annotations disclosed herein may be implemented by any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Moreover, some of the various different transformations and annotations disclosed herein are not limited to implementation on a multi-touch device and thus may be implemented on a single-point device.

Various modifications may be made. For example, useful results still may be achieved if steps of the disclosed techniques are performed in a different order. Moreover, useful results may be achieved by combining various steps or components of the various disclosed techniques in a different manner and/or if components of the disclosed systems are combined in a different manner and/or replaced or supplemented by other components.

What is claimed is:

1. A display device, comprising:
a display panel including a display region and an overscan region disposed adjacent to the display region with an interface boundary disposed therebetween, the display region being configured to display one or more image objects and the overscan region being configured to prevent display of images within the overscan region;
a touchscreen panel overlying the display region and the overscan region that is configured to detect engagement by one or more input mechanisms of points on the touchscreen panel and generate engagement data indicative of the detected engagement; and
a computer processor configured to:
   access first engagement data;
   determine that the first engagement data reflects engagement by the one or more input mechanisms with a first portion of at least one portion of the touchscreen panel correspondingly overlapping with the overscan region at a first time, wherein the at least one portion of the touchscreen panel further comprises a second and different portion correspondingly overlapping with the overscan region;
   identify a first particular engagement input type of multiple engagement input types based on the first engagement data;
   determine whether the identified first particular engagement input type is associated with invoking or changing the display of the one or more image objects in the display region; and
   instruct the display panel, based upon the identified first particular engagement input type, the determination that the first engagement data reflects engagement with the first portion, and the determination that the identified first particular engagement input type is associated with invoking or changing the display of the one or more image objects in the display region, to invoke the display of the one or more image objects in the display region or to change the display of the one or more image objects in the display region.

2. The display device according to claim 1, wherein the processor is included in the touchscreen panel.

3. The display device according to claim 1, wherein the engagement by one or more input mechanisms includes physical contact by the one or more input mechanisms to the points on the touchscreen panel.

4. The display device according to claim 3, wherein the one or more input mechanisms includes a finger or stylus.

5. The display device according to claim 1, wherein the engagement by one or more input mechanisms includes hovering above the points on the touchscreen panel by the one or more input mechanisms without making physical contact with the points on the touchscreen panel.

6. The display device according to claim 1, wherein the processor is configured to instruct the display panel to invoke the display of the one or more image objects in the display region based on the identified first particular engagement input type.

7. The display device according to claim 6, wherein the one or more image objects include textual documents, substantially still images, substantially moving images, maps, publications, video recordings, substantially live video signals, visualized voice recordings, substantially live visualized voice signals, internet web pages, and internet websites.

8. The display device according to claim 1, wherein the processor is configured to instruct the display panel to change the display of the one or more image objects in the display region based on the identified first particular engagement input type.

9. The display device according to claim 8, wherein the one or more image objects include textual documents, substantially still images, substantially moving images, maps, publications, video recordings, substantially live video signals, visualized voice recordings, substantially live visualized voice signals, internet web pages, and internet websites.

10. The display device according to claim 1, wherein the overscan region laterally encompasses the display region.

11. The display device according to claim 10, wherein the touchscreen panel covers an entirety of the overscan region.

12. The display device according to claim 10, wherein the touchscreen panel continuously covers the display region and the overscan region of the display panel.

13. The display device according to claim 1, wherein the first particular engagement input type comprises a substantially continuous input contact that traverses a first point of the touchscreen panel overlapping with the overscan region and continues to a second point of the touchscreen panel overlapping with the overscan region, the first point corresponding to a first horizontal coordinate and a first vertical coordinate and the second point corresponding to a second horizontal coordinate and a second vertical coordinate, and wherein the first and second horizontal coordinates are different from each other and the first and second vertical coordinates are different from each other.

14. The display device according to claim 1, wherein the processor is further configured to:
    access second engagement data,
    determine that the second engagement data reflects engagement by the one or more input mechanisms with the at least one portion of the touchscreen panel correspondingly overlapping with the overscan region at a second time subsequent to the first time;
    identify a second particular engagement input type of the multiple engagement input types based on the second engagement data, the identified second particular engagement type being different from the identified first particular engagement type;
    determine whether the identified second particular engagement input type is associated with invoking a different display of the one or more image objects in the display region or initiating a different change to the display of the one or more image objects in the display region; and
    instruct the display panel, based upon the determination that the identified second particular engagement input type is associated with invoking a different display or initiating a different change to the display of the one or more image objects in the display region, to invoke the different display of the one or more image objects in the display region or initiate the different change to the display of the one or more image objects in the display region.

15. The display device according to claim 1, wherein the processor is further configured to:
    access second engagement data;
    determine that the second engagement data reflects engagement by the one or more input mechanisms with the second portion;
    identify a second particular engagement input type of the multiple engagement input types based on the second engagement data, the identified second particular engagement type being different from the identified first particular engagement type;
    determine whether the identified first particular engagement input type is associated with invoking or changing the display of the one or more image objects in the display region; and
    instruct the display panel to invoke a different display of the one or more image objects in the display region or initiate a different change to the display of the one or more image objects in the display region based on both the identified second particular engagement input type and the determination that the second engagement data reflects engagement with the second portion.

16. The display device according to claim 15, wherein the first portion and the second portion of the touchscreen panel are positioned on opposing sides of the display region.

17. The display device according to claim 15, wherein the first portion and the second portion of the touchscreen panel are positioned on adjacent sides of the display region.

18. The display device according to claim 15, wherein the first portion and the second portion of the touchscreen panel are positioned on the same side of the display region.

19. The display device according to claim 15, wherein the one or more image objects include textual documents, substantially still images, substantially moving images, maps, publications, video recordings, substantially live video signals, visualized voice recordings, substantially live visualized voice signals, internet web pages, and internet websites.

20. The display device according to claim 1, wherein the processor is further configured to:
    access second engagement data;
    determine that the second engagement data reflects engagement by the one or more input mechanisms with the second portion;
    identify the first particular engagement input type of the multiple engagement input types based on the second engagement data;
    determine whether the identified first particular engagement input type is associated with invoking or changing the display of the one or more image objects in the display region; and
    instruct the display panel to invoke a different display of the one or more image objects in the display region or initiate a different change to the display of the one or more image objects in the display region based on both the identified first particular engagement input type and the determination that the second engagement data reflects engagement with the second portion.

21. The display device according to claim 20, wherein the first portion and the second portion of the touchscreen panel are positioned on opposing sides of the display region.

22. The display device according to claim 20, wherein the first portion and the second portion of the touchscreen panel are positioned on adjacent sides of the display region.

23. The display device according to claim 20, wherein the first portion and the second portion of the touchscreen panel are positioned on the same side of the display region.

24. The display device according to claim 20, wherein the one or more image objects include textual documents, substantially still images, substantially moving images, maps, publications, video recordings, substantially live video signals, visualized voice recordings, substantially live visualized voice signals, internet web pages, and internet websites.

25. A method for operating a display device comprising a display panel including a display region and an overscan region disposed adjacent to the display region with an interface boundary disposed therebetween, the display region being configured to display one or more image objects and the overscan region being configured to prevent display of images within the overscan region, a touchscreen panel overlying the display region and the overscan region that is configured to detect engagement by one or more input mechanisms of points on the touchscreen panel and generate engagement data indicative of the detected engagement, and a computer processor, the method comprising:
    accessing, using the computer processor, first engagement data;
    determining, using the computer processor, that the first engagement data reflects engagement by the one or more input mechanisms with a first portion of at least one portion of the touchscreen panel correspondingly overlapping with the overscan region at a first time;
    identifying, using the computer processor, a first particular engagement input type of multiple engagement input types based on the first engagement data;
    determining, using the computer processor, whether the identified first particular engagement input type is associated with invoking or changing the display of the one or more image objects in the display region; and
    instructing the display panel, using the computer processor and based upon identifying the first particular engagement input type, determining that the first engagement data reflects engagement by the one or more input mechanisms with the first portion, and determining that the identified first particular engagement input type is associated with invoking or changing the display of the one or more image objects in the display region, to invoke the display of the one or more image objects in the display region or to change the display of the one or more image objects in the display region.

26. The method according to claim 25, wherein the engagement by one or more input mechanisms includes physical contact by the one or more input mechanisms to the points on the touchscreen panel.

27. The method according to claim 26, wherein the one or more input mechanisms includes a finger or stylus.

28. The method according to claim 25, wherein the engagement by one or more input mechanisms includes hovering above the points on the touchscreen panel by the one or more input mechanisms without making physical contact with the points on the touchscreen panel.

29. The method according to claim 28, wherein the hovering above the points on the touchscreen panel by the one or more input mechanisms on the touchscreen panel includes changing one of an electric field and a magnetic field associated with the points on the touchscreen panel.

30. The method according to claim 25, wherein instructing the display panel comprises instructing the display panel to invoke the display of the one or more image objects in the display region.

31. The method according to claim 30, wherein the one or more image objects include textual documents, substantially still images, substantially moving images, maps, publications, video recordings, substantially live video signals, visualized voice recordings, substantially live visualized voice signals, internet web pages, and internet websites.

32. The method according to claim 25, wherein instructing the display panel comprises instructing the display panel to change the display of the one or more image objects in the display region based on the identified first particular engagement input type.

33. The method according to claim 32, wherein the one or more image objects include textual documents, substantially still images, substantially moving images, maps, publications, video recordings, substantially live video signals, visualized voice recordings, substantially live visualized voice signals, internet web pages, and internet websites.

34. The method according to claim 25, wherein identifying a first particular engagement input type comprises identifying a first particular engagement input type that includes a substantially continuous input contact that traverses a first point of the touchscreen panel overlapping with the overscan region and continues to a second point of the touchscreen panel overlapping with the overscan region, the first point corresponding to a first horizontal coordinate and a first vertical coordinate and the second point corresponding to a second horizontal coordinate and a second vertical coordinate, and wherein the first and second horizontal coordinates are different from each other and the first and second vertical coordinates are different from each other.

35. The method according to claim 25, further comprising:
    accessing, using the computer processor, second engagement data,
    determining, using the computer processor, that the second engagement data reflects engagement by the one or more input mechanisms with the at least one portion of the touchscreen panel correspondingly overlapping with the overscan region at a second time subsequent to the first time,
    identifying, using the computer processor, a second particular engagement input type of the multiple engagement input types based on the second engagement data, the identified second particular engagement type being different from the identified first particular engagement type; and
    instructing, using the computer processor, the display panel, based upon the determining that the identified second particular engagement input type is associated with invoking or changing the display of the one or more image objects in the display region, to invoke a different display of the one or more image objects in the display region or initiate a different change to the display of the one or more image objects in the display region.

36. The method according to claim 25, further comprising;
    accessing, using the computer processor, second engagement data,
    determining, using the computer processor, that the second engagement data reflects engagement by the one or more input mechanisms with a second portion of the touchscreen panel correspondingly overlapping with the overscan region that is different from the first portion of the touchscreen panel correspondingly overlapping with the overscan region, identifying, using the computer processor, a second particular engagement input type of the multiple engagement input types based on the second engagement data, the identified second particular engagement type being different from the identified first particular engagement type; and instructing the display panel, using the computer processor, to invoke a different display of the one or more image objects in the display region or initiate a different change to the display of the one or more image objects in the display region based on both the identified second particular engagement input type and the determination that the second engagement data reflects engagement with the second portion.

37. The method according to claim 36, wherein the first portion and the second portion of the touchscreen panel are positioned at substantially opposing sides of the display region.

38. The method according to claim 36, wherein the first portion and the second portion of the touchscreen panel are positioned at substantially adjacent sides of the display region.

39. The method according to claim 36, wherein the first portion and the second portion of the touchscreen panel are positioned at substantially the same side of the display region.

40. The method according to claim 36, wherein the one or more image objects include textual documents, substantially still images, substantially moving images, maps, publications, video recordings, substantially live video signals, visualized voice recordings, substantially live visualized voice signals, internet web pages, and internet websites.

41. The method according to claim 25, further comprising:

accessing, using the computer processor, second engagement data, determining, using the computer processor, that the second engagement data reflects engagement by the one or more input mechanisms with a second portion of the touchscreen panel correspondingly overlapping with the overscan region that is different from the first portion of the touchscreen panel correspondingly overlapping with the overscan region, identifying, using the computer processor, the first particular engagement input type of the multiple engagement input types based on the second engagement data; and instructing the display panel, using the computer processor, to invoke a different display of the one or more image objects in the display region or initiate a different change to the display of the one or more image objects in the display region based on both the identified first particular engagement input type and the determination that the second engagement data reflects engagement with the second portion.

42. The method according to claim 41, wherein the first portion and the second portion of the touchscreen panel are positioned at substantially opposing sides of the display region.

43. The method according to claim 41, wherein the first portion and the second portion of the touchscreen panel are positioned at substantially adjacent sides of the display region.

44. The method according to claim 41, wherein the first portion and the second portion of the touchscreen panel are positioned at substantially the same side of the display region.

45. The method according to claim 41, wherein the one or more image objects include textual documents, substantially still images, substantially moving images, maps, publications, video recordings, substantially live video signals, visualized voice recordings, substantially live visualized voice signals, internet web pages, and internet websites.

* * * * *